US010590006B2

(12) United States Patent
Baird et al.

(10) Patent No.: US 10,590,006 B2
(45) Date of Patent: Mar. 17, 2020

(54) METHOD OF LEAK TESTING THE SEALS IN A WATER FILTER CARTRIDGE

(71) Applicants: Michael T. Baird, Temecula, CA (US); Randy L. Parmley, Temecula, CA (US); John J. Julos, Temecula, CA (US)

(72) Inventors: Michael T. Baird, Temecula, CA (US); Randy L. Parmley, Temecula, CA (US); John J. Julos, Temecula, CA (US)

(*) Notice: Subject to any disclaimer, the term of this patent is extended or adjusted under 35 U.S.C. 154(b) by 9 days.

(21) Appl. No.: 16/113,989

(22) Filed: Aug. 27, 2018

(65) Prior Publication Data
US 2018/0362362 A1 Dec. 20, 2018

Related U.S. Application Data

(62) Division of application No. 14/693,631, filed on Apr. 22, 2015, now Pat. No. 10,087,085.

(60) Provisional application No. 62/020,218, filed on Jul. 2, 2014, provisional application No. 61/983,392, filed on Apr. 23, 2014.

(51) Int. Cl.
*C02F 1/00* (2006.01)
*G01M 3/04* (2006.01)
(Continued)

(52) U.S. Cl.
CPC .............. *C02F 1/003* (2013.01); *B01D 35/30* (2013.01); *G01M 3/04* (2013.01); *G01M 3/26* (2013.01);
(Continued)

(58) Field of Classification Search
CPC .......... G01M 3/04; G01M 3/26; B01D 35/30; B01D 2201/301; C02F 1/003;
(Continued)

(56) References Cited

U.S. PATENT DOCUMENTS 1,328,221 A   1/1920   Zahm
3,785,164 A   1/1974   Wrenn, Jr.
(Continued)

FOREIGN PATENT DOCUMENTS

WO   2012103046 A1   8/2012
WO   2013072912 A1   5/2013

OTHER PUBLICATIONS

Initial PCT Report of International Application No. PCT/US2015/27141, filed Apr. 22, 2015, in the name of Michael T. Baird.
(Continued)

*Primary Examiner* — Robert Clemente

(57) ABSTRACT

A water filter cartridge has a cap with radially oriented first and second (either inlet or outlet) flow channels on first and second generally cylindrical portions. First and second seals encircle the first flow channel on the first portion and third and fourth seals encircle the second flow channel on the second portion. The second and third seals form a void volume during use which may be accessed by a vent path to eliminate moisture or to test for or indicate leaks. The radial flow paths reduce axial, push out forces on the filter cartridge and allow smaller locking tabs to be used. The first seal forms a top void volume during use which may be accessed by a vent path to eliminate moisture or to test for or indicate leaks.

26 Claims, 24 Drawing Sheets

(51) Int. Cl.
    *B01D 35/30* (2006.01)
    *G01M 3/26* (2006.01)
    *C02F 103/02* (2006.01)

(52) U.S. Cl.
    CPC .... *B01D 2201/301* (2013.01); *C02F 2103/02* (2013.01); *C02F 2201/004* (2013.01); *C02F 2201/005* (2013.01); *C02F 2201/006* (2013.01); *C02F 2307/10* (2013.01)

(58) Field of Classification Search
    CPC ............ C02F 2201/004; C02F 2103/02; C02F 2201/005; C02F 2201/006; C02F 2307/10
    See application file for complete search history.

(56) References Cited

U.S. PATENT DOCUMENTS

| | | |
|---|---|---|
| 4,319,997 A | 3/1982 | Pett |
| 4,331,535 A | 5/1982 | Pett |
| 4,725,354 A | 2/1988 | Thomsen et al. |
| 4,735,716 A | 4/1988 | Petrucci et al. |
| RE34,031 E | 8/1992 | Thomsen et al. |
| RE34,050 E | 9/1992 | Thomsen et al. |
| 5,591,332 A | 1/1997 | Reid et al. |
| 5,645,720 A | 7/1997 | Godines |
| 5,653,871 A | 8/1997 | Thomsen |
| 5,685,981 A | 11/1997 | Koslow |
| 6,901,770 B2 | 6/2005 | Scaringer et al. |
| 8,216,463 B1 | 7/2012 | Baird |
| RE45,080 E | 8/2014 | Fritze |
| 10,087,085 B2 | 10/2018 | Baird et al. |
| 2013/0341261 A1* | 12/2013 | Maki .................... B01D 35/147 210/234 |
| 2014/0030585 A1 | 10/2014 | Bentor et al. |

OTHER PUBLICATIONS

International Search Report for Waterfilter Cartridge and Manifold Head Seal, International App. No. PCT/US2015/27141, Applicant TST Water, Inc.

* cited by examiner

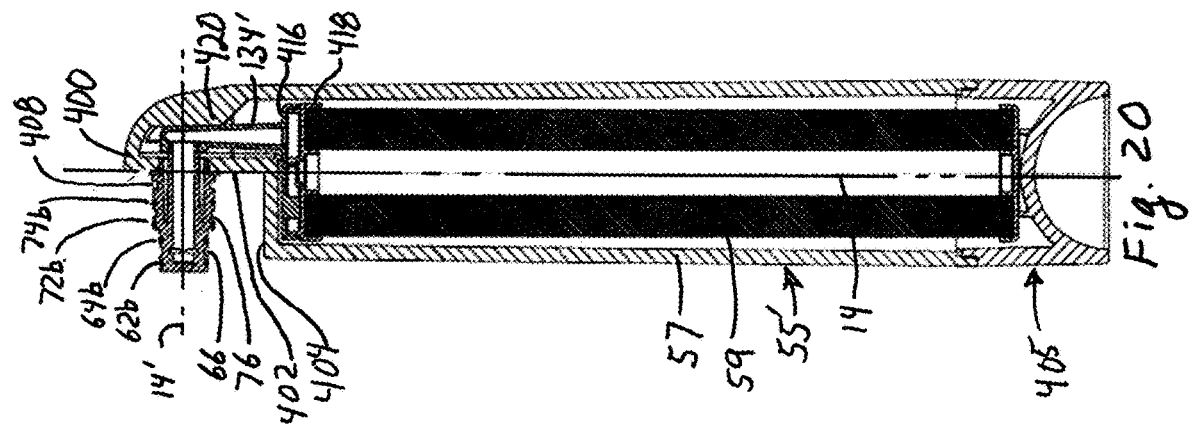
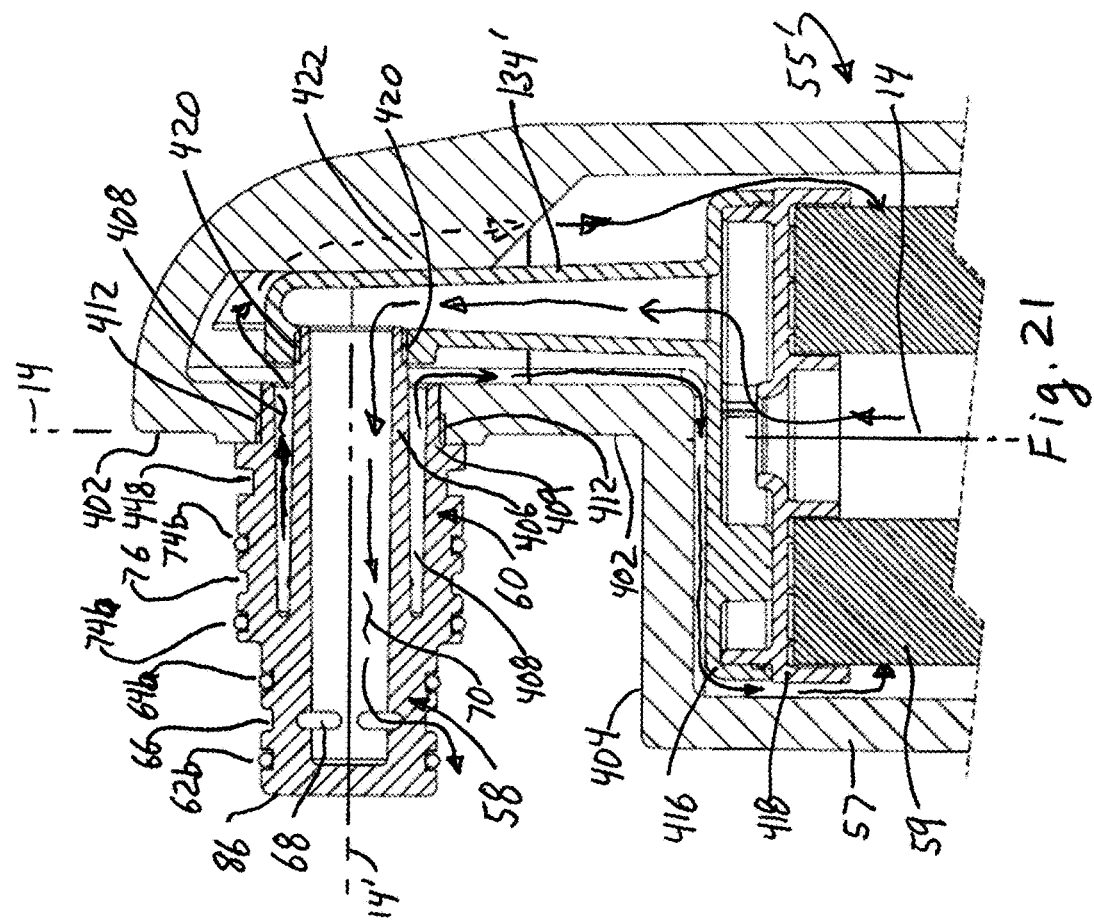

METHOD OF LEAK TESTING THE SEALS IN A WATER FILTER CARTRIDGE

CROSS-REFERENCE TO RELATED APPLICATIONS

This application is a divisional of patent application Ser. No. 14/693,631 filed on Apr. 22, 2015 which claims the benefit under 35 U.S.C. § 119(e) to Provisional Patent Application No. 61/983,392 filed Apr. 23, 2014 and Provisional Patent Application No. 62/020,218 filed Jul. 2, 2014 the entire contents of which are incorporated herein by reference.

BACKGROUND

The present invention relates generally to water filter cartridges used in home and business water filter systems, and optionally used in commercial applications. Current filter systems have a manifold head with a manifold head inlet port connected to a source of water and a manifold head outlet port connected to a dispenser for the filtered water, such as a household refrigerator, or an apparatus using filtered water such as a coffee maker. The manifold head typically has a generally cylindrical, cup shaped interior, and often has a single, uniform diameter or two different diameters forming a stepped configuration. A removable filter cartridge has a cartridge head that is typically inserted axially into the manifold head so that lugs or bayonet flanges on the cartridge head or cartridge housing pass through corresponding slots in the manifold head. The cartridge is then rotated so the lugs or bayonet flanges engage inclined locking surfaces on the manifold head to force the cartridge and cartridge head axially toward the manifold head so as to engage fluid seals located between the manifold head and the cartridge head and to align the manifold head inlet port with a cartridge head inlet and to align a cartridge head outlet with the manifold head outlet port so water can flow through a filter within the cartridge. The cartridge head is rotated the opposite direction to remove the cartridge after the filter is exhausted and to allow a fresh filter cartridge to be inserted into the manifold head.

Two or three O-ring seals are used between the manifold head and the cartridge head to separate the inlet and outlet flow paths to and from the filter cartridge. One of the seals allows water to flow between the interior end of the manifold head and the adjacent end of the cartridge head in a plane orthogonal to the longitudinal axis of the filter cartridge, or the seals allow water to flow between an annular surface on the manifold head and an adjacent annular surface on the cartridge head, which annular surfaces encircle the longitudinal axis of the filter cartridge. The water pressure on these adjacent and opposing manifold head and cartridge surfaces that are orthogonal to or inclined relative to the longitudinal axis of the filter cartridge exert an axial force on the cartridge that is proportional to the surface area and water pressure. This axial force urges the cartridge out of the manifold head and is resisted by the cartridge lugs engaging the locking surfaces on the manifold head.

The lugs on the cartridge head or cartridge and the mating locking surfaces on the manifold head are substantial in order to maintain the cartridge firmly engaged with the manifold head. The line pressure of a municipal water source is typically about 40-60 psi and the manifold head and/or cartridge head is constructed so that the water exerts an axial pressure that pushes the cartridge head and cartridge away from the manifold head. The larger the diameter of the filter cartridge and cartridge head, the larger the axial force pushing the filter cartridge away from the manifold head and the larger the axial force that must be restrained by the lugs and locking surfaces. Since the filter cartridges are disposable the cartridge heads are of molded plastics, requiring the lugs to be about ¼ to ⅜ inch thick in the axial direction of the filter cartridge in order to secure the cartridges into position in the manifold head with each lug extending about an inch or more around a circumference of the cartridge's cartridge head, and with the manifold head locking surfaces having a similar thickness and circumferential length. These substantial lugs and locking surfaces require extensive molding and material. There is thus a need for an improved engagement mechanism that reduces the size of the mating lugs and locking surfaces.

The lugs and locking surfaces are thicker in the axial direction to accommodate the increased forces and since the length of the manifold head and cartridge are limited, the result is that the size of and length of the mating head is larger and the thickness of the lugs is larger in order to accommodate the increased axial force from the line water pressure tending to push the filter cartridge out of the mating head. Further, not only must the lugs on the filter cartridge be larger to accommodate the axial force from the line pressure but the mating surfaces on the head must also be larger to accommodate the force and to accommodate the larger filter lugs. Basically, the lugs on the filter cartridge and the mating lugs or locking surfaces on the manifold head must be similar in size in order for them to work together. There is thus a need for cartridge connecting and retaining mechanism that better accommodates the line pressure of the water source.

Additionally, the flow rate through the filter cartridges also increases the potential axial force tending to eject the filter from the manifold head or head. Historically a ¾ opening was considered large whereas current openings about 1" in diameter may be considered a minimum in some instances and 1½" and 2" diameter flow openings in the filter cartridges are becoming more common. With the increased flow rate the potential axial ejection force increases. There is thus a need for a water filter cartridge connecting and retaining mechanism that does not require so much axial length. There is thus a need for a water filter cartridge that better accommodates the increasing flow rates and resulting potential for increased forces tending to eject the filter from the manifold head.

The axial force resisted by the lugs ultimately limits the diameter of usable filters to about five inches diameter. There is thus a need for a way to removably connect replaceable filter cartridges to manifold heads that more efficiently accommodates the force created by the line pressure of the water source.

As the lugs and locking surfaces become longer in the axial and circumferential directions, it takes more force to rotate the filter cartridge about the longitudinal axis of the cartridge to engage the lugs and locking surfaces in the circumferential direction and to move the cartridge axially into position within the manifold head. This increased rotational torque presents difficulties for those with weaker arm strength, especially as the cartridge locations may be difficult to access. There is thus a need for an improved way to releasably engage the removable filter cartridge with the manifold head.

As water pressure is initially applied to an inserted cartridge, the O-ring seals between the cartridge and manifold head will move slightly before they seat and seal, and that typically allows a small amount of water to leak past the seal. Rapid changes in the line pressure can cause similar movement of the seals and slight leakage or weeping of water past the seals and into the dead spaces. The pressure spikes become more problematic if an O-ring forms part of two different flow paths so that an unequal pressure is exerted on different O-rings. The result is that small amounts of unfiltered water can bypass the filter element completely and allow unfiltered water into the filtered water side thereby contaminating the filter. A very low pressure or no-pressure application may also result in O-rings seals that are not seated sufficiently to prevent small amounts of water passing the seals. The result is that Bacteria and other undesirable growths can develop and ultimately bypass the seals, passing from the filtered water side to the non-filtered side, or passing from the non-filtered side to the filtered side. For many applications this bypass and actual or potential contamination is undesirable, but tolerated. For some applications this bypass and actual or potential contamination is unacceptable, as in pharmaceutical or biological applications where contamination of the filtered water may cause contamination or quality control problems and in such situations the solid seals may be used, such as adhesives, to avoid even small leaks. There is a need to avoid these small leaks that occur with pressure spikes or from no pressure or so low a pressure as to adequately seat the seals.

Additionally, current contamination testing techniques allow the identification of chemical contamination down to the parts per trillion levels. Thus, even very small amounts of water bypassing the O-ring from the non-filtered side to the filtered side of the cartridge may show up. While a water filter cartridge may pass a specific contamination test when operating in a steady flow condition that same filter cartridge may fail that same test when water pressures rise and fall dramatically between the inlet and outlet—particularly with membrane or other filter media that have high pressure drop across them. There is thus a need for an improved seal between inlet and outlet flow paths of a water filter cartridge.

Once a water filter cartridge is installed, users assume the cartridge will not leak. Unfortunately, sometimes the cartridge is installed improperly or for other reasons does not seal properly internally during manufacturing and the cartridge does leak and/or the filter media is bypassed. If the leak is readily identifiable it may be checked at the time of installation. Unfortunately, most filter cartridges do not allow easy inspection to see if the cartridge is leaking. One exception is U.S. Pat. No. 8,216,463, which provides a seal that allows leak inspection. But that leak detection is not suitable for all applications. There is thus a need for an improved method and apparatus to indicate whether a removable filter cartridge is leaking, and/or bypassing especially at the time of installation when the cartridge may be readily examined, reinstalled or replaced if needed.

BRIEF SUMMARY

A manifold head has a barrel valve into which is inserted a filter cap configured to be placed on the end of a filter cartridge having a housing with a filter element and internal passages configured to convey unfiltered fluid from an inlet passage through the manifold head and filter cap and through the filter element and provide filtered fluid to filter cap at an outlet in fluid communication with an outlet passage through the barrel valve and manifold head. The manifold head, barrel valve and filter cap have a common longitudinal axis preferably extending along a length of the cartridge. The engagement between the manifold head and the filter cap is configured so that the inlet and outlet flow paths through the manifold head, barrel valve and filter cap are in a radial plane. The filter cap is removably inserted into the barrel valve and during filtering use the fluid path between the barrel valve and the filter cap are further contained in a generally cylindrical, annular space that encircles the longitudinal axis of the filter cartridge with a different seal on each end of each annular space. Thus a first flow path in a first radial plane into or out of the filter cap is defined by first and second seals of a first diameter that encircle the longitudinal axis and a second radial flow path in a second radial plane is defined by third and fourth seals of a second diameter that encircle the longitudinal axis. The first and second flow paths are offset axially along the length of the longitudinal axis. The first and second seals have a first diameter and the third and fourth seals have a second diameter, and the first and second diameters may be the same or different. The first flow path may form an inlet or outlet with the second flow path forming an outlet or inlet, respectively. The seals are retained in grooves and are preferably O-ring seals. The resulting seal configuration may avoid creating an axial force that pushes the cartridge away from the manifold head.

Alternatively described, a first flow path oriented in a first orthogonal plane to the longitudinal axis is located between the first and second seals placed on opposing ends of that first plane, with the first and second seals having the same first diameter. A second fluid flow path oriented in a second orthogonal plane to the longitudinal axis is located between the third and fourth seals on opposing sides of that second plane, with the third and fourth seals having the same second diameter. The first and second seal diameters may be the same or different. The first and second seals have opposing and equal axial forces exerted on them, as do the third and fourth seals. But the opposing forces on each pair of seals result in a net zero axial force. The radial flow located between two opposing seals avoids having the water pressure exert an unbalanced axial force that pushes the cartridge away from the manifold head.

The filter cartridge on which the filter cap is placed may be held in place with retention mechanisms that require little engagement force, with spring detents and removable snap fits believed suitable. Inclined lugs and locking surfaces may be used to provide a mechanical advantage to engage the seals at the end of the engagement with the manifold head, but the lugs and locking surfaces may be substantially thinner axially and shorter circumferentially than previously used for corresponding filter sizes and water pressures of the prior art. The smaller axial thickness allows a longer filter to be used. The smaller circumferential length allows the cartridges to be engaged more easily and allows large diameter cartridges to be manually engaged with the manifold head. The removal of the force ejecting the cartridge from the manifold head allows larger diameter cartridges and/or flow ports to be used.

By using two seals encircling the longitudinal axis to define a single flow path, the pressure force on each seal is approximately the same but in an opposing direction and that helps reduce weeping of small amounts of water past the seals. Further, because the seal arrangement and flow arrangement reduces axial force on the filter and filter nozzle, it is possible to leak test each filter cartridge before use. A filter cartridge may be inserted into a test manifold head and pressurized gas, such as air, may be introduced instead of water. The leak rate of gas may be monitored by noting pressure loss, or measuring flow rate needed to maintain a desired pressure. Pressure sensors or flow sensors may be used in connection with vent passages extending through the mating parts to the void volumes between the pairs of seals that define the flow path in order to monitor leakage into the void volumes. After testing is completed the gas pressure may be released and another part tested. The ability to quickly pressurize and depressurize a filter cartridge with air or other gas allows fast relatively inexpensive testing. Current filters that contain carbon cannot be tested in this fashion because the carbon will absorb gas under pressure and will then release the gas slowly and that gas absorption and release defeats the use of rapid pressurization to test for leaks. The use of air or other gas avoids residual water in the filter cartridge and greatly reduces the risk of bacterial growth. The use of vent passages to void volumes allows all areas of the seals to be tested before use. Additionally, the seal testing ability is especially desirable for a filter cartridge having two, spaced apart nozzle seals on the outside of a tubular nozzle where the volume formed between the two seals can be vented to a location outside the manifold head and filter cap, thus allowing gas testing of the sealing effectiveness of the two, spaced apart, nozzle seals. Since more than 1% of filter cartridges may be returned because consumers report the nozzle seals leak usually where the consumer reports poor taste due to bypass of the filter media or that the filter leaks, the ability to test the seal capability before shipment is very desirable. The ability to pressure test the entire filter cartridge and its seals by accessing the various void volumes to check for leaks, allows the entire fluid cartridge to be tested for leaks using gas or liquid, but preferably using a gas such as air.

Further, by providing vent passages to the void areas, it becomes possible to not only test that the filter cartridge itself is sealed but it becomes possible to test that the internal filter media is sealed to ensure that there is no bypass of the internal filter media. It is not possible to test for this condition in other current filter configurations unless destructive testing of the filter is performed.

In more particularity, a filter cartridge is provided for use with a filter apparatus manifold head having a flow inlet and a flow outlet. The filter cartridge has a filter element located in a housing with the filter element in fluid communication with a filter inlet and filter outlet so that liquid from the flow inlet passes through the filter inlet and filter and out the fluid outlet. The filter cartridge includes a filter cap having a first generally cylindrical portion with a first fluid passageway extending radially inward toward a longitudinal axis of the filter cartridge and forming one of the inlet or outlet of the filter cartridge. The filter cap has a second generally cylindrical portion with a second fluid passageway extending radially inward toward the longitudinal axis and forming the other of the inlet or outlet of the filter cartridge. The filter cap may have a closed top at one end with the first generally cylindrical portion closer to the closed top than the second generally cylindrical portion. The filter cap may have a first internal cavity formed in part by first generally cylindrical inner walls in fluid communication with the first fluid passageway and extending along the longitudinal axis. The filter cap may have a second internal cavity in fluid communication with the second fluid passageway and formed in part by second generally cylindrical inner walls extending along the longitudinal axis.

The filter cap further includes first and second seal members encircling the first generally cylindrical portion on opposing top and bottom sides of the first fluid passageway, respectively. Third and fourth seal members encircle the second generally cylindrical portion on opposing top and bottom sides of the second fluid passageway, respectively, with the second and third seal members being separated by a middle distance. A mounting flange is preferably connected to the filter cartridge with the mounting flange having outwardly extending mounting tabs configured to releasably connect the filter cartridge to one of an adapter or manifold head.

In further variations, the filter cartridge described above may have the second generally cylindrical portion having a larger diameter than the first generally cylindrical portion and the first inner generally cylindrical walls are smaller in diameter than the second generally cylindrical inner walls. Optionally, a first channel may be formed in the first generally cylindrical portion, with the first channel encircling at least a substantial portion of the first generally cylindrical portion and located between the first and second seals and in fluid communication with the first fluid passageway. The first channel may have an outwardly extending connecting flange at an opposing end of the filter cap and the cap may have a second channel formed in the second generally cylindrical portion, the second channel encircling at least a substantial portion of the second generally cylindrical portion and located between the first and second seals and in fluid communication with the second fluid passageway.

The filter cartridge advantageously has radial flow passages into and out of the cartridge and filter cap so the mounting tabs may be thinner than normal, with a thickness of less than about $\frac{1}{8}$ inch believed suitable when they are made of plastic and have a circumferential width of less than one inch for a cartridge diameter of about 2 to 4 inches.

There is also advantageously provided a method of testing water filter cartridges having a filter cap. The method includes the steps of pressurizing a void volume between an inlet and outlet of a water filter cap with a test gas. The void volume is located between two adjacent and coaxial seal members at least one of which defines a portion of a flow path through the filter cap of a water filter cartridge. Each of the seal members encircles a longitudinal axis of the filter cap. The method further includes providing a liquid tight seal between a portion of the filter cap and a wall abutting the two seal members to create the void volume and checking to see if the test gas leaks past the two adjacent and coaxial seal members.

In further variations, the checking step comprises monitoring the pressure of the void volume or monitoring the flow path. The checking step may include monitoring the flow path for the presence of the test gas. Each of the at least two seals preferably defines a portion of a flow path through the filter cartridge. The two seal members may have different diameters and portions of the filter cap having different diameters.

The two adjacent and coaxial seal members may include second and third seal members and the filter cap may include first and fourth seal members with the first seal member located axially above and coaxial with the second seal member and with the fourth seal member located axially below and coaxial with the third seal member. The first and second seal members preferably each encircle a portion of a filter cap adjacent a top of that filter cap and further encircle opposing sides of a first water flow path of the filter. The third and fourth seal members may each encircle opposing sides of a second water flow path of the filter. The first seal member may form a top filter cap void volume bounded on a lower end by the first sealing member which seals against the wall which defines a cavity above the first seal member and into which cavity a top of the filter cap extends during testing. The second and third seal members may form a middle filter cap void volume between the filter cap and the wall. The fourth seal member may form a portion of a bottom filter cap void volume located between the bottom of the filter cap and a portion of the wall. In this variation, the method further comprises the step of pressurizing at least one of the void volumes with the test gas and checking to see if the test gas leaks past the two seal members defining the at least one void volume being pressurized.

The checking step may include monitoring the pressure of the void volume being pressurized or monitoring the flow rate of the test gas provided to the void volume being pressurized. The first and second seal members preferably have a first diameter and the third and fourth seal members preferably have a second diameter, with the first diameter being smaller than the second diameter. The method may further include pressurizing a plurality of the void volumes with the test gas and checking to see if the test gas leaks past the two seal members defining the plurality of void volumes being pressurized. The checking step may include monitoring the pressure of the void volume being pressurized.

There is also advantageously provided an assembly including at least a manifold and barrel valve for a water filter cartridge for an appliance where the assembly having a longitudinal axis. The assembly comprises a manifold that includes several parts, the first of which is a manifold head having a manifold wall defining a first generally cylindrical manifold inner surface centered on the longitudinal axis with a first manifold fluid passage passing through the manifold wall and opening onto the first manifold inner surface. The manifold head has a second generally cylindrical manifold inner surface centered on the longitudinal axis with a second manifold fluid passage through the manifold wall and opening onto the second manifold inner surface. The second manifold fluid passage is spaced apart from the first fluid passage a distance "d" along the longitudinal axis. The manifold also includes a middle manifold vent passage extending through the manifold wall and opening onto one of the first or second manifold inner surfaces.

The assembly further includes a barrel valve having a barrel valve wall forming a first barrel valve wall portion having a first outer, generally cylindrical barrel valve surface sized to fit inside the first manifold inner surface. The barrel valve wall also forms a second barrel valve wall portion having a second outer, generally cylindrical barrel valve surface sized to fit inside the second manifold inner surface. The first barrel valve wall portion has a first barrel valve fluid passage extending therethrough. The second barrel valve wall portion has a second barrel valve fluid passage extending therethrough and spaced apart a distance along the longitudinal axis below the first barrel valve fluid passage. The first and second barrel valve fluid passages have a first position in which the first and second barrel valve fluid passages do not overlap and are not in fluid communication with any portion of the first and second manifold fluid passages and have a second position rotated about the longitudinal axis in which the first and second barrel valve fluid passages are in fluid communication with the first and second manifold fluid passages. The barrel valve further has a middle barrel valve vent passage extending through barrel valve wall between the first and second barrel valve fluid passages. The middle barrel valve vent passage has a first position that does not overlap with the middle manifold vent passage and has a second position that is in fluid communication with the middle manifold vent passage.

The assembly also preferably includes a top barrel valve seal encircling the barrel valve and longitudinal axis and interposed between the first manifold inner surface and the first barrel valve outer surface and located above the first manifold fluid passage and above the first barrel valve fluid passage. A first, middle barrel valve seal encircles the barrel valve and longitudinal axis and is interposed between the first manifold inner surface and the first barrel valve outer surface and located below the first manifold fluid passage. A second, first middle barrel valve seal encircles the barrel valve and longitudinal axis and is interposed between the second manifold inner surface and the second barrel valve outer surface and is located below the first middle barrel valve seal and above the second manifold fluid passage and above the second barrel valve fluid passage. The first and second middle barrel valve seals define a middle barrel valve void volume between those first and second middle barrel valve seals and the surfaces of the barrel valve and manifold abutting those first and second middle barrel valve seals. The middle barrel valve vent passage opens onto the middle barrel valve void volume when the barrel valve is in the at least the first position.

The assembly also preferably includes a first lower barrel valve seal encircling the barrel valve and longitudinal axis and interposed between the second manifold inner surface and the second barrel valve outer surface and located below the second manifold fluid passage and below the second barrel valve fluid passage. A top fluid passage seal is interposed between the first manifold inner surface and the first barrel valve outer surface and encircles the first barrel valve fluid passage when the barrel valve is in at least the second position. The assembly also preferably includes a bottom fluid passage seal interposed between the first manifold inner surface and the first barrel valve outer surface and encircling the second barrel valve fluid passage when the barrel valve is in at least the second position.

In further variations, the above described assembly has the diameter of the first manifold inner surface being smaller than the diameter of the second manifold inner surface and the diameter of the first barrel valve outer portion is smaller than the diameter of the second barrel valve outer portion. Further, the assembly may include a first fluid passage seal interposed between the first manifold inner surface and the first barrel valve outer surface and encircling the first barrel valve fluid passage when the barrel valve is in at least the second position. The assembly may also optionally include a second fluid passage seal interposed between the second manifold inner surface and the second barrel valve outer surface and encircling the second barrel valve fluid passage when the barrel valve is in at least the second position. A middle vent fluid passage seal may be interposed between one of the first and second manifold inner surface and one of the second barrel valve outer surface and encircling the middle barrel valve vent passage when the barrel valve is in at least the second position.

In further variations, the assembly may include a middle fluid passage seal interposed between the one of the first and second manifold inner surfaces and one of the first and second barrel valve outer surfaces and encircling the middle barrel valve vent passage when the barrel valve is in at least the second position. The first and second manifold fluid passages are preferably in a first plane orthogonal to the longitudinal axis and the first and second barrel valve fluid passages are in a second plane orthogonal to the longitudinal axis. The middle manifold passage and middle barrel valve vent passage are preferably aligned along a radial axis when the barrel valve is in the second position.

The assembly may also include a manifold base with a filter opening sized to receive a filter cap of the filter cartridge, the manifold base having a lip extending around the filter opening on an upper surface of the manifold base with at least one tab opening extending outward from the filter opening. The barrel valve is advantageously located between the manifold base and the manifold head which are configured to constrain the barrel valve so it rotates only about the longitudinal axis during use of the barrel valve.

The top barrel valve seal advantageously forms a top barrel valve void volume between the adjacent portions of the top of the barrel valve and the inner surface of the manifold that are enclosed by the top barrel valve seal. The assembly may then further include a top manifold vent passage extending through the wall of the manifold and in fluid communication with the top barrel valve void volume. The assembly may then also include a top barrel valve vent passage extending through a top of the barrel valve in fluid communication with the top void volume.

Further, this above described assembly may include a second lower barrel valve seal encircling the second portion of the barrel valve and longitudinal axis and interposed between the second manifold inner surface and the second barrel valve outer portion and located below the first lower barrel valve seal. The first and second lower barrel valve seals may define a lower barrel valve void volume located between those seals and the surfaces of the barrel valve and manifold abutting those first and second lower barrel valve seals. A bottom manifold vent passage may extend through the second manifold portion and be placed in fluid communication with the lower barrel valve void volume. A bottom barrel valve vent passage may extend through the second portion of the barrel valve and be placed in fluid communication with the lower barrel valve void volume.

The first barrel valve portion preferably has a generally cylindrical, first barrel valve inner surface and the second barrel valve portion preferably has a generally cylindrical, second barrel valve inner surface coaxial with the first barrel valve inner surface and the longitudinal axis. In this instance the assembly may include a water filter cartridge having a filter cap located along the longitudinal axis, the filter cartridge having a water filter therein. The filter cap may comprise first and second filter cap portions. The first filter cap portion may have a first filter cap fluid passage extending therethrough to a first, generally cylindrical, filter cap cavity. The first filter cap portion is configured to fit inside the first barrel valve inner surface and align with the first barrel valve fluid passage during use. The first fluid passage is preferably in a radial plane. The second filter cap portion has a second filter cap fluid passage extending therethrough to a second, generally cylindrical, filter cap cavity. The second filter cap portion is located below the first filter cap portion and configured to fit inside the second barrel valve inner surface. The second filter cap fluid passage is also preferably in a radial plane.

The filter cap has a first, middle filter cap seal encircling the first portion of the filter cap and longitudinal axis and interposed between the first portion of the filter cap and the first inner surface of the outer barrel and located above the first filter cap fluid passage. The filter cap has a second, middle filter cap seal encircling the filter cap and longitudinal axis and interposed between the filter cap and one of the first or second barrel valve inner surfaces. The second middle filter cap seal is located below the first, middle filter cap seal and above the second filter cap fluid passage. The first and second middle filter cap seals define a middle filter cap void volume between those seals and the surfaces of the filter cap and barrel valve abutting those first and second, middle filter cap seals. The middle filter cap void volume is in fluid communication with a middle barrel valve vent passage extending through the barrel valve and a manifold middle vent passage extending through the manifold wall when the barrel valve is in the second position. The filter cap also preferably includes a first, lower filter cap seal encircling the second portion of the filter cap and located below the filter cap second fluid passage.

In further variations, the assembly with the filter cap also preferably includes a top filter cap seal encircling the first portion of the filter cap and located above the top filter cap fluid passage. A bottom filter cap seal encircles the second portion of the filter cap and is located below the second filter cap fluid passage. The filter cap assembly may have the top filter cap seal forming a top filter cap void volume defined by the top filter cap seal and the facing surfaces of the filter cap and barrel valve abutting the top filter cap seal. A barrel valve top vent passage may extend through the top portion of the barrel valve and in fluid communication with the top filter cap void volume. The top barrel valve seal may form a top barrel valve void volume between the adjacent portions of the top of the barrel valve and the inner surface of the manifold that are enclosed by the top barrel valve seal. The top barrel valve void volume is in fluid communication with the barrel valve top vent passage. A top manifold vent passage may extend through the wall of the manifold and be in fluid communication with the top barrel valve void volume.

The assembly with the filter cap may also include a second, lower filter cap seal encircling the second portion of the filter cap and located below the first, lower filter cap seal and defining a lower filter cap void volume between the first and second lower filter cap seals and the facing surfaces of the filter cap barrel valve which abut the first and second lower filter cap seals. A second lower barrel valve seal may encircle the second portion of the barrel valve and longitudinal axis and be interposed between the second manifold inner surface and the second barrel valve outer portion and located below the first lower barrel valve seal. The first and second lower barrel valve seals define a lower barrel valve void volume located between those seals and the surfaces of the barrel valve and manifold abutting those first and second lower barrel valve seals. A bottom manifold vent passage may extend through the second manifold portion and be placed in fluid communication with the lower barrel valve void volume. A lower, barrel valve vent passage may extend through the second barrel valve portion and be placed in fluid communication with the lower filter cap void volume and the lower barrel void volume when the barrel valve is in the second position.

The assembly with the filter cap preferably has the bottom manifold vent passage and barrel valve vent passage radially aligned when the barrel valve is in the second position. The first manifold inner surface preferably has a diameter smaller than the second manifold inner surface and the first portion of the barrel valve has a first inner diameter that is smaller than an inner diameter of the second portion of the barrel valve, and the first portion of the filter cap has a diameter that is smaller than the diameter of the second portion of the filter cap.

BRIEF DESCRIPTION OF THE DRAWINGS

These and other features and advantages of the invention will become more apparent in light of the following discussion and drawings, in which like numbers refer to like parts throughout, and in which:

FIG. 20 is a sectional view of a filter cartridge and the filter cap of FIG. 19;

FIG. 21 is a sectional view of the filter cap of FIG. 19;

FIG. 27 is a sectional view of the manifold of FIG. 23 taken along axis 14'.

DETAILED DESCRIPTION

Figure 1:
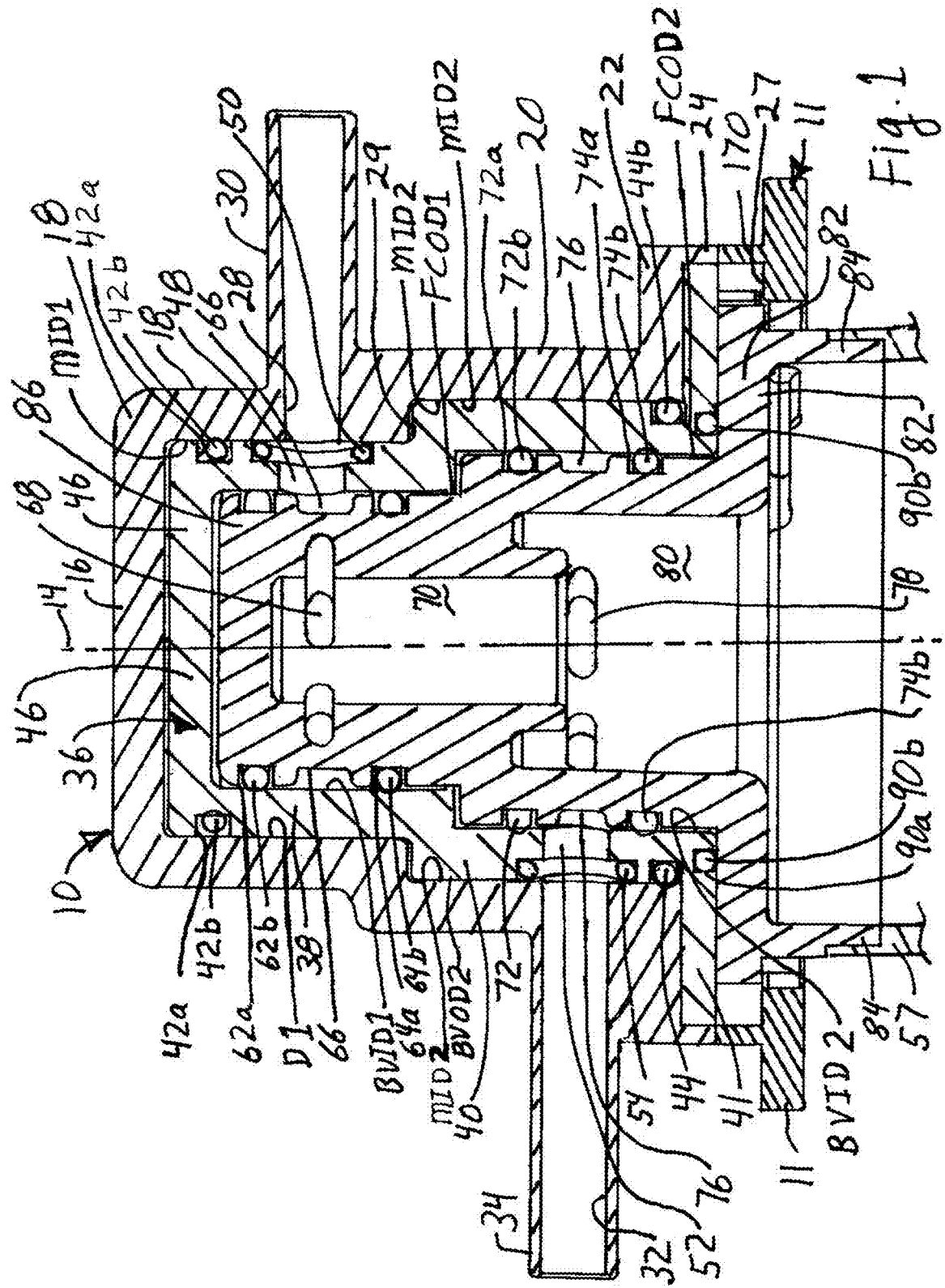
FIG. 1 is a sectional view of manifold head mated with a barrel valve and filter cap.

Referring to FIGS. 1-3, 6-7 and 11-12, a filter manifold head 10 is connected to a manifold base 11. The manifold head 10 has a sidewall 12 (FIGS. 11-12) encircling longitudinal axis 14 and connected to end wall 16 to close one end of the manifold head and form a hollow interior with an opening opposite end wall 16. The sidewall 12 may have a first generally cylindrical portion 18 adjacent the end wall 16 and having a first interior diameter MID1 (Manifold Inner Diameter 1). The sidewall 12 may have a second portion 20 adjoining the first portion and closer to the open end of the manifold head with the second portion 20 having a second interior diameter MID2 (Manifold Inner Diameter 2). Advantageously MID2 is greater than MID1 and the end wall 16 is orthogonal to the longitudinal axis 14. Advantageously an outwardly extending mounting flange 22 encircles at least part of and preferably the entire open end of the manifold head 10. The mounting flange 22 advantageously has a skirt or sidewall or flange 24 depending parallel to axis 14 in a direction away from end wall 16. The sidewall 24 may have an internal diameter MID3 (Manifold Inner Diameter 3). Advantageously the diameter MID3 is greater than diameter MID2. The manifold sidewall 12 and sidewall portions 18, 20, 24 encircle and are centered along the longitudinal axis 14.

As used herein the relative terms inner and outer, inward and outward refer to relative directions toward and away from longitudinal axis 14, respectively or the position relative to that axis. The relative terms up and down, above and below, top and bottom refer to directions along longitudinal axis 14 when in the vertical position as shown in FIG. 1 or positions relative to such axial directions.

A first manifold flow passage 28 extends through the first manifold head sidewall 12 and through a first fitting 30 extending outward from the first sidewall. A second manifold flow passage 32 extends through the second sidewall portion 20 and through second fitting 34 extending outward from the second sidewall portion 20. The fittings 30, 34 are preferably generally cylindrical tubes sufficiently stiff so that flexible hose may be forced over the fittings to form fluid connections. The fluid flow passages 28, 32 may be of various cross sectional shape, but are preferably generally cylindrical passages. More preferably the flow passages 28, 32 may have a diameter that increases as the flow passages extend away from the manifold head through the sidewall and associated fittings 30, 34. The flow passages 28, 32 are thus preferably slightly conical in shape, expanding outward away from longitudinal axis 14. As shown in FIG. 1, and more readily seen in FIGS. 1 and 6, the flow passages 28, 32 are tapered along the fitting length while the flow passage 32 is generally cylindrical and constant along the fitting length. This slight taper in one flow passage is believed advantageous when the tapered flow passage is an outlet flow passage as it may create a slight venturi effect facilitating flow.

Depending on the specific use, the first fitting 30 and its flow passage 28 may form a flow inlet in which event the second fitting 34 and its flow passage 32 form a flow outlet. Conversely, the first fitting 30 and its flow passage 28 may form a flow outlet in which event the second fitting 34 and its flow passage 32 form a flow inlet. The fittings 30, 34 and their associated flow passages 28, 32 are preferably radially oriented relative to longitudinal axis 14, but could enter at a tangential angle in an orthogonal plane to that axis. Preferably, the first and second fittings 30, 34 are on opposing sides of the manifold head 10 and thus 180 degrees apart, but they could be at any orientation relative to each other. In the depicted embodiment the second fitting 34 and second flow passage 32 are located below the first fitting and first flow passage 32, and are adjacent to the mounting flange 22, while in comparison the first fitting 30 and its flow passage 28 are located closer to the end wall 16. The manifold head 10 is preferably molded of a suitable polymer material compatible with the intended use, such as polyethylene, polypropylene, ABS, nylon or other suitable plastic compatible with drinking water, and such molding typically results in the walls of the manifold head having generally uniform thickness.

A valve body, referred to herein as barrel valve 36 may be configured to fit within the inside of the filter manifold head 10. The barrel valve 36 may have a first portion 38 having a generally cylindrical outer diameter BVOD1 configured to nest closely with the first portion 18 of manifold head 10 which has an inner diameter MID1. The outer diameter is generally cylindrical but has grooves 42a in it as described later so it is referred to herein as generally cylindrical or cylindrical and references to the cylindrical surface in which such grooves 42 (44, 50, 62, 64, 72, 74, 9, 104, 106 etc. as described later) are located includes the groove unless otherwise noted as by defining the grooves in the surface. A clearance between BVOD1 and MID1 of about 0.010-0.015 in (about 2-4 mm) is believed suitable, but the clearance will vary with manufacturing tolerances, materials and conditions of use, as is the case with the other clearances discussed herein. The barrel valve 36 may have a second portion 40 having a generally cylindrical outer diameter BVOD2 configured to nest closely with the second portion 20 of manifold head 10 which has an inner diameter MID2. The second portion 40 is generally cylindrical but has grooves 74a as described later so it is referred to herein as generally cylindrical. A clearance between BVOD2 and MID2 of about 0.010-0.015 in (about 2-4 mm) is believed suitable. BVOD2 is larger than BVOD1. At the bottom of the barrel valve body 36 is an outwardly extending flange 41 used to connect the barrel valve to the manifold base 11, as described later.

The outer surface of barrel valve may have one or more grooves to receive and hold seals that prevent fluid flow past the seals and between the manifold head 10 and barrel valve 36. Advantageously, first seal groove 42a is located at the top of the barrel valve 36 in the first portion 38 and is configured to hold a seal 42b. The first seal groove 42a is located above the first flow passage 28 and any seal associated with that flow passage. A second seal groove 44a is located at the bottom of the barrel valve 36 in the second portion 40 and is configured to hold a seal 44b. The groove 44a is preferably in the same orthogonal plane as flange 22. The groove 44a is preferably below the second fluid passage 32 and any seal associated therewith. The grooves 42a, 44a encircle the circumference of the barrel valve 36 and are orthogonal to the longitudinal axis 14 during use. The cross sectional shape of the grooves 42a, 44a can vary, as can the cross-sectional shape of the seals 42b, 44b. Preferably the grooves 42a, 44a are rectangular in cross-sectional shape and the seals 42b, 44b are circular in cross-sectional shape to form O-ring seals 42b, 44b. The seals 42b, 44b are configured to form a fluid seal between the outer surface of the barrel valve 36 and the abutting surfaces of the manifold head 10. The barrel valve 36 has a top end 46 having a top surface that is immediately adjacent to the inside surface or lower surface of end of 16 of the manifold head 10 during use.

A first valve body flow passage 48 extends through the first portion 38 of the barrel valve 36 at a location that coincides with the location of the manifold head first flow passage 28 when the barrel valve is nested inside the manifold head. The valve body flow passage 48 is preferably aligned with the first manifold head flow passage 28, both of which are preferably radial. The outer surface of the barrel valve 36 has a recess 50a in the face of the barrel valve that encircles the first valve body flow passage 48 and a first valve body passage seal 50b (FIG. 6) fits therein to encircle the flow passage 48 and to form a fluid seal around the periphery of the juncture of first flow passages 28, 48. The seal 50b is preferably a face seal formed in barrel valve body 36 and comprising an O-ring seal but ring seals with other cross-sectional shapes can be used.

A second valve body flow passage 52 extends through the second portion 40 of the barrel valve 36 at a location that coincides with the location of the manifold head second flow passage 32 when the barrel valve is nested inside the manifold head. The valve body flow passage 52 is preferably aligned with the second manifold head flow passage 32, both of which are preferably radial. The outer surface of the barrel valve 36 has a recess 54a in the face of the valve 36 that encircles the second valve body flow passage 52 and further has a second valve body passage seal 54b (FIG. 6) that fits therein to encircle the flow passage 52 and to form a fluid seal around the periphery of the juncture of second flow passages 32, 52. The seal 54 is a face seal formed in the outer surface of barrel valve 36 and interposed between the outer surface of the barrel valve 36 and the inner surface of the manifold head and encircling the juncture of the passages 52 and 32. The seal 54b is preferably an O-ring seal but ring seals with other cross-sectional shapes can be used. The recesses 50a, 54a may have a curved bottom to allow the seals 50b, 54b to curve with the generally cylindrical outer surface of barrel valve 36 and seal well against the inside generally cylindrical surface of the manifold head 10. The seal 42b is located above seal 50b, and seal 44b is located below seal 54b so the seals do not impede each other's performance. The seals 50b, 54b are in planes orthogonal to longitudinal axis 14 while seals 50b, 54b are in curved planes concentric with longitudinal axis 14.

Figure 2A:
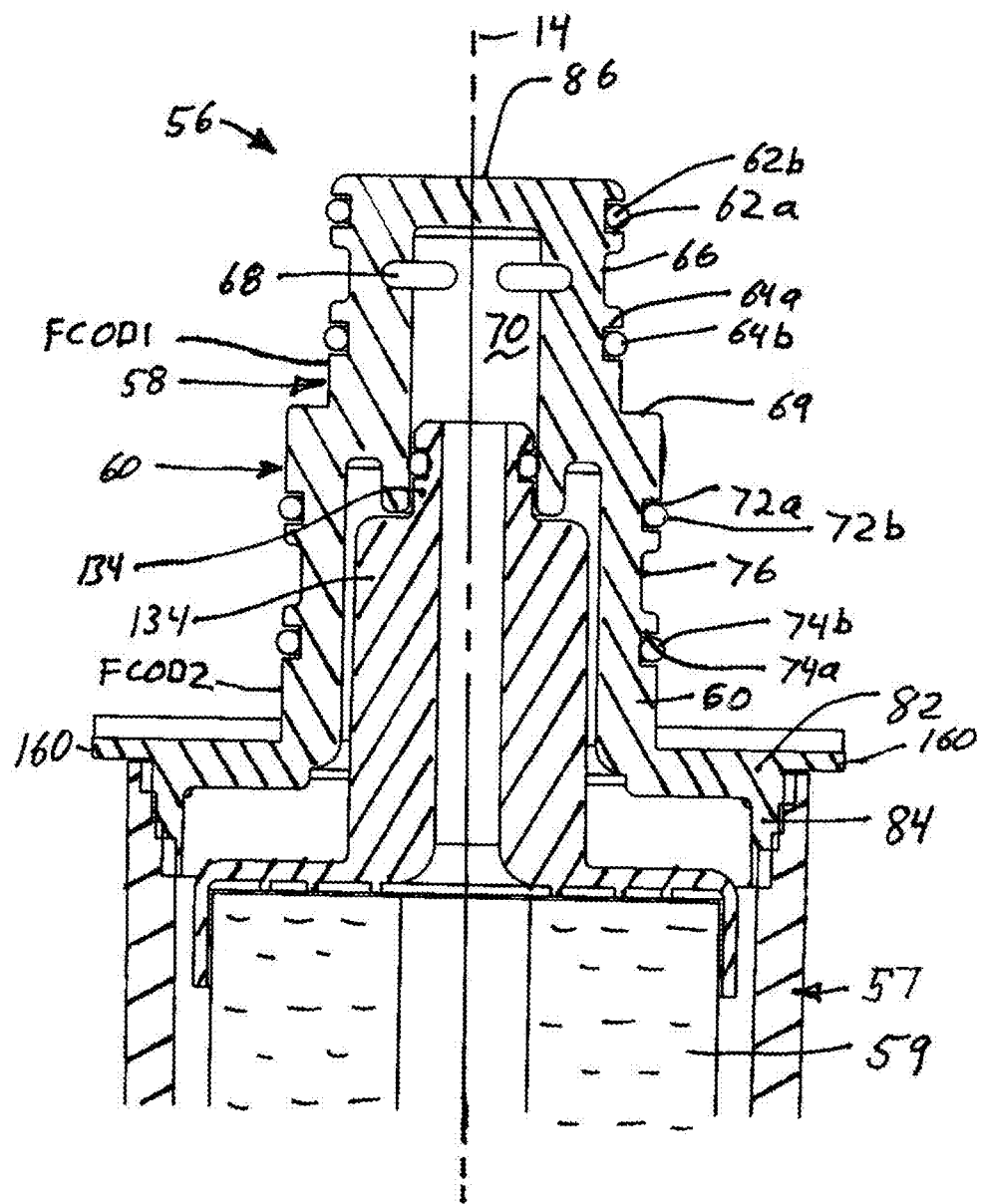
FIG. 2a is a sectional view of the filter cap of FIG. 1 mated with a filter cartridge.
Figure 2B:
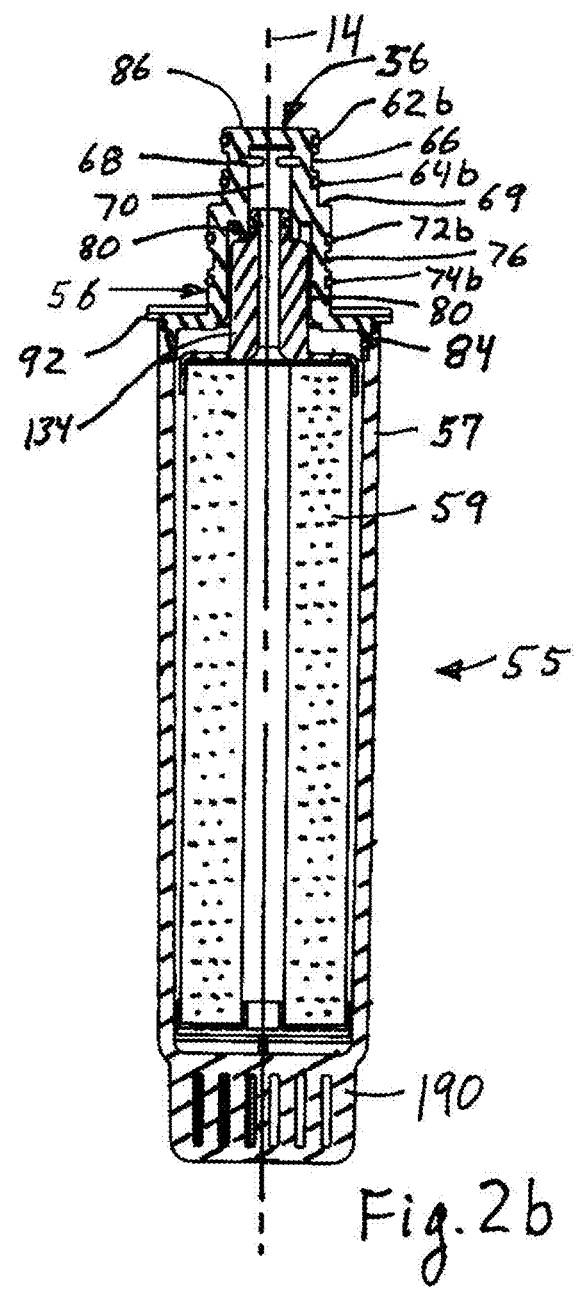
FIG. 2b is a sectional view of the filter cap of FIG. 2a with a filter.

The first portion 38 of barrel valve 36 has a generally cylindrical inner surface having an inner diameter BVID1 (Barrel Valve Inner Diameter 1). The second portion 40 of barrel valve 36 has a generally cylindrical inner surface having an inner diameter BVID2 (Barrel Valve Inner Diameter 2). These surfaces are sized to nest with corresponding surfaces on filter cap 56 that is configured to nest inside and seal against barrel valve 36. The filter cap 56 is configured to be connected to a filter cartridge 55 (FIGS. 2a-2b) having a filter housing 57 containing a filter element 59 (FIG. 2b).

Filter cap 56 has a first generally cylindrical outer portion 58 configured to fit inside and nest with the inside surface of first portion 38 of barrel valve 36. Filter cap 56 has a second, generally cylindrical outer portion 60 configured to fit inside and nest with the inside surface of second portion 40 of barrel valve 36. The second portion 60 is generally cylindrical but has grooves and a channel in it as described later so it is referred to herein as generally cylindrical portion 60. The outer diameter of the first, generally cylindrical, outer portion 58 of filter cap 56 is FCOD1 (Filter Cap Outer Diameter 1) and the outer diameter of the second outer portion 6 of filter cap 56 is FCOD2 (Filter Cap Outer Diameter 2). FCOD 2 is greater than FCOD1. A clearance between BVID1 and FCOD1 of about 1-5 mm is believed suitable, with the clearance increasing as the diameter of the mating parts increases. A clearance between BVID2 and FCOD2 of about 1-5 mm is believed suitable, with the clearance increasing as the diameter of the mating parts increases. The clearance will depend on the fit required by the seals to achieve a water-tight fit between the mating parts.

The first portion 58 is generally cylindrical but has grooves and a channel in it as described later so it is referred to herein as generally cylindrical portion 58. The first portion 58 of the filter cap 56 contains a first pair of spaced apart, circumferential grooves, first and second grooves 62a, 64a respectively, containing first and second seals 62b, and 64b, respectively. As used herein the term "seal" may be used to refer to either the seal member such as seal member 62b or 64b, or it may refer to the seal member and any accompanying (but optional) groove 62a, 64a. Between the grooves 62a, 64a is a first filter cap fluid channel 66 also formed in the outer surface of the first portion 58 of the filter cap 56. The first fluid channel 66 encircles at least a substantial portion (over about 70% of the total circumference) of the cap 56 and preferably extends around a circumference of that cap 56 at the location of that first channel. The first filter cap fluid channel 66 may be located in the same orthogonal plane as the first fluid passages 28, 48 and is in fluid communication with the first fluid passages 28, 48. The first and second seals 62b, 64b are on opposing sides of the first filter cap fluid channel 66, above and below that channel to prevent fluid from the first passages 28, 48 from leaking axially past the seals 62b, 64b. One or more filter first cap openings 68 extend inward through the walls of the first portion 58 of filter cap 56 to place a first internal passage 70 of filter cap 56 in fluid communication with the annular channel 66 and first fluid passages 48 and 28. The first internal passage 70 is formed at least in part by first inner generally cylindrical walls centered on longitudinal axis 14 and located to mate with a nozzle of a filter cartridge as described later. The second portion 60 is larger in diameter than the first portion 58 so there is a lateral or radial offset forming shoulder 69 (FIGS. 3b and 10) which adjacent manifold shoulder 29 during use. The lateral offset is optional as the first and second portions 58, 60 could be the same diameter, the diameter of the first and second portions 38, 40 of the barrel valve and could be the same, and first and second portions 18, 20 of the manifold head could each have the same diameter.

The second portion 60 of the filter cap 56 contains a second pair of spaced apart, circumferential grooves, third and fourth grooves 72a, 74a respectively. Third and fourth grooves 72a, 74a contain third and fourth seals 72b, 74b, respectively. Located between the third and fourth grooves 72a, 74a is a second filter cap fluid channel 76 also formed in the outer surface of the second portion 60 of the filter cap 56. The second filter cap fluid channel 76 encircles at least a substantial portion (over about 70% of the total circumference) of the cap 56 and preferably extends around a circumference of that filter cap 56 at the location of the second channel. The second filter cap fluid channel 76 may be located in the same orthogonal plane as the second fluid passages 32, 52 and is in fluid communication with the second fluid passages 32, 52. The third and fourth seals 72b, 74b are on opposing sides of the second filter cap fluid channel 76, above and below that channel to prevent fluid from the second passages 32, 52 from leaking axially past the seals 72b, 74b. One or more openings 78 extend inward through the walls of the second portion 60 to place a second internal passage 80 of filter cap 56 in fluid communication with the second annular channel 76 and second fluid passages 52, 32. The second internal passage 80 may have inner generally cylindrical walls extending along longitudinal axis 14.

The first and second seals 62b, 64b are configured to form a fluid seal between the outer generally cylindrical surface of the filter cap at the first portion 58 and the facing generally cylindrical surface of the barrel valve 36 so that fluid from the first passages 28, 48 flows into the annular channel 66. The third and fourth seals 72b, 74b are configured to form a fluid seal between the outer generally cylindrical surface of the filter cap at the second portion 60 and the facing generally cylindrical surface of the barrel valve 36 so that fluid from the second passages 52, 32 flows into the second annular channel 76. Fluid seals 62b, 64b between the first portions 38, 58 of the barrel valve 36 and filter cap 56 help define a first flow path through passages 28, 48, 66, 68 to first internal passage 70. Fluid seals 72b, 74b between the second portions 40, 60 of the barrel valve 36 and filter cap 56 help define a second flow path through passages 32, 52, 76, 78 to second internal passage 80. When first internal passage 70 is in fluid communication with the inlet of filter element 59, the second internal passage 80 is in fluid communication with the outlet of that filter element. When the first internal passage 7 is in fluid communication with the outlet of filter element 59, the second internal passage 80 is in fluid communication with the inlet of that filter element. The particular paths by which water is routed from the first or second passages 70, 80 through the filter 59 will vary with the particular configuration of filter cartridge 55 and is not described in detail herein.

Figure 7:
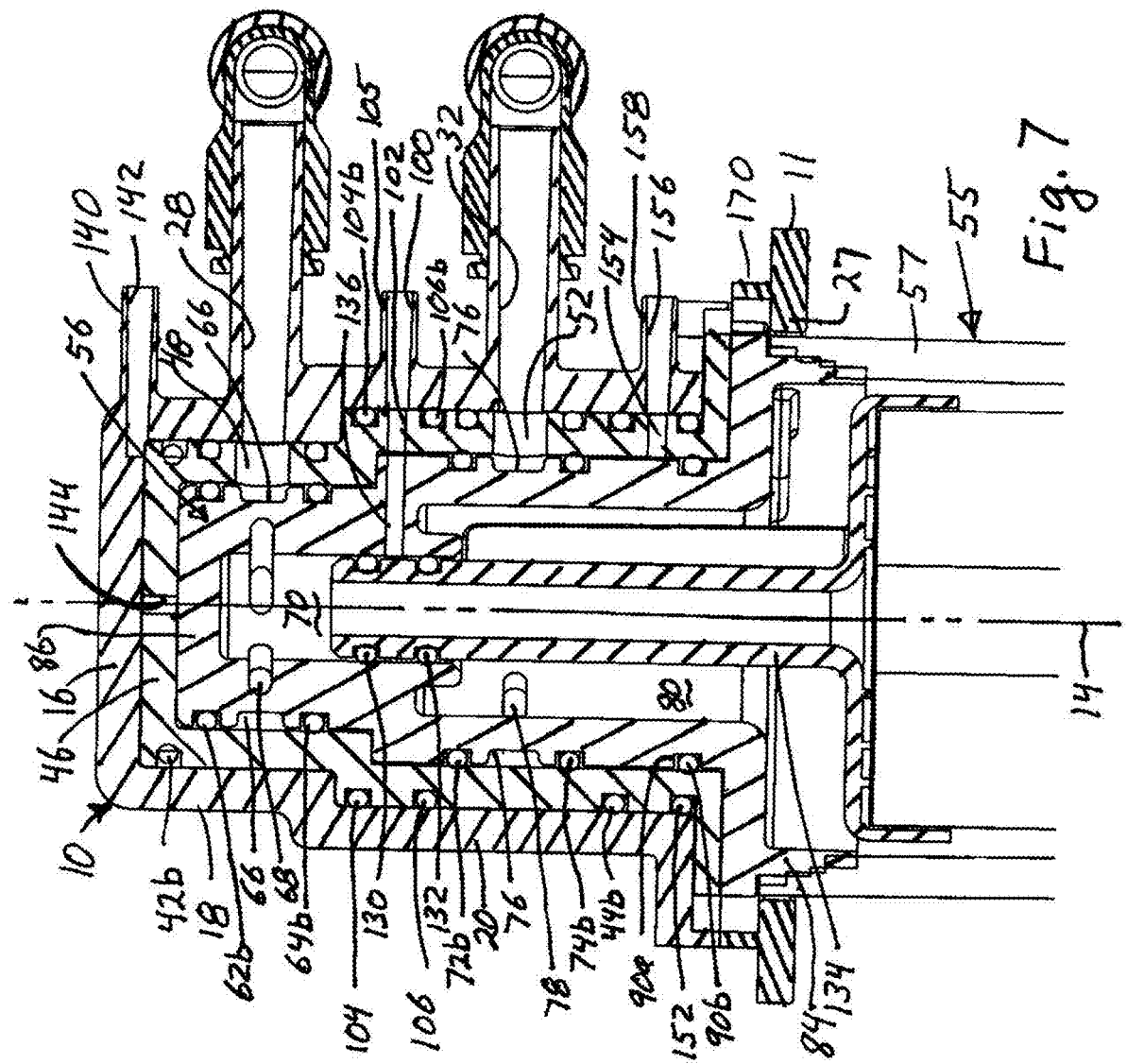
FIG. 7 is a sectional view of a manifold head mated with the barrel valve of FIG. 3a and the filter cap of FIG. 3b, and a vent tube between the seals encircling the inlet and outlet fittings which vent tube extends to a filter cartridge nozzle, with segments rotated so the vent aligns with first and second fittings.
Figure 8:
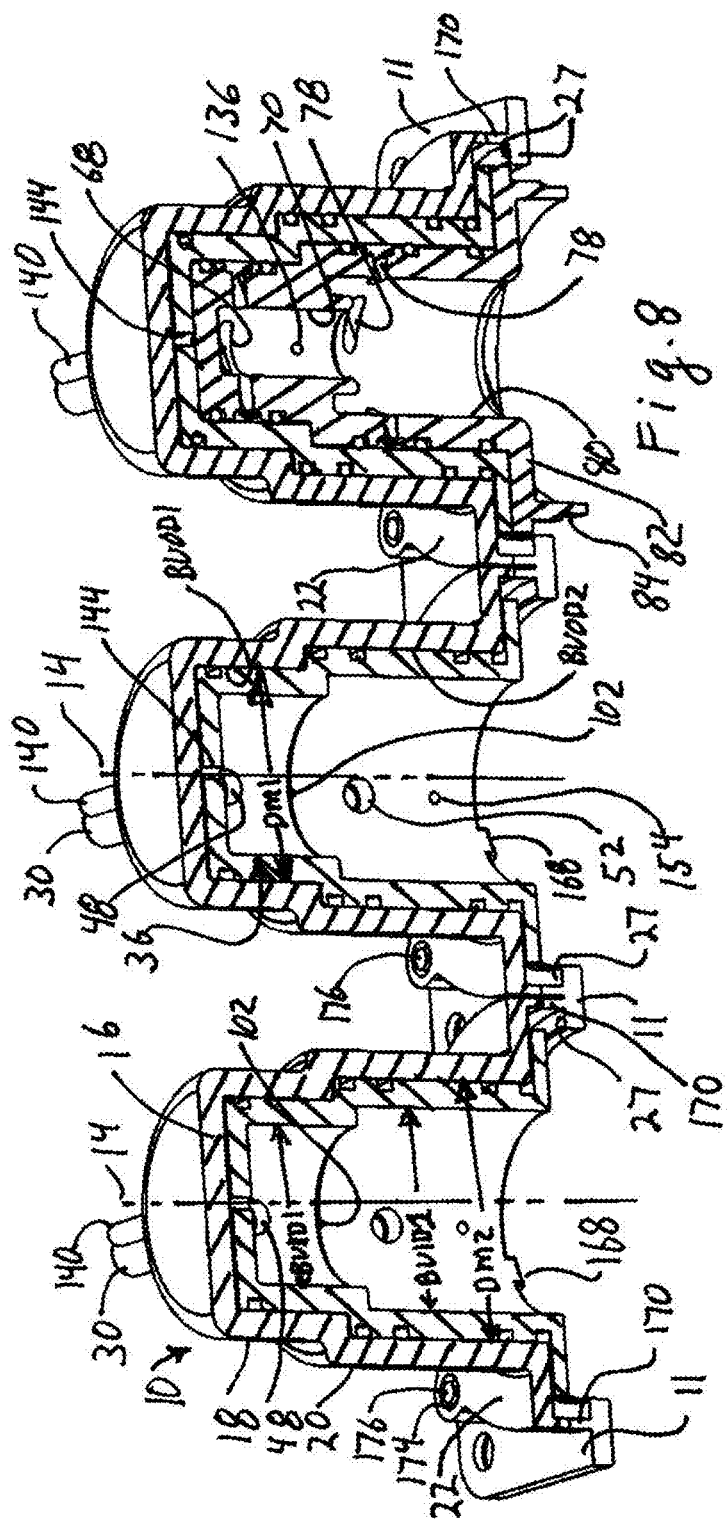
FIG. 8 is a perspective sectional view of a manifold base with three manifold heads and partial barrel valves in the heads.

An optional fifth groove 90a may contain an optional fifth seal member 90b, with the groove 90a encircling the circumference of the filter cap 56 so as to place the fifth seal member 90b at a location below the fourth seal member 74b and fourth channel 74a, yet at a location that seals against the barrel valve 36. As depicted in FIG. 1, the bottom edge of the barrel valve 36 is generally cylindrical and the fifth groove 90a is formed in that bottom edge of the barrel valve 36. It is believed suitable to locate the fifth groove 90a and outward extending flange 82 (FIG. 1) at the bottom of the filter cap or with the fifth seal 90 abutting the bottom of the barrel valve 36, or as shown in FIG. 7, to locate the fifth seal 90 below the lower seal 74 in the second portion 60 of the filter cap 56. The fifth seal 90 preferably comprises a fifth groove 90a and flexible seal member 90b to form a radial oriented, sliding seal if located on the sidewall of the second portion 60, or form an axial oriented seal if located on the laterally extending flange 82. It is believed preferable to locate that 90a groove and seal member 90b between the mating surfaces 60 of the barrel valve 36 and surfaces 40 of the filter cap 56 only if there is sufficient room below the fourth seal member 74b and the bottom end of the barrel valve. An axial facing seal located on lateral flange 82 allows a shorter filter cap 46 but is more difficult to form a fluid tight seal because axial pressure is required to compress the seal member 90*b*. The radial seal between sidewall portions 60, 40 requires no axial force other than to insert the parts together but it requires a longer filter cap, valve body and manifold head.

The cross sectional shape of the grooves 62*a*, 64*a*, 72*a*, 74*a*, 90*a* can vary, as can the cross-sectional shape of the seals 62*b*, 64*b*, 72*b*, 74*b* and 90*b*. Preferably the grooves 62*a*, 64*a*, 72*a*, 74*a* and 90*a* are rectangular in cross-sectional shape and the seals 62*b*, 64*b*, 72*b*, 74*b* and 90*b* are circular in cross-sectional shape to form O-ring seals 62*b*, 64*b*, 72*b*, 74*b* and 90*b*.

The first through fourth seals 62*b*, 64*b*, 72*b*, 74*b* offer a number of advantages. The first seal member 62*b* prevents fluid from entering the space between the top 86 of the filter cap and the top 46 of the barrel valve and that avoids an axial pressure that would tend to push the filter cap out of or away from the barrel valve 36 and manifold head 10. Moreover, The flow passages 78, 48, 66, 68 are located in substantially the same orthogonal or radial plane so that the entry or exit of water through those passages does not exert any axial force to urge the filter cap out of the manifold head and barrel valve. The force from pressurized water is exerted equally in opposing directions on the seals and surfaces defining the flow passages. The fluid pressure between the first and second seals 62*b*, 64*b* are predominantly reacted within the filter cap 56 since the upward force on seal member 62*b* is reacted by groove 62*a* and is offset by the downward force on seal member 62*b* that is reacted by groove 64*a*. Further, the first and second seals are the same diameter and coaxial so there is no substantial, un-opposed radial or laterally offset surface for the pressure to act upon and create a downward force to urge the filter cap 56 out of the barrel valve and manifold head. The first fluid passage thus enters or leaves the manifold head 10 in the radial plane to the axis 14 and the first and second seals help define that radial volume and the radial parts of the filter cap, barrel valve and manifold head counteracting the pressure forces from the fluid.

Likewise, the flow passages 32, 52, 70 and 78 are located in substantially the same orthogonal or radial plane so that the exit or entry of water through those passages does not exert any axial force to urge the filter cap out of the manifold head and barrel valve. The pressure on the first and second seals 62*b*, 64*b* are substantially the same since both seals have the same diameter and are coaxial, seal the same two parts and form a fluid tight cavity enclosing channel 66. This equalized pressure is believed to help the seals seal better and is believed to help reduce weeping of moisture past the seals by reducing pressure differentials between these paired seals.

Likewise, the fluid pressure between the second and third seals 72*b*, 74*b* are predominantly reacted within the filter cap 56 since the upward force on seal member 72*b* is reacted by groove 72*a* and is offset by the downward force on seal member 74*b* that is reacted by groove 74*a*. There is no substantial, unopposed, laterally offset surface for the pressure to act upon in an unopposed manner so to create an axial force urging the filter cap out of or away from the manifold head and barrel valve. The pressure forces from the fluid are reacted in predominantly radially directions. Likewise, the pressure on the first and second seals 72*b*, 74*b* are substantially the same since both seals have the same diameter seal the same two parts and form a fluid tight cavity enclosing channel 76. This equalized pressure helps the seals seal better and is believed to help weeping of moisture past the seals by reducing pressure differentials between these paired seals. The second fluid passage thus leaves or enters in the radial plane to the axis 14 and the third and fourth seals help define that radial volume and the radial parts of the filter cap, barrel valve and manifold head counteracting the pressure forces from the fluid.

The first set of seals 62*b*, 64*b* are preferably smaller in diameter than the second set of seals 72*b*, 74*b* and thus there is a laterally extending shoulder 69. But pressurized fluid is prevented from exerting an axial force on this shoulder 69 as it is located between the second and third seals 64*b* and 62*b*. Likewise, in the depicted design of FIG. 1 there is a lateral shoulder 82 at the bottom of the filter cap 56 but fourth seal member 74*b* prevents fluid pressure from exerting an axial force on that laterally or radially extending shoulder.

The radially or laterally oriented first flow paths 28, 48, 66, 68 and the laterally or radially oriented second flow paths 32, 52, 76, 78 provide lateral flow passage means for reducing axial forces that separate the filter cap 56 from the valve body 36 or from the manifold head 10 or both. The first pair of seals and corresponding grooves 62*a*, 62*b*, 64*a*, 64*b* having the same first diameter and the second pair of seal members and corresponding grooves 72*a*, 76*b*, 74*a*, 74*b* having the same second diameter provide first seal means for confining lateral flow passages to avoid unbalanced axial pressure on axial surfaces of the barrel valve, filter cap and manifold head as would urge the filter cap 56 and cartridge out of the manifold head 10 or barrel valve 36.

By having the flow passages enter in a radial plane that is generally orthogonal to the longitudinal axis 14, by using the first, second, third and fourth seals 62*b*, 64*b*, 72*b*, 74*b* to restrict the pressurized volumes to parts of the filter cap 56 that lack any appreciable lateral surface on which the pressure could generate axial forces to urge the filter cap away from the barrel valve 36 or manifold head 10 and by configuring the filter cap, barrel valve and manifold head so they lack the laterally extending areas within those sealed volumes, the axial force tending to push the filter cartridge 55 out of the manifold head 10 or barrel valve 36, is significantly reduced and desirably eliminated. Because the axial force along axis 14 is so greatly reduced or eliminated the retaining mechanism used to retain the filter cap 56 in the barrel valve 36 and manifold head 10 may be significantly reduced in strength and simplified. If mounting lugs 160 on the cartridge or filter cap 56 are used to releasably engage locking surfaces 168 on the manifold head 10 to retain the filter cartridge 55 in position, then the size and strength of the lugs 160 may be significantly reduced. The lugs 160 are preferably few in number, advantageously less than about 10, and preferably two, three or four lugs are used. Lugs having an axial thickness of about 3/32 to 1/8 inch are believed suitable, with a circumferential length of about 1/4 to 3/8 inch measured at the juncture with the cartridge cap 56 or to the body of the filter cartridge 55. Because the axial force from the water passing through the filter cartridge 55 is reduced the mounting tabs are configured to support the weight of the filter cartridge during use and environmental loads, but need not include any appreciable component for the ejection force from the water, and preferably is sized using less from 5-50% of the force normally attributed to the force from the water line pressure. Also, because the axial force is reduced by the radial entry and exit of the flow paths through the filter cartridge 55, the diameter of the filter may be increased well beyond five inches.

Referring to FIGS. 1, 2*a*, 2*b* and 6, the lower end of filter cap 56 has an outwardly extending flange 82 that forms a shoulder from which depends a skirt 84 (FIG. 2*a*) configured to connect to the cartridge housing 57. At the top end of the filter cap 56 is a top end 86 that has a top surface that is immediately adjacent to the inside surface or lower surface of end 46 of the barrel valve 36. Extending outward from the shoulder 82 is one or more, and preferably a plurality of the filter cap mounting lugs 160. The filter cap lugs 160 and slots 25 are correspondingly sized and located so the lugs 160 may pass axially through the slots 25 to engage and disengage the filter cap 56 from the barrel valve 36 and manifold head 10. When the filter cap 56 is advanced into the manifold head a distance so that the lugs 160 are on the upper side of a lip or locking surfaces 27 of the manifold base 11 which lip 27 surrounds the opening through which the filter cap 56 is inserted, then the filter cap 56 and filter cap lugs 160 may be rotated about axis 14 to releasably lock the filter cap to the manifold head. One or both of the edges of filter cap lugs 160 and the entrance to the lip or locking surface 27 may be inclined so that rotation of the filter cap and lugs causes the filter cap to advance further into the barrel valve 36 and manifold head 10 to seat the filter cap into an operating position. The incline may form cammed surfaces on one or both of the lugs 160 and locking surface 27 to provide a mechanical advantage to help overcome any resistance from the seals 62b, 64b, 72b, 74b and 90b and ensure the filter cap 56 is in the desired axial position. The top end 86 of the cartridge cap 56 and the shoulder 69 on the cap 56 can each serve to limit the distance that the cap 56 is inserted into the barrel valve 36 and manifold head 10.

Figure 6:
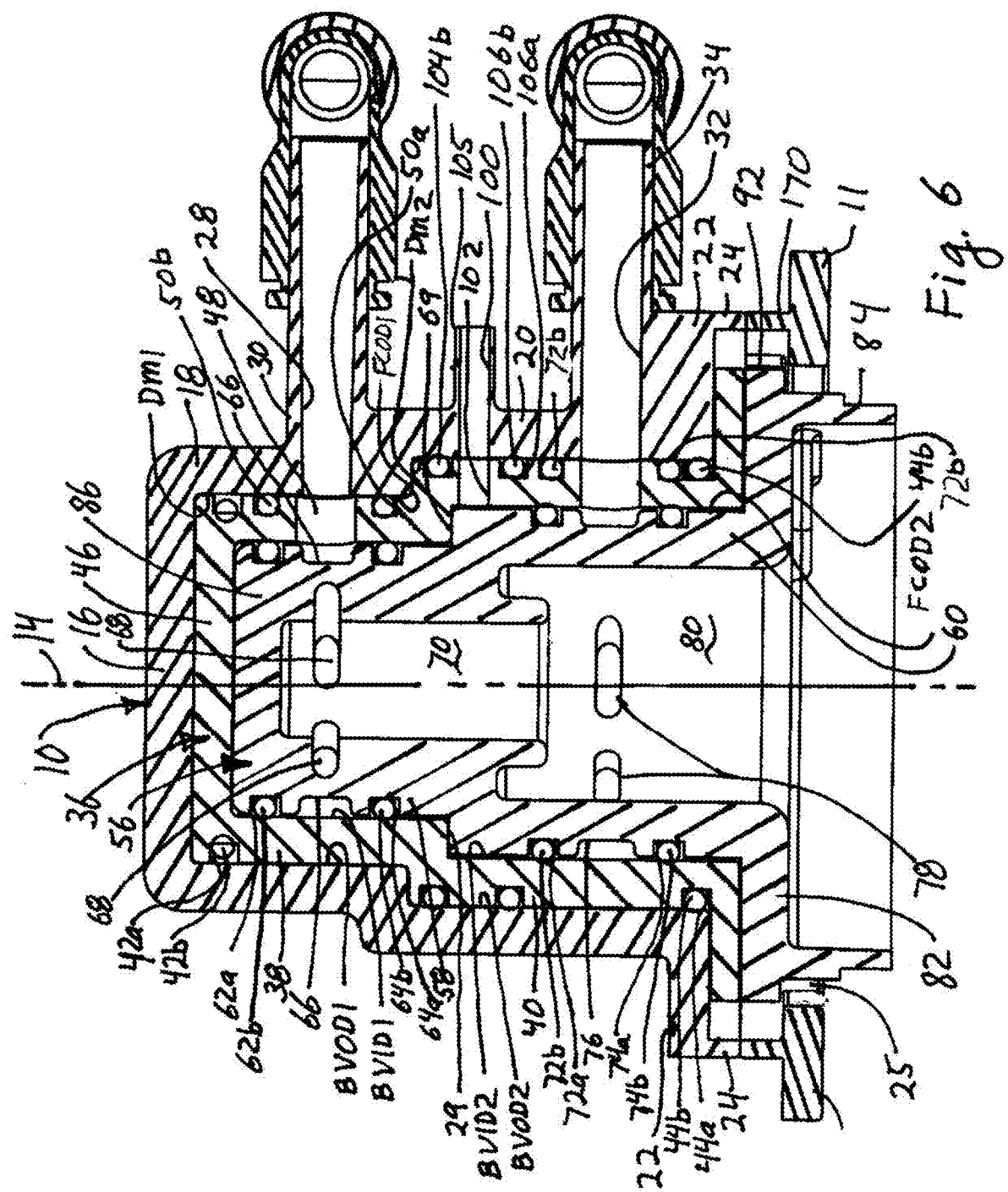
FIG. 6 is a sectional view of a manifold head mated with a barrel valve of FIG. 3a and the filter cap of FIG. 3b and a vent tube between the seals encircling the inlet and outlet fittings which vent tube extends to the barrel valve.
Figure 12:
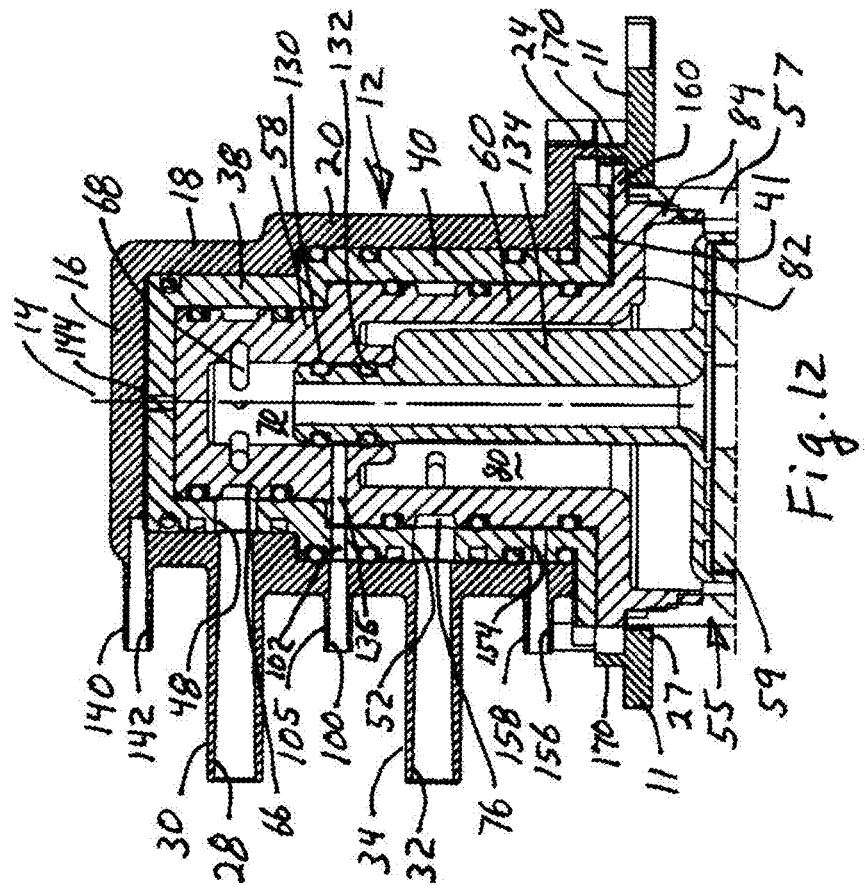
FIG. 12 is a sectional view taken along section 12-12 of FIG. 13b showing the barrel valve filter cap rotated to a full open flow position.

FIG. 1 shows the first and second fittings 30, 34 on opposite sides of the filter manifold head. If the annular flow channels 66 and 76 encircle the filter manifold head and axis 14 the fittings 30, 34 may be located anywhere around the circumference of the channel. FIG. 1 shows the fittings 30, 34 on opposite sides of the filter manifold head 10. FIGS. 6 and 12 show the first and second fittings 30, 34 on the same side of the manifold head 10. The fluid passage fittings 30, 34 and the vent fittings 140, 105, 158 described later are shown in the same plane for ease of description, but may be located at various relative orientations to make it easier to access the various fittings.

The manifold head 10 of FIG. 6 has the same basic parts as the manifold head of FIG. 1 and a detailed description of the parts common to both Figures is not repeated. The first fitting 30 forms first flow passage 28 which is in fluid communication with the first flow passage 48 through the barrel valve 36 and first filter cap fluid channel 66 and first filter cap openings 68 through the walls of filter cap 56. The second fitting 34 is located below fitting 30 and in the same radial plane. The second fitting 34 forms second flow passage 32 which is in fluid communication with the second flow passage 52 through the barrel valve 36 and second filter cap fluid channel 76 and second filter cap openings 78 through the walls of filter cap 56.

While the first ring seal member 62b prevents fluid from getting between the top end 86 and top end 46, it is possible some fluid may accumulate there over time by weeping of the seal, or a faulty seal or assembly may result in a leak of variable size. For some applications such as biological or pharmaceutical uses it is desirable to have the void between end 86 and end 46 as dry as possible, or to be able to determine if there was a leak as reflected by fluid within this space. The same applies to the void volume between second and third seals 64b, 72b and to the void volume between fourth seal member 74b and fifth seal member 90b. An access fluid passage may be formed to connect these void volumes with the outside or exterior of the manifold head 10. The access fluid passage is preferably formed by a series of aligned access openings extending at least through the intervening barrel valve 56 where fluid leaking into the void volumes would be visible through a window or viewing port in the manifold head 10. Preferably though, access fluid passage is preferably formed by a series of aligned access openings extending through both the intervening barrel valve 56 and the manifold head 10 so that fluid leaking into the void volumes could be conveyed to a location outside the manifold head 10. If the access fluid passageway to the void volumes is open to atmosphere and large enough to allow evaporation of the fluid then the access fluid passageway may be used as a drying mechanism to reduce the moisture in the void volumes sufficiently to inhibit the growth of undesirable organisms beyond acceptable limits. If desired, two access passages could be provided to each void volume and air, nitrogen or other gas passed through the void volumes and access passages to dry the void volumes. Inert nitrogen gas could even be blown over a heating element and passed through the access passages and void volumes to ensure dry void volumes if the inert and drying properties of the gas were warranted for the specific application.

Thus, referring to FIG. 6, a middle manifold ventilation passage 100 is formed through the sidewall 12 of the manifold head and is aligned with middle barrel valve ventilation passage 102 formed through the sidewall of the first or second portions 38, 40 of the barrel valve 36 and shown in FIG. 6 as extending through the sidewall of the second portion 40 of the barrel valve, just below the shoulder radially offsetting the body portions. To prevent leaks from the manifold and barrel valve ventilation passages 100, 102 between barrel valve 36 and manifold head sidewall 12, seals are placed above and below the vents. Thus, an upper ring seal 104b is placed in groove 104a encircling the barrel valve 36 above the juncture of the vent passages 100, 102. The seal 104b forms a fluid tight seal between the barrel valve and manifold head sidewall. A lower ring seal 106b is placed in groove 106a encircling the barrel valve 36 below the juncture of vent passages 100, 102. An O-ring seal is believed suitable for seals 104b, 106b. The seals 104b, 106b prevent moisture from entering the space between manifold head 10 and the barrel valve 36 through vent passages 100, 102. The seals 104b, 106b are thus interposed between the manifold head 10 and barrel valve body 36, preferably between the second portion 40 and sidewall 12.

The manifold and middle barrel valve ventilation passages 100, 102 are aligned to vent the middle filter cap void volume located between seals 64b and 72b and between the filter cap 56 and barrel valve 36. A generally cylindrical passage is believed suitable for middle vent passages 100, 102 and those passages are preferably radially aligned and orthogonal to axis 14. Advantageously the middle vent passage extends outward from the manifold head through a middle vent fitting or passage 105 to make it easier to apply positive or negative pressure to the middle void volume, as for example, to blow air or heated gas into the middle void volume or to apply a (slight) negative pressure. A tubular fitting 105 is shown.

In use, the upper or first fitting 30 forms the inlet port and the lower or second fitting 34 forms the outlet port for a filter cartridge. The middle vent passage is preferably a generally cylindrical vent passage 100, 102 about ⅛ inch diameter. The filter cap 56 is inserted into the barrel valve 36 along axis 14 until shoulder 69 on the filter cap abut the shoulder and rotated, which causes locking tabs on the filter cap 56 to engage locking stops on the barrel valve 36 to rotate the barrel valve until locking tabs on the barrel valve engaging locking stops on the manifold head in a use position in which the fluid passages to the first (inlet) fitting 30, second (outlet)

fitting 34 and middle vent fitting 105 are aligned so fluid can flow through them. The preferred fluid flowing through the various vent passages disclosed herein, is gas. A rotation of the barrel valve 36 of about 30 degrees is believed suitable for the barrel valve locking tabs to engage the manifold head stops, and a rotation of the filter cartridge of about 30 degrees is believed suitable to engage the filter cap locking tabs with the stops on the barrel valve, so the filter cartridge rotates a total of about 60 degrees—preferably clockwise, during installation. To disengage the filter cartridge, the cartridge is rotated the opposite direction (e.g., counter-clockwise) which causes the barrel valve 36 to rotate the same direction (e.g., counterclockwise) until the valve body hits a position stop at which point the filter cap continues to rotate the same direction (e.g., counterclockwise) until the locking tabs on the filter cap clear obstructions in the valve body so the filter cap and cartridge can be removed along axis 14 from the barrel valve 36 and manifold head 10.

Figure 4:
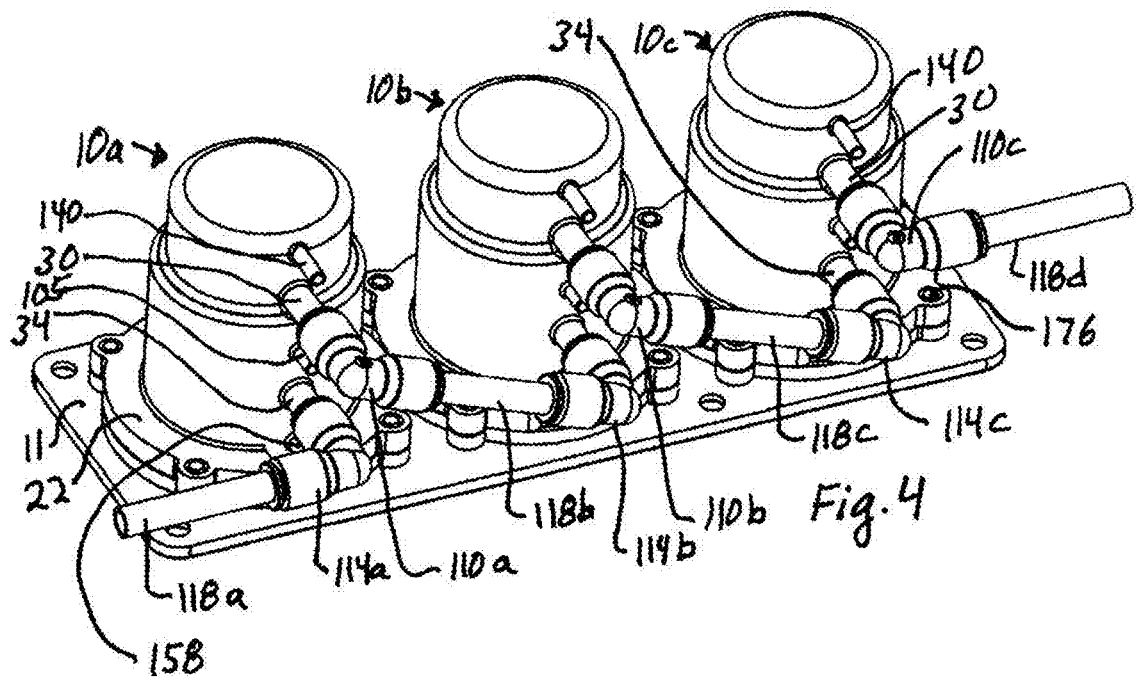
FIG. 4 is a perspective view of an assembly of three manifold heads of FIG. 1 with the manifold heads connected in series.
Figure 5:
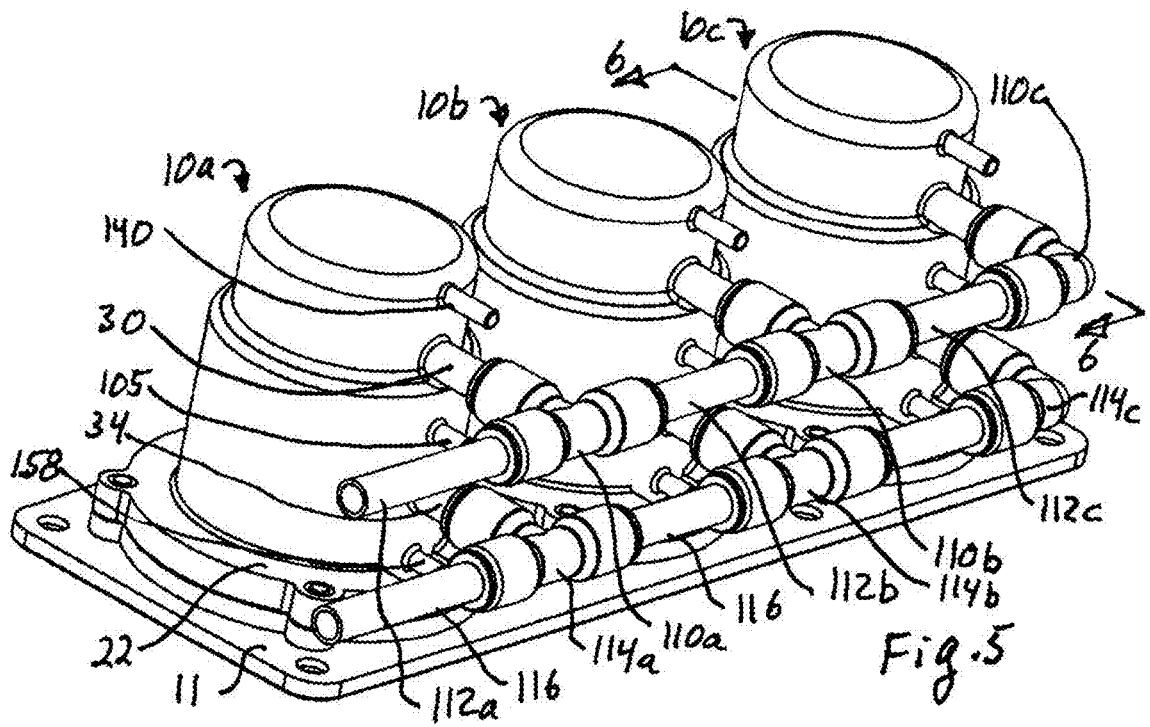
FIG. 5 is a perspective view of an assembly of three manifold heads of FIG. 1 with the manifold heads connected in parallel

FIGS. 4 and 5 show a plurality of filter manifold heads 10 connected to other manifold heads. The manifold heads may be connected in series (FIG. 4) or parallel (FIG. 5), or a mixture of both if desired (not shown). For the parallel connection of FIG. 5, all of the first fluid passages 30 are connected to a common first fluid passage and all of the second fluid passages are connected to a different but common fluid passage. Thus, the first fittings 30 are connected by a first coupling 110 to a first tube 112 which connects to each first coupling 110. The depicted coupling 110 is an elbow coupling having a first coupler connected to and axially aligned with a distal end of the first fitting 30 while the while other end of the coupling 110 has another coupler connecting to another tube (here series tube 118). The second fittings 34 are connected by a second coupling 114 which connects to a second tube 116 in a manner similar to the first coupling 110, the description of which is not repeated.

Any number of manifold heads may be coupled. In the depicted embodiment first manifold head 10a has its first fitting 30a in fluid communication with first coupling 110a and first tubes 112a and 112b. The second manifold head 10b has its first fitting 30b in fluid communication with first coupling 110b and first tubes 112b and 112c. The third manifold head 10c has its first fitting 30c in fluid communication with third coupling 110c and first tube 112c. The first couplings 110a and 110b are T fittings while 110c is an elbow fitting since manifold head 10c is at one end of the line of manifold heads connected by first tube 112. Likewise, first manifold head 10a has its second fitting 34a in fluid communication with second coupling 114a and second tubes 116a and 116b. The second manifold head 10b has its second fitting 34b in fluid communication with second coupling 116b and second tubes 116b and 116c. The third manifold head 10c has its second fitting 34c in fluid communication with second coupling 114c and second tube 112c. The second couplings 114a and 114b are T fittings while coupling 114c is an elbow fitting since manifold head 10c is at one end of the line of manifold heads connected by second tube 116.

For the series connection of FIG. 4, the first fitting 30 of one manifold head 10 is in fluid communication with the second fitting 34 of a different manifold head. Thus, the second fitting 34a of manifold head 10a is connected to tube 18a by second coupling 114a, while the first fitting 30a is connected to a different tube 18b by first coupling 110a. The tube 118b is connected to second fitting 34b of different manifold head 10b by second coupling 114b. The first fitting 30b of manifold head 10b is connected to first coupling 110b and tube 118c. The tube 118c is connected to the second fitting 34c of manifold head 10c. The first fitting 30c of manifold head 10c is connected to first coupling 110c and tube 118d. Thus, fluid flows through all the manifold heads 10a, 10b, 10c in series through the couplings 114 and tubes 118.

Referring to FIGS. 6-7 and 11-12, the middle vent passage may be extended through the wall of the barrel valve (when present) and through the wall of the filter cap 56. The filter cartridge has two, spaced apart seals 130, 132 (FIGS. 7, 12) on the neck 134 of the filter cartridge 55 to form a filter nozzle void volume between the seals 130, 132 and the adjacent and facing parts of the neck 134 and the inner surface of filter cap 56 bounded by and sealed against those two seals 130, 132. The filter cap has a generally cylindrical first filter cap inner surface forming cavity 70 into which the nozzle and seals 330, 132 of the cartridge 55 fit. Most of the parts are as described above and that description is not repeated. But the middle vent passageway is extended by filter cap vent passage 136 which extends through the wall of the filter cap 56 at a location which aligns middle vent passages 136, 102, 100 during use to form an access, preferably a direct, straight line access, to the filter nozzle void volume. The middle vent passages 100, 102, 136 are preferably a single aligned passage for simplicity of manufacture, with the passages passing through void volumes between each of the nested parts and preferably opening between the two spaced apart seals 130, 132. As the barrel valve 36 may be omitted in some configurations, the passageway 102 may be omitted in some configurations. Advantages of venting the filter nozzle void volume are discussed below.

Referring to FIG. 7, additional vents can be added to not just the middle void volume(s), but to the top and bottom void volumes, to either monitor leaks, confirm the lack of leaks, vent moisture, or introduce gas or fluid between the seals bounding inlet or outlet flow channels. The middle vent described above regarding FIG. 6, may be extended as shown in FIG. 7 to vent the void volume between the two, axially spaced, upper and lower nozzle seals 130, 132 on the tubular neck 134 of the filter cartridge 55 which tubular neck forms the fluid path to first filter cap openings 68 and first filter cap fluid channel 66. The seals 130, 132 may be referred to as spaced apart nozzle seals on the outer surface of the nozzle on the filter cartridge 55. The void volume between the seal 64 which seals the lower side of flow channel 66 and seal 72 which seals the top side of the flow channel 76 is vented by passages 100, 102 and middle vent fitting 105. The seals 130, 132 provide a fluid seal with the inside generally cylindrical cavity that is preferably formed inside upper portion of filter cap 56 and into which the neck 134 of the filter cartridge is removably inserted during use. Conventional filter cartridges often have a single seal on the nozzle 134 instead of the pair of spaced-apart seals 130, 132. The nozzle seals 130, 132 are spaced apart a distance sufficient to form a filter nozzle void bottom between the nozzle seals 130, 132 and the adjacent and facing walls of the nozzle 134 and filter cap 56 located between those nozzle seals. That filter nozzle void volume is vented by filter cap vent passage 136 in fluid communication with the other middle vent passages 100, 102. Preferably, the nozzle seals 130, 132 are spaced apart a distance of about 3/16 inch or more as measured between the closest portions of the grooves containing the seal members, in order to allow a filter cap vent passage 136 of about 1/8 inch to vent the void volume and allow for axial positioning errors along axis 14.

The filter cap vent passage 136 may be formed through one side of the filter cap 56, preferably through the lower, second portion 40 of valve body 36. The filter cap vent passage 136 preferably accesses a void volume formed between two seals on the filter nozzle in cavity 70 of the filter cap, and may be referred to herein as the nozzle vent passageway 136 or as filter cap middle vent passage 136. The vent passage 136 is preferably a radial oriented passageway aligned to be placed in fluid communication with, and preferably along a common longitudinal axis with, the barrel valve vent passage 102 through the barrel valve and manifold vent passage 100 through the manifold head, during use of the filter cartridge 55. The seals 130, 132 provide a seal on opposing sides of the filter nozzle void volume formed between those seals 130, 132 and between the neck 134 and the upper portion of the filter cap 56. The filter cap vent passage 136 passes through the wall of the filter cap 56 and is in fluid communication with that filter nozzle void volume. The vent passages 136, 102, 100 may be aligned to provide direct access to the filter nozzle void volume bounded by nozzle filters 130, 132 that are interposed between the nozzle and the mating surface of the filter cap 56.

Extending the middle vent passage to the filter nozzle void volume by aligning middle vent passages 100, 102, 136 provides multiple advantages and allows several uses. If there is a leak between the filter neck 134 and the filter cap 56 through seals 130, 132 then fluid will pass through the middle vent passages 100, 102, 136 and may be detected. This also allows testing the seal on the neck 134 of the filter cartridge 55. A leak sensor may be passed through a portion of or all of the aligned passageways if desired to expedite fluid transfer through middle vent fitting 105 or one or more of middle vent passages 100, 102, 136 forming that vent path. Similarly, if fluid is leaking into the void volume between seals 72b, 74b around channel 66 and between the filter cap 56 and the barrel valve 36 then the leak may be detected. Likewise, if fluid is leaking into the void volume between seals 104b, 106b which are interposed between the barrel valve and the manifold head that leak may be detected.

Still referring to FIG. 7, a top vent passage may also be provided. Seal 42b encircles the top end 46 of barrel valve 36 forming a top, barrel valve void volume between the top end 46 and the inside of the end wall 16 of the manifold head and the periphery of the seal 42b. A top vent manifold vent fitting 140 has a top manifold top manifold vent passage 142 extending through the fitting 140 and through the wall of the manifold head 10. The top manifold vent passage 142 is preferably generally cylindrical and extends radially through a side wall of the first portion 18 of the manifold head adjacent top wall 16.

A top filter cap void volume is formed between the top surface of top 86 of the filter cap 56 and the bottom surface of the top end 46 of barrel valve 36, with seal member 62b encircling the filter cap 56 to bound the filter cap void volume. The seal member 62b cooperates with seal member 62b to bound the flow channel 66, with the periphery of upper seal member 62b also preventing fluid from channel 66 from flowing into the top filter cap void volume when all parts work as intended. A top vent passage 144 extends through the top end 46 of barrel valve 36 to place the top filter cap void volume in fluid communication with the top barrel valve void volume, which is in fluid communication with top vent fitting 140 through top vent passage 142. If the top vent fitting 140 were formed parallel to axis 14 the vent passages 142, 144 could be axially aligned. But placing fitting 140 radially provides a reduced height assembly. If the top vent fitting 140 extended radially through a sidewall of the filter cap at a location above the top seal member 62b then the passages 142, 144 could be radially aligned, but doing so increases the height of the filter cap as the seal member 62b must be below the passage 144, and that increase in height is not preferred.

The lower seal member 74b encircles the filter cap below the channel 76. The gap between the mating filter cap 56 and barrel valve 36 may vent to atmosphere through the labyrinth path between the nested filter cap and barrel valve. But in the embodiment of FIG. 7 the axial length of the lower, second portion 60 of the filter cap 56 is increased as is the axial length of the second portion 40 of the barrel valve 36, as is the length of the second portion 20 of the manifold head 16. A filter cap base seal 90 is placed between the second portions 40, 60, and preferably comprises an O-ring seal 90a in a groove 90b formed in the second portion 60 of the filter cap. The seal 90 (or more accurately sealing member 90b) forms a bottom filter cap void volume that contains the gap between the second portions 60 and 40 of the filter cap and valve body, respectively. The ends of that gap are sealed by lower seal member 74b and filter cap base seal 90 to form the bottom filter cap void volume. A barrel valve base seal 152 is place between the second portions 40, 20 and preferably comprises an O-ring seal in a groove formed in the second portion 40 of the barrel valve.

The seal 90 forms a bottom filter cap void volume that contains the gap between the second portions 60 and 40 of the filter cap and valve body, respectively. The top and bottom ends of that gap are sealed by lower seal member 74b and filter cap base seal member 90b respectively, to form the bottom filter cap void volume. The seal 152 forms a bottom barrel valve void volume that contains the gap between the second portions 20 and 40 of the manifold head and valve body, respectively. The top and bottom ends of that gap are sealed by the lower seal 44b and barrel valve base seal 152, respectively, to form the bottom barrel valve void volume.

Lower vent fitting 158 extends outward from second portion 20 of manifold head 10. Bottom manifold vent passageway 156 is formed through the fitting 158 and through the sidewall 12 of the manifold, preferably through the second portion 20 of manifold head 10. The bottom manifold vent passageway 156 is preferably a radially oriented generally cylindrical passage, but as with the other vent passages, could have diverse shapes. The bottom manifold vent passageway 156 is in fluid communication with the bottom barrel valve void volume. A bottom barrel valve vent passageway 154 extends through the second portion 60 of the filter cap 46 and is in fluid communication with the bottom filter cap void volume and with the bottom manifold vent passageway 156. The bottom vent passageways 154, 156 are preferably radially aligned along a common longitudinal axis, but need not be so aligned. A face seal 155 may be formed in one of the barrel valve or manifold encircling one of the passageways 154, 156 to provide a fluid tight seal between those parts but allowing fluid to flow through the passageways 154, 156. The seal 155 is shown as formed in the barrel valve 36.

The top vent passages 144, 142 and the bottom vent passages 154, 156 may be used in any or all of the same ways as the middle vent passages 102, 100 to test for leaks or seepage into the void volumes accessed by the passages, or to test leaks or weeping past the seals forming the void volumes. As desired, wicking members, capillary action members or other sensor materials may be placed in any of the passages to identify leaks or weeping past the seals.

Further, the passageways may be used with air or other gases to test the seals forming the void volumes connected by the passageways, or the passageways may be used with air or other gases, at various temperatures, to dry the void volumes in fluid communication with the passageways, especially to reduce bacterial or mold growth in the void volumes. The passageways may be used in any combination to access any void volume.

The carbon filters used in most filter cartridges 55 absorb air so a pressure decay test or flow test monitoring the pressure or flow change between first and second fittings 30, 34 is difficult to accurately perform. Filter cartridges may be individually tested for leaks in a dunk tank where leaks are identified by bubbles forming at the location of the leak. But these tests require drying the cartridges after testing and risk contamination by the water used in testing and possible bacteria growth, thus discouraging the comprehensive testing of individual cartridges for leaks. Testing is thus by random sampling rather than individual testing of each filter cartridge 55 produced. It is believed that fewer than 5-10% of filter cartridges for appliances from an assembly line or production facility undergo testing. Referring to FIG. 7, the middle vent passage 100, 102, 136 allows testing the seal capability of the two, spaced apart nozzle seals 130, 132. The present improvements allow individual testing of the most likely leak locations of each cartridge produced, and readily allow testing half or more of the cartridges produced, and more preferably allow testing of over 90% of the cartridges produced.

The void volume between seals 130, 132 and the parts mating the inner and outer sides of those seals 130, 132 may be accessed through the middle vent passage 100, 102, 136, or combinations thereof—depending on whether the barrel valve and/or manifold head are present in the particular configuration in which the filter cartridge 55 is used. The void volume between the seals 130, 132b may be pressurized with a test fluid (gas and/or liquid) to see if the test fluid passes the seals 130, 132 with monitors at the first and second fittings 30, 34 or elsewhere along the flow paths in fluid communication with those fittings 30, 34. Because the void volume being pressurized is small the testing can be performed quickly and with small volumes of gas. While the pressurized volume is in the void area the tested seals or O-rings bound at least one side of the fluid flow path. As used herein, the term "pressurized" includes both positive pressure and negative pressure (i.e., partial vacuum or vacuum or suction). The small volume allows either pressurization method to quickly test the seal integrity, preferably requiring a few seconds per cartridge, and more preferably less than 5 seconds per cartridge to apply the pressure and monitor the pressure to evaluate the seal integrity.

Tracer gases such as noble gases may be used as test fluids with gas detectors used at the first and second fittings 30, 34. Alternatively, a test fluid, preferably a gas such as air, may be applied to the first or second fittings 30, 34 and the nozzle void volume accessible through the middle vent passage 100, 102, 136 can be checked for the presence of the test fluid (e.g., pressure increase) to evaluate the effectiveness or integrity of the seals 130, 132 and that does not depend on the absorption of the test fluid by the carbon filter. Using test gas compatible with the filter's use (e.g., helium, nitrogen, argon or other gases) and detectable by a sensor in communication with middle vent passage 100, 102, 136 is also believed suitable.

Alternatively, because the middle vent passage 100, 102, 136 connects void volumes which are bounded by seals between mating parts, the pressure decay of a test fluid placed in the middle vent passage may be monitored to test the effectiveness of the seals present in the system being tested. A flow test may also be used which measures the rate of flow needed to maintain a specified pressure applied to the middle vent passage. In addition to this testing, the vent passages offer the possibility of applying a positive pressure during use to reduce seepage or the possibility of flowing a drying gas during use to reduce growth of bacteria or mold or simply venting the void volume to ambient atmosphere to dry the void volumes. The vent passages communicating with ambient atmosphere may also allow moisture weeping past the seals defining the void volumes associated with the particular vent passage in question to evaporate and thus reduce or eliminate growth of bacteria or mold.

Similar tests may be performed using the top vent passage 142, 144 to test the integrity of seals 42b and or 62b forming the void volumes placed in fluid communication with the passages 142, 144. Likewise, similar tests may be performed using the bottom vent passage 156, 154 to test the integrity of seals 74b, 44b forming the void volumes placed in fluid communication with the vent passages 154, 156. Note that each of the void volumes has one seal which forms part of the flow passage in fluid communication with either the first fitting 30 or second fitting 34 and their associated flow paths through the filter cartridge. The central or middle void volume has two seals that form part of the flow passage in fluid communication with one of the fittings 30, 34. Thus, by using various combinations of one or more of the top, middle or bottom vent passages the seals defining fluid flow through the filter cartridge 54 may be tested. By performing such testing with a gas, such as air, an inert gas or other detectable gas compatible with the filter cartridge's use, each individual cartridge may be tested for leaks at the seals.

Because the void volumes are small the pressurization of the void volume may be achieved quickly and with small volumes of test gas. The pressure in the void volume may be monitored to see if the seals defining the void volume being tested leak because a leak would lower the test pressure while no pressure drop or a suitably low pressure drop indicates no leakage or acceptable leakage. Alternatively, the flow of gas needed to maintain the test pressure may be monitored and used to reflect the existence and size of a leak, with a low flow or no flow rate indicating an acceptable leak or no leak, and a higher flow rate indicating an unacceptable leak. If the seals defining the void volume hold pressure that indicates the seals don't leak. If the seals don't leak when the void volume is pressurized the same seals shouldn't leak when the fluid path defined by the void volume is filled with pressurized water. Thus, by pressurizing the void volumes and testing for leaks in the direction opposite the direction in which water would leak during use, the leakage during use is tested.

Instead of pressurizing the void volume with a test gas the filter can be pressurized with a test gas and the void volumes monitored to see if the pressure increases and reflects a leak or the void volume can be monitored to detect the presence if the test gas and optionally to test the amount of test gas in the monitored void volume as that reflects the size of the leakage. But pressurizing the cartridge requires more volume of test gas and the test gas may be absorbed by the filter and both aspects need to be taken into account if the entire cartridge is pressurized. Thus, if the absorption of the test fluid by the filter element is taken into account the testing may also include testing for leaks of the cartridge housing itself. Since the filter may retain the test gas, the test gas is preferably inert.

Air is a preferred test gas because of its ready availability and low cost. Nitrogen is a preferred test gas because of its inertness, but the nitrogen molecules are slightly larger than a water molecule so the leak testing is not completely accurate. Helium is a preferred test gas because of its inertness but the helium molecules are smaller than water molecules and that has the advantage of detecting even small leaks but the results are more conservative since leaks that occur with helium may not occur with water.

The leak testing can be achieved by inserting the filter cartridge 55 and neck 56 into a test head simulating, and preferably replicating the seals of the barrel valve or manifold head to be used with the filter cartridge. The test head would of course be provided with vent passages at the desired location of the void volume or volumes used for testing. Depending on the test arrangement the test head would also be provided with gas detectors (or fluid detectors if liquid is used) at appropriate locations in the void volumes or in the flow passages, depending on the test arrangement and what volumes were being pressurized with test gas and how leakage was being tested. If a test head is used then the filter cap 56 may omit seals 90 and test the filter cap by having the test head provide the lower seal 90 to create the bottom filter cap void volume bounded on the upper side by seal member 74b.

As shown in FIG. 6, the vent passages 100, 142 and 156 are preferably slightly tapered in diameter through the fittings 105, 140, 158, respectively. The taper is believed to make it easier to mold the manifold head 10, which is preferably molded of a suitable plastic material.

The prior art filter cartridges used two or three O-ring seals to form two flow paths with the middle O-ring seal separating the two flow paths. Depending on the filter construction the first flow path could be the inlet or the outlet flow path, with the second flow path being the other (the outlet or the inlet flow path). The above described construction uses four seals (62, 64, 72, 74), preferably O-ring seals, to form the two, first and second flow paths, resulting in two seals defining each flow path and a middle void volume between the middle two seals 64, 72. That middle void volume is preferably vented to a location outside the manifold head, by passages 100, 105 exiting through middle fitting 105, with the vent passage preferably extending to the nozzle void volume formed between nozzle seals 130, 132—by vent middle vent passage 136 or nozzle vent passage 136. The top filter cap void volume formed by top seal 62 interposed between the filter cap 56 and barrel valve 36 is preferably vented to a location outside the manifold head, by passages 144, 142 exiting through top fitting 140. The bottom filter cap void volume formed by seal 40 and seal 90 interposed between the filter cap 56 and barrel valve 36 is preferably vented to a location outside the manifold head by bottom vent passages 154, 156 exiting through bottom fitting 158. The passage 156 also vents the bottom barrel valve void volume formed by seals 44 and 152 interposed between the barrel valve 36 and the manifold head 10.

To expedite the identification of leaks or weeping, and to reduce the testing time, the void volume is preferably made as small as reasonably practical so that leaked test fluid passing one of the seals defining the void volume being vented is more quickly forced or transmitted to a location where it may be detected. Thus, the gap between the mating parts forming the void volumes is preferably small, but still large enough to make assembly of the mating parts practical for the user or manufacturer to make and/or assemble, depending on the part. The seals bounding the flow paths in fluid communication with first and second fittings 30, 34 and their associated flow paths are preferably as close together as practical to achieve the desired flow rate into and out of the filter cartridge. The vent passages are preferably small in order to allow a small amount of test fluid or water leaked during use to be more readily passed through the vent passages and detected. A diameter of about ⅛ inch is believed suitable for water filter cartridges 55 for household and small commercial uses, including refrigerators.

The first fluid passage 28, 48, 66 and 36 may form either a fluid inlet of unfiltered fluid to the filter cartridge 55 while the second fluid passage 78, 76, 52 and 32 forms a fluid outlet from the filter cartridge 55, or vice versa. The details of the fluid flow paths through the filter element 59 will vary with the particular configuration and location of the inlet, filter and outlet of the cartridge 55. But unless there is a bypass mechanism inserted into the manifold body 10, it is not desirable to have water flow through the manifold when no filter cartridge is in the manifold body 10. The depicted embodiment is configured to block flow when the filter cap and cartridge are removed and to open flow when the filter cap and cartridge are in the operative position, with the positions achieved by various lugs or tabs extending from the valve body and filter cap.

The filter cap 56 has filter cap locking lugs 160 extending outward from the periphery of base 82 of the filter cap. The base 82 is preferably circular with the filter cap locking lugs 160 extending outward from the periphery of the base 82 and preferably in the same plane as to base 82. The locking lugs 160 preferably extend a short distance, with a distance of about ⅛ to ¼ inch believed suitable, but the length can vary according to design. Preferably two equally spaced and opposing filter cap locking lugs 160 are used and they extend in the radial direction relative to longitudinal axis 14. More than two locking lugs 160 may be used as desired, with three and four locking lugs being known in the art.

The upper surface of the base 82 and each of the locking lugs 160 have a channel 162 extending along the length of and formed in the locking lug and base. A U-shaped channel 162 with opposing parallel sides and a flat bottom is shown and believed preferable. The channel 162 preferably extends along a radial direction relative to axis 14, along the center of each locking lug. Advantageously the bottom of filter cap 56 has a circular base 82 with inwardly stepped shoulders forming circular bosses of decreasing diameter below the base. The body of the filter cartridge 55 enclosing the filter material has an open end that advantageously abuts one or more of the stepped shoulders as is known in the art and is fastened thereto to form a water tight connection as is known in the art. An adhesive connection, a melted connection formed by friction welding, spin welding, or ultrasonic bonding is believed suitable.

Referring to FIGS. 3a, 3b and 10a, 10b and 10c, the locking lugs which hold the filter cap 56 to the barrel valve 36 and manifold head 10 are described along with an improved connecting mechanism to releasably connect and rotate the filter cap with the barrel valve. The base of barrel valve 36 has outwardly extending flange 41 which is shown as a generally annular flange extending radially outward. From at least one, and preferably from two or more equally spaced locations on the periphery of the flange 41 extend barrel valve locking lugs 164, with the flange 41 and lugs 164 preferably extending in a direction radial to axis 14. The barrel valve locking lugs 164 may match the number and location of filter cap locking lugs 160 on the filter cap, but that need not be the case. The barrel valve locking lugs have a downwardly extending flange 166 that advantageously extends a distance about the same as or slightly more than the axial thickness of the filter cap locking lugs 160.

Extending axially away from the bottom of the barrel valve 36 are one or more channel tabs 168. The channel tabs 168 are sized and located to fit into the channel formed in base 82 and filter cap locking lugs 160. The channel tabs 168 are thus preferably rectangular in shape and extend a distance about the same as the depth of the channel 162 in the base 82 and locking lugs 160 when the filter cap 56 is nested inside barrel valve 36 during use.

Referring to FIGS. 3 and 8-10, the barrel valve 36 has its locking lugs 164 setting in and retained in the manifold base 11 by a generally cylindrical wall 170 extending upward from the base 11 and encircling an opening 172 through which the filter cap is inserted into the manifold base 11 from the bottom side of the base 11. The generally cylindrical wall 170 is slightly larger in diameter than the distance between the opposing ends of the barrel valve locking lugs 164. The manifold opening 172 is large enough so the filter cap 56 can fit through the opening and mate with the barrel valve 36 during use. The generally cylindrical wall 170 is larger than the opening 172 so the manifold base 11 forms a horizontal lip or ledge or locking surface 27 on which the flange 166 of the barrel valve locking lugs 164 can rest and rotate during use. The wall 170 centers the barrel valve 36 on the opening 172. The manifold body 10 is positioned so its circular mounting flange 24 rests against the top of the generally cylindrical wall 170 to form a cavity in which the barrel valve locking lugs 164 are trapped for rotation.

The opening 172 is generally circular but has two (or possibly more) filter lug openings 173 (FIG. 10*a*, 10*b*) located to coincide with the location of the filter cap locking lugs 160. In the depicted embodiment there are two filter cap locking lugs 160 on opposing sides of the filter cap so there are two filter cap lug openings 173. The lug opening 173 is a generally rectangular arc extending radially outward beyond the diameter of the filter cap opening 172 in order to accommodate the passage of the filter cap locking lugs through the lug openings 173 along the axis 14 during use, as described later.

Figure 10A:
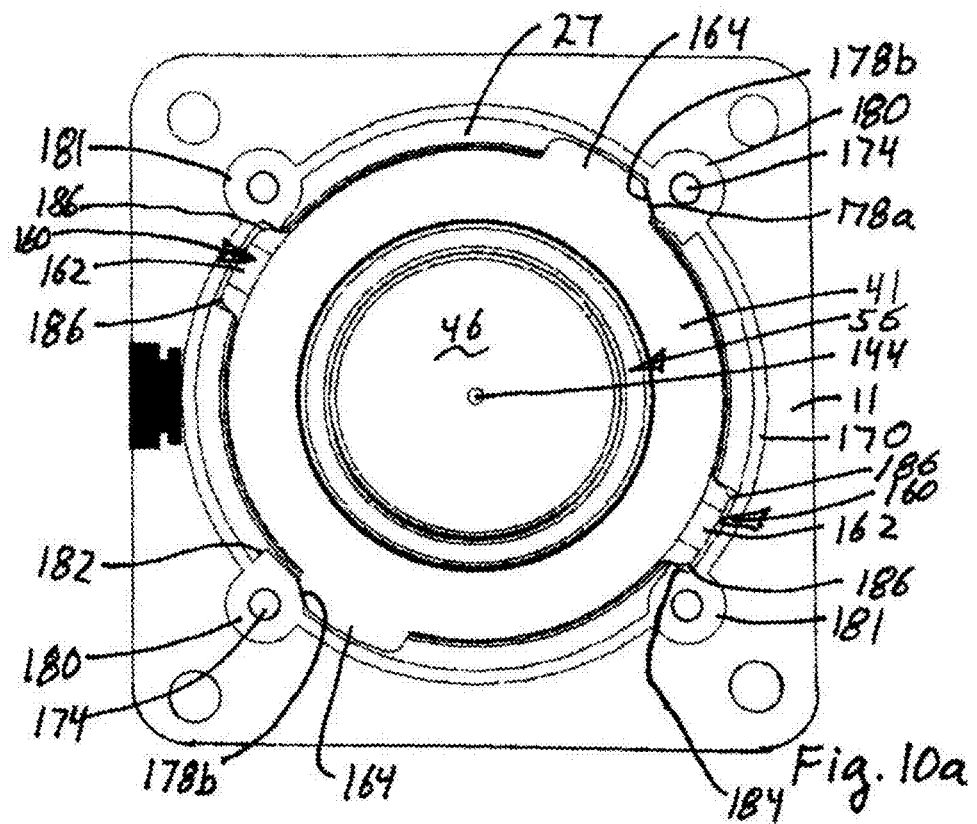
FIG. 10a is a top partial section view of FIG. 9 with the manifold head removed and showing the barrel valve rotated to a closed, no flow position.

The barrel valve body 10 is positioned by cooperative alignment of an alignment hole 174 in or through the mounting flange 22 on the manifold which cooperates with a positioning pin 176 extending upward from the manifold base 11. There are preferably at least two alignment holes 174 and mating positioning pins 176 for each manifold 10 when the manifolds are separately attached to the base plate. As seen in FIG. 10*a*, four alignment pins 176 are preferred so there are preferably four alignment holes 174. Fewer can be used if multiple manifolds are formed in a single piece assembly. Once the barrel valve body 36 is placed in the space encircled by wall 170 on the manifold base 11, the manifold flange 22 is aligned with the manifold wall 10 and the manifold 10 is fastened to the base so as to trap the barrel valve body 36 in the cavity formed by the flange 22 and wall 170. The fastening may be mechanical fasteners, welding, adhesives, melting or other connecting mechanisms. The parts are aligned so the manifold body 10 and barrel valve body 36 are aligned along the longitudinal axis 14. That construction allows barrel valve body 36 to rotate within the manifold 10 but restrains axial motion along longitudinal axis 14 and restrains lateral motion in the plane of the manifold base 11. Similar constructions which enclose the periphery of the barrel valve body 10 within a shaped cavity to effectively restrain all motion of the valve body except rotation about axis 14 may also be used. These constructions provide means for rotatably mounting the barrel valve body between the manifold body 10 and manifold base 11. In this configuration the channel tab 168 (FIGS. 3*a* and 8) extends downward.

Figure 9:
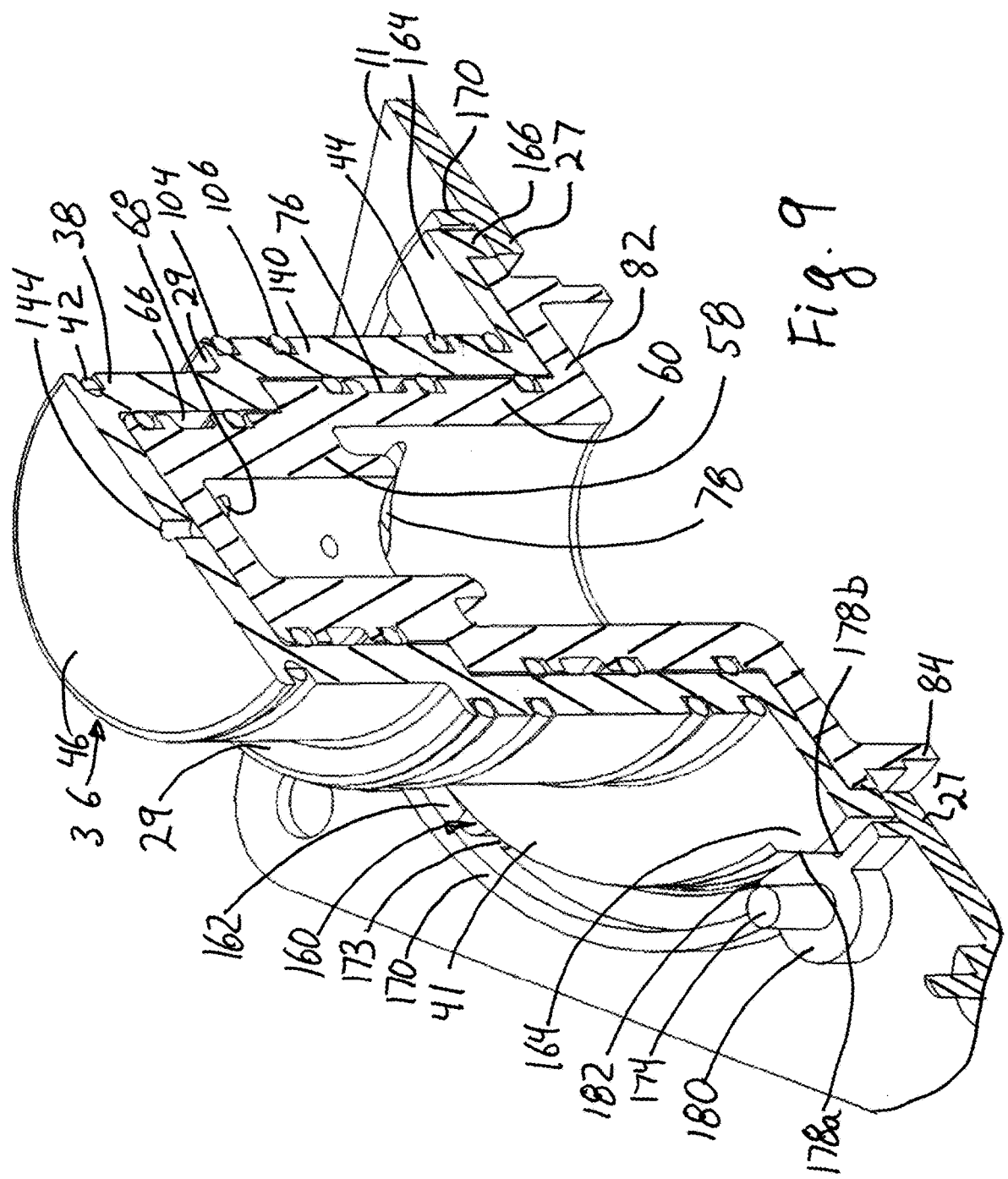
FIG. 9 is a sectional perspective view of a manifold base and filter cap.

The barrel valve 36 rotates between a first position blocking flow to the filter cap and a second position allowing flow to the filter cap. Referring to FIGS. 3 and 9-10, the barrel valve locking lugs 164 have a first movable stop face 178*a* on diagonally opposing corners of each lug 164 and flange 166 as best seen in FIG. 3*a*. The movable stop faces 178*a* face opposing directions. As best seen in FIGS. 9 and 10, the manifold base 11 has first and second pairs of shaped bosses 180, 181. The first bosses 180 are on diametrically opposing sides of wall 170 as are the second bosses 181. Each first boss 180 is about 90° from the adjacent second boss 181, in either the clockwise or counterclockwise direction.

Advantageously, a positioning pin 176 extends from each boss 180, 181. The first bosses 180 also form a first stationary stopping face 178*b* on the base 11. The first stationary stopping face 178*b* on the first bosses 180 are each located adjacent to but inside of the wall 170 so as to be in the circular path that the distal end of the barrel valve locking lug 164 rotates and abutting stopping face 178*a*. The two, second stopping faces 178*b* face opposing directions, one facing clockwise and the other facing counterclockwise. The stopping faces 178*a*, 178*b* are preferably inclined at the same angle so they abut along a flat surface when the faces contact each other. In the depicted embodiment the movable stopping faces 178*a* are at an angle of about 45° to the tangent of the barrel locking valve lug 164 on which the stopping faces 178*a* are formed.

Figure 10B:
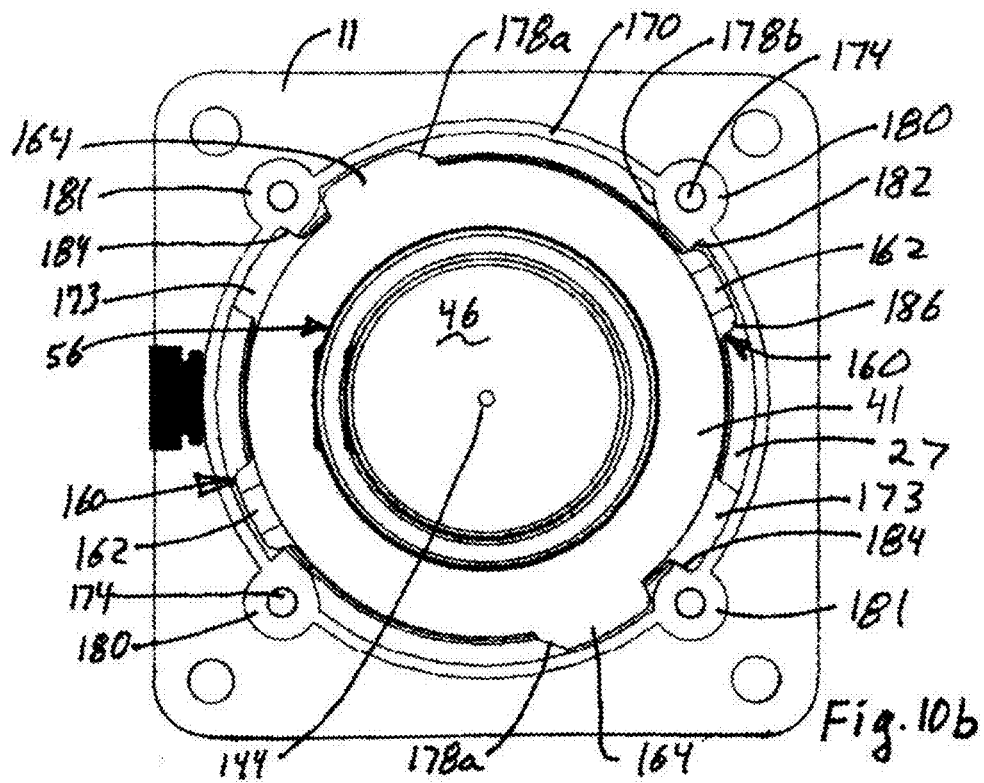
FIG. 10b is a top partial section view of FIG. 9 showing the barrel valve rotated to an open flow position.
Figure 10C:
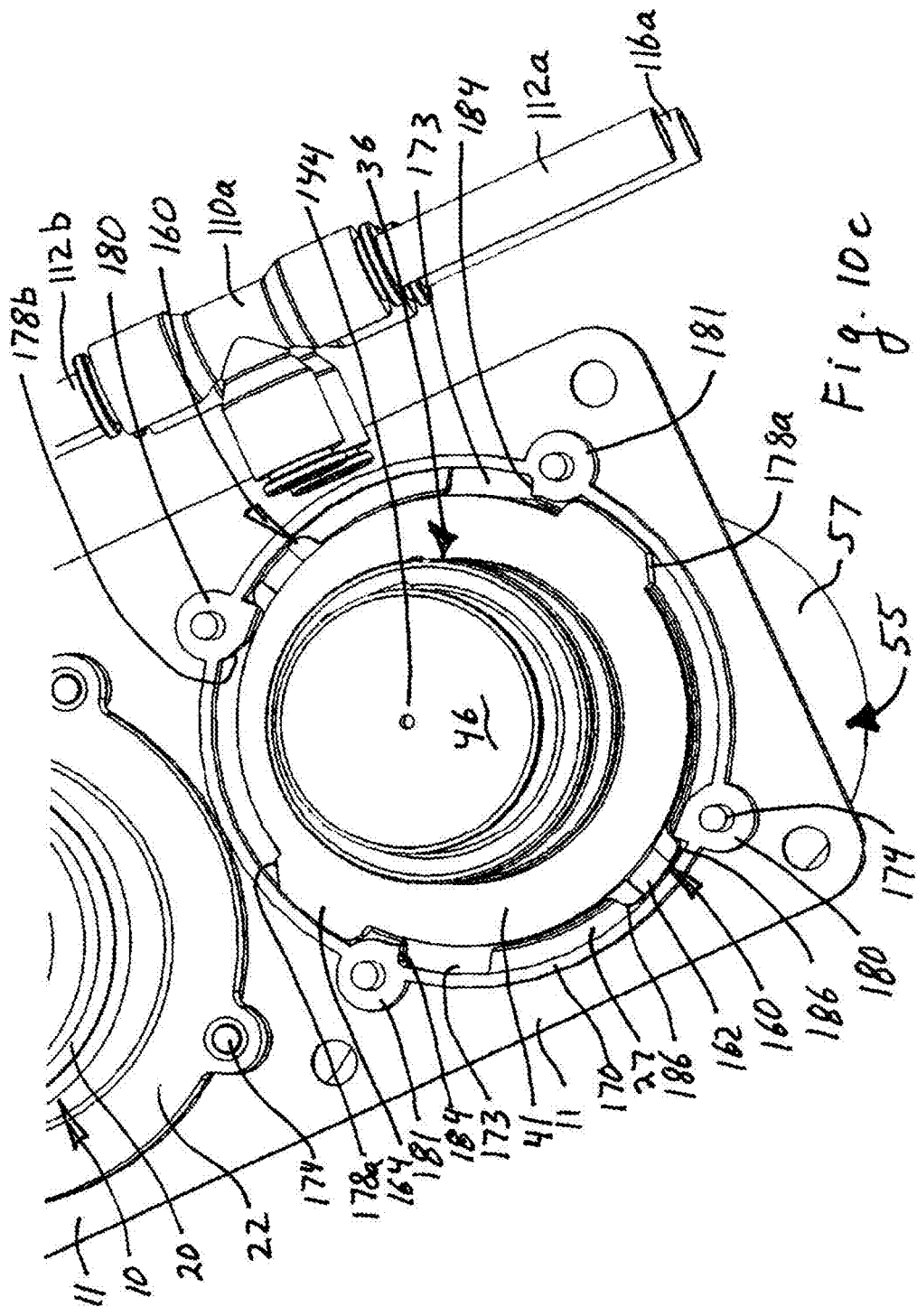
FIG. 10c is a top perspective view of FIG. 10b with the valve head in an open position and associated piping and with part of a manifold head in tact.

Advantageously, the bosses 180, 181 extend inward of the wall 170 so as to block rotation of the locking lugs 164 in either direction but not far enough to extend into the opening 172. On the opposing side of each first boss 180 but within the wall 170 is a second, stationary stopping face 182 facing in the opposite direction as the first stopping face 178*b*. The second stopping face 182 may have various orientations but is shown as extending along a radial line from longitudinal axis 14. As seen in FIG. 10*b*, there thus two first bosses 180, diagonally opposite each other and each having a first, stationary stopping face 178*b* located on one side of the boss 180 and second, stationary stopping face 182 on an opposite side of boss 180.

Each of the second bosses 181 also has a stationary stopping face 184. Each stationary stopping face 184 is at a distal end of a different one of the filter cap lug openings 173. As seen in FIGS. 10*a*, 10*b*, the bosses 180, 181 have opposing radial stopping faces 182, 184 at opposing ends of an arc of the wall 170, on diametrically opposite sides of the wall and on opposing sides of opening 172 in base 11.

Figure 3B:
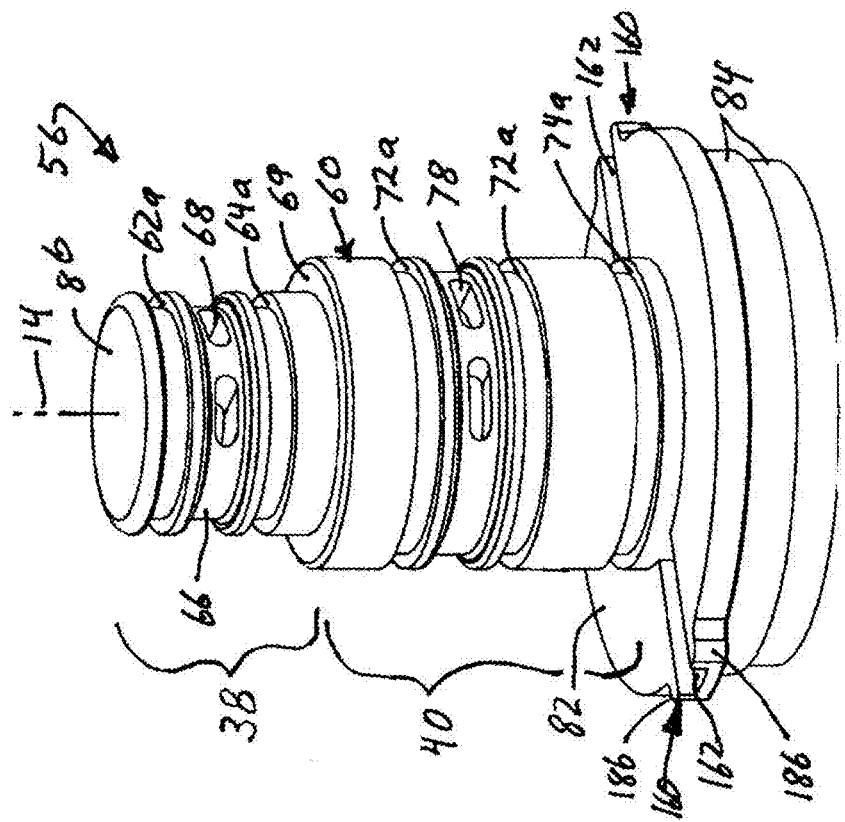
FIG. 3b is a perspective view of a modified filter cap of FIG. 2 with the seal members removed.
Figure 3A:
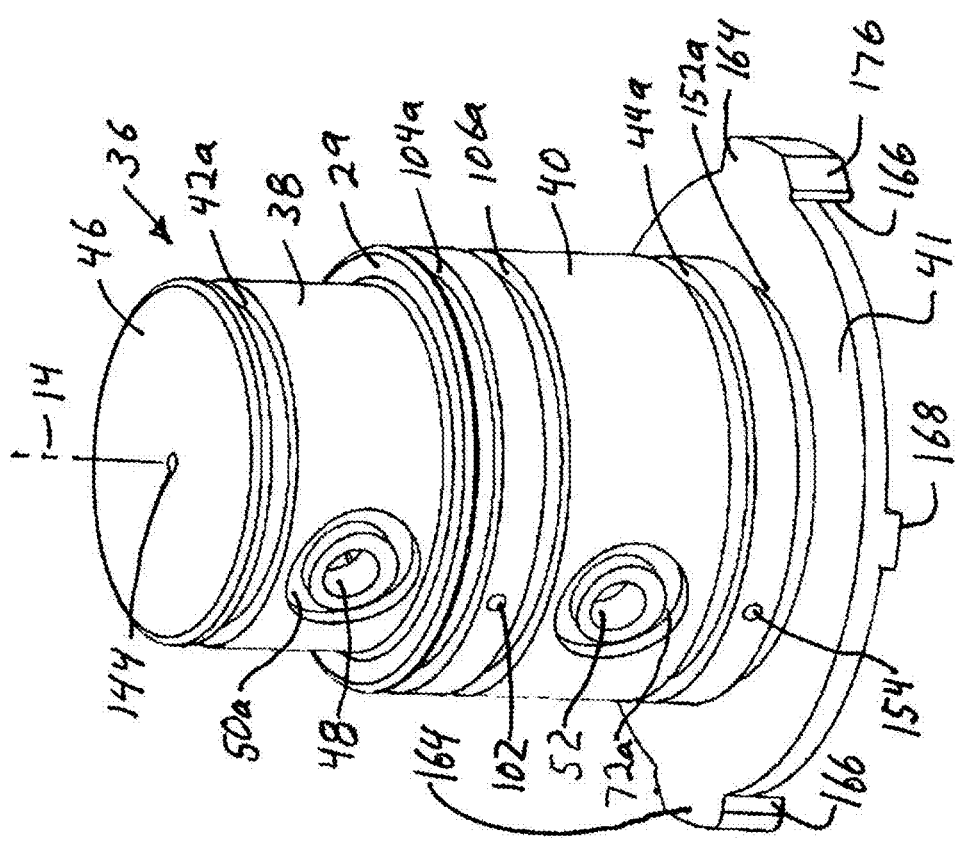
FIG. 3a is a perspective view of a modified barrel valve of FIG. 1 with the seal members removed.

Referring to FIGS. 3*b*, 10*a* and 10*b*, each filter cap locking lug 160 has two rounded distal corners 186*a*, 186*b*, on opposing sides of channel 162. The corners 186*a*, 186*b* form position stops for the filter cap locking lugs 168.

Referring to FIGS. 3 and 8-13 the mating of the filter cap with the manifold and the operation of the locking lugs is described. In use the valve body 36 is placed inside the manifold 10 which is fastened to manifold base 11 so as to contain the valve body 36 between the manifold body 10 and base 11 so the valve body can rotate about axis 14 but not move laterally or axially and cannot rotate except about axis 14. The filter cap 56 (and connected cartridge 55) is inserted into the central cavities of the manifold 10 and advanced along longitudinal axis 14 of the mated manifold and valve body, with the filter cap locking lugs 64 each fitting through a different one of the cap lug openings 173. When the filter cap locking lugs 160 advance axially through the opening 11 past the plane of the manifold base 11 then the filter cap (and filter cartridge 55) are positioned with the stationary stopping faces 184 on boss 181 aligned with one of the stopping faces 186 on the filter cap locking lug 160. The stop faces 178a, 178b on the barrel valve and boss 180 are contacting each other to position the barrel valve relative to the manifold body 10 and base 11. As the locking lug 160 of filter cap 56 passes through opening 11 the barrel valve 36 is oriented so that the channel tabs 168 on the bottom of the barrel valve fit into and releasably engage or mate with the channel 162 in filter cap base 82 to interlock the barrel valve 36 and filter cap 56 for rotation about axis 14.

In this first, closed configuration (FIG. 10a) the flow through the manifold and valve body is blocked so there is no flow through the valve body 36. Referring to FIGS. 1, 6, 7, 11 and 12, flow through fittings 30, 34 requires alignment of manifold flow passages 28 and 32 on the manifold body 10 with the barrel valve flow passages 48, 52 in the barrel valve body 36. When the barrel valve 36 is rotated about axis 14 the barrel valve flow passages 48, 52 are rotated out of alignment with manifold flow passages 28, 32 and no flow occurs through the valve body 36. The seals 50, 54 seal between the rotating valve body 36 and stationary manifold body 10 to prevent leakage as the barrel valve rotates. Then the valve body is rotated to the second, open position the barrel valve flow passages 48, 52 are aligned with manifold flow passages 28, 32 through the manifold 10 to allow flow.

In this first, closed position (FIG. 10a), rotation of the filter cartridge 55 and filter cap 56 in a first direction is blocked by abutting stopping faces 184 on bosses 181 and stopping faces 186 on the filter cap locking lugs 160, and is also blocked by abutting stopping faces 178a, 178b on the valve body 36 and manifold base 11, respectively to position the valve body relative to the mounting plate 11 and tab openings 164. The abutting stops provide a noticeable resistance to further rotation and indicate to the user that the parts are in this closed position where no water flows and the cartridge and filter cap may be removed or inserted without water leakage.

In this first, closed position when the channel tab 168 on barrel valve 36 mates with the channel 162 in the filter cap 56, the fluid passages through the filter cap and barrel valve are aligned to allow flow through passages 50, 52 and into channels 66, 76 and associated openings 68, 78 through the filter cap and into chambers 70, 80 of the filter cap. This is shown in cross-sectional view of FIG. 12. Thus, the filter cap 56 and barrel valve 36 have an alignment mechanism to align flow paths through the filter cap and barrel valve.

Rotation in the second, opposing direction to a second, open position can be achieved with the engaged or interlocked channel tabs 168 on the barrel valve 36 and channel 162 on filter cap 56 causing the filter cartridge 55, filter cap 56 an barrel valve 36 rotating together about longitudinal axis 14. These parts rotate together in the second direction about 90° to a second position in which the stopping faces 186 on filter cap locking lugs 160 hit the stopping faces 182. The abutting stops 186, 184 provide a noticeable resistance to further rotation and indicate to the user that the parts are in a position where water can flow through cartridge and filter cap.

Figure 11:
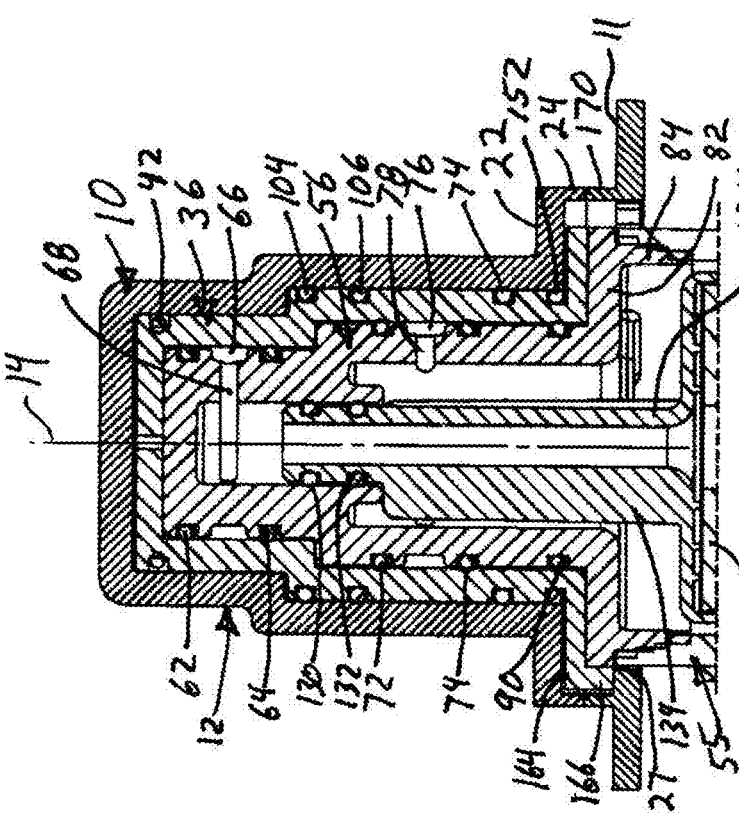
FIG. 11 is sectional view taken along section 11-11 of FIG. 13a showing the barrel valve and filter cap rotated to a full open flow position.

In this second, open position (FIGS. 1, 6, 7, 10b, 11, 12 and 13a) the fluid channels are aligned so water flows through the manifold, valve body, filter cap and filter cartridge. This position is shown in FIGS. 11-12, as well as other figures. As the interlocked valve body 36 and filter cap 56 are rotated in this second direction toward the second position, the filter cap locking tabs 160 and barrel valve locking tabs 64 are both sliding on the short lip 27 on the manifold base 11 located between the opening 172 and wall 174. This may be seen in the cross-sectional view of FIG. 12. The flange 166 on each end of the barrel valve locking tab 164 slides on this lip 27 since the barrel valve is trapped in the cavity between the manifold body 10 and manifold 11 to restrain the barrel valve body 36 to rotation about axis 14. This is shown in FIG. 11. Those flanges 166 and barrel valve locking tabs 164 are located about 90° from the filter cap locking tabs 160 which fit through tab openings 173 and are rotated into engagement with the lip 27 surrounding filter cap opening 11. Because the axial forces (along longitudinal axis 14) are so low, the filter cap locking lugs 160 can be thinner than usual and can accommodate the channel 162 which further weakens the locking lugs 160.

Because the thickness of locking lugs 160, 164 and the mating locking surface 27 vary with the filter diameter, water pressure and calculation safety factor, it is difficult to precisely define how thin these mating locking surfaces can be. Some examples help illustrate the proposed size reduction. A filter cartridge 55 with a one inch diameter opening encircled by an O-ring seal has an opening area of about 0.8 square inches. A typical design with a safety factor and based on industry standard testing up to 150 psi pressure may result in a higher design pressure in order to provide a safety factor. It is common to test filter cartridges to a maximum burst pressure of 500 psi and in order to ensure the cartridges do not burst every time they are tested the design pressure may be 600 psi. For the one inch diameter filter cartridge 55 that results in a design force of about 600 psi×1.76 in²=1,056 pounds, or about 1100 pounds of axial force to be withstood by the various lugs and mating surfaces. But with the lugs using the radial flow design disclosed herein the design may focus on withstanding the weight of the cartridge and the use where the cartridge is twisted into and out of the valve body and manifold so that it is believed that the using lugs and mating surfaces of the current radial flow design may be designed to withstand about ¼ to ⅕ the typical forces. Thus, the lugs and mating surfaces may be designed to resist about 500/5=100 (or 125 pounds for a ¼ factor) instead of about 500 pounds. Likewise, if the opening area increases to 1.76 square inch as may arise in some residential applications the design load may decrease from about 1100 pounds to about 220 or 275 pounds for a 5 fold or 4 fold reductions in the load. In either case, the design load on the lugs and mating surfaces are reduced by over 50%, and preferably reduced from about 75-80% compared to typical designs used today.

To remove the filter cartridge the sequence is reversed, with the cartridge 55 and filter cap 56 being rotated about longitudinal axis 14 in the first direction toward the first position in which the stops 178a on the flanges 166 and lugs 164 of barrel valve 36 abut stops 178b on the manifold base 11 to position the barrel valve 36 relative to the manifold base 11, and in which the stopping faces 186 on filter cap locking lugs 162 abut stopping faces 184 on the bosses 181 of manifold body 11 to position the filter cap 56 relative to the manifold base 11 and tab openings 173. The filter cartridge 55 is then pulled along longitudinal axis 14 to disengage channel tab 186 on the barrel valve 36 from channel 162 on the filter cap 56 and to remove the cartridge and filter cap from the manifold 10 and barrel valve 36.

There are thus provided at least one and preferably two or more first positioning stops 174a, 174b on the valve body 56 and manifold 10, 11 to position the valve body in a first position in which flow through the valve body 56 is closed.

There are also provided at least one and preferably two or more second positioning stops 184, 186 on the filter cap and manifold 10, 11 to position the barrel valve 36 so that insertion of the filter cap 56 into the barrel valve aligns the fluid passages of the barrel valve with the fluid passages through the filter cap, with the positioning stops 184, 186 further aligning the mating channel tab 168 and channel 162 on the valve body and filter cap, respectively, to interlock those parts for rotation about axis 14.

Figure 13B:
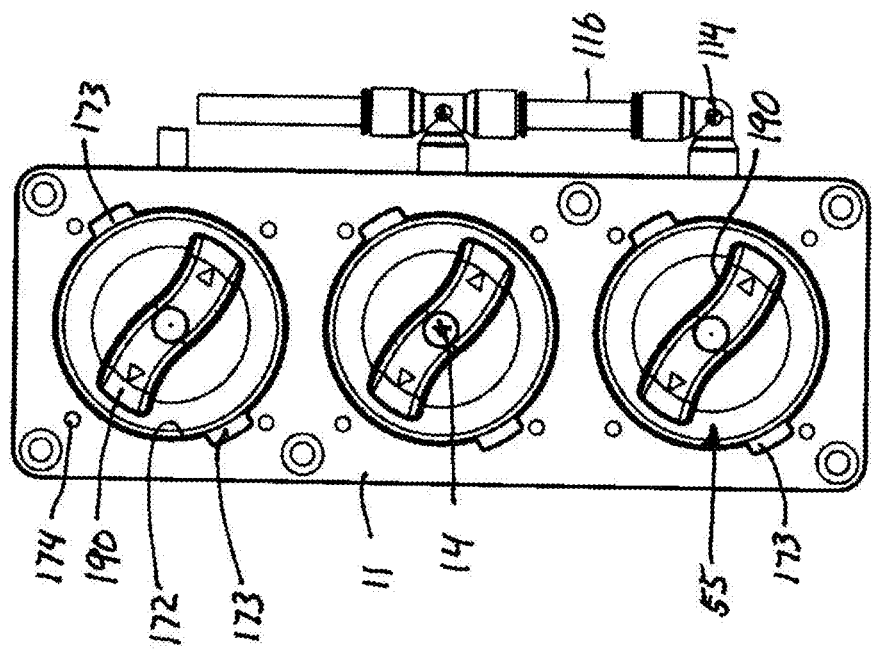
FIG. 13b is a bottom view of the manifold base of FIG. 13a showing the bottom of the filter cartridges.
Figure 13A:
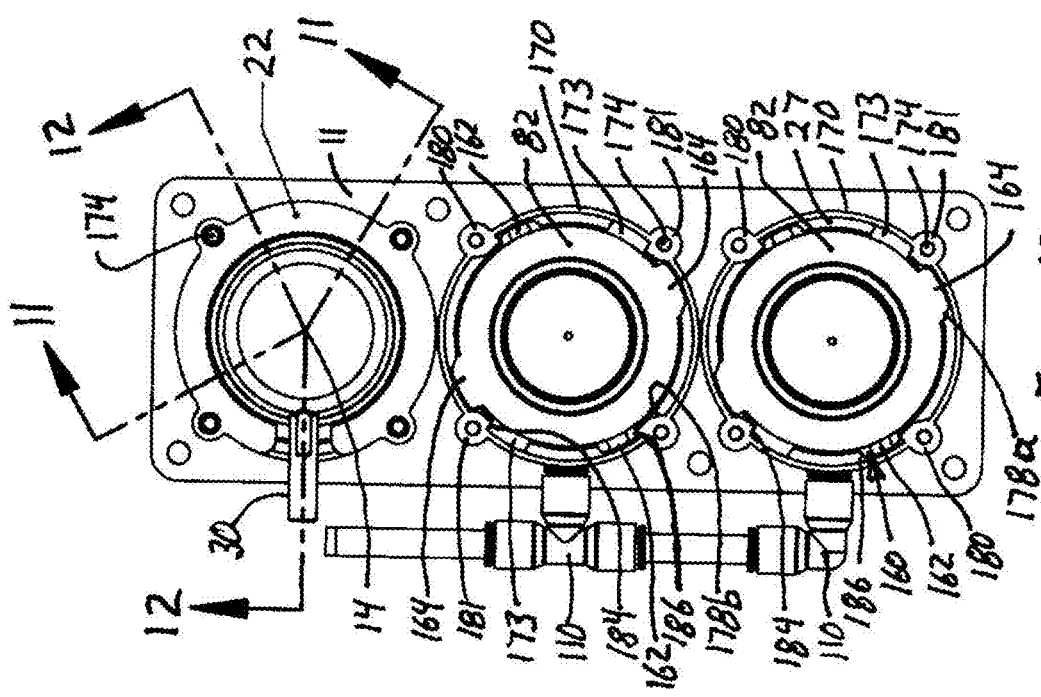
FIG. 13a is a top, partial sectional view of a manifold base with three manifold heads in an open, flow position and with two manifolds having a cover removed to show the locking lugs on those two manifold heads and to show aligned passages on the top manifold head.

Referring to FIG. 13b, to rotate the cartridge 55 about axis 14 the bottom end of the cartridge may have a protruding handle 190. The depicted handle comprises a short, elongated protrusion extending from the bottom of the cartridge 55 a distance sufficient to allow a person's fingers to twist opposing ends of the protrusion 190. The depicted handle is shown with an arbitrary curve resembling an "S" shape but other shapes can be used.

In the above depicted embodiments, the second fluid passage 32, 52, 76, 78 preferably forms a fluid inlet for unfiltered fluid flowing into the filter cartridge 55 while the first fluid passage 68, 66, 50 and 28 forms a fluid outlet for the filtered fluid from the filter cartridge 55. Depending on the configuration of the filter element and how water is directed through the filter element the flow paths could reverse so that the second fluid passage forms the outlet for filter water while the first fluid passage forms the inlet for unfiltered water. The details of the fluid flow paths through the filter element 59 will thus vary with the particular cartridge 55.

Figure 14:
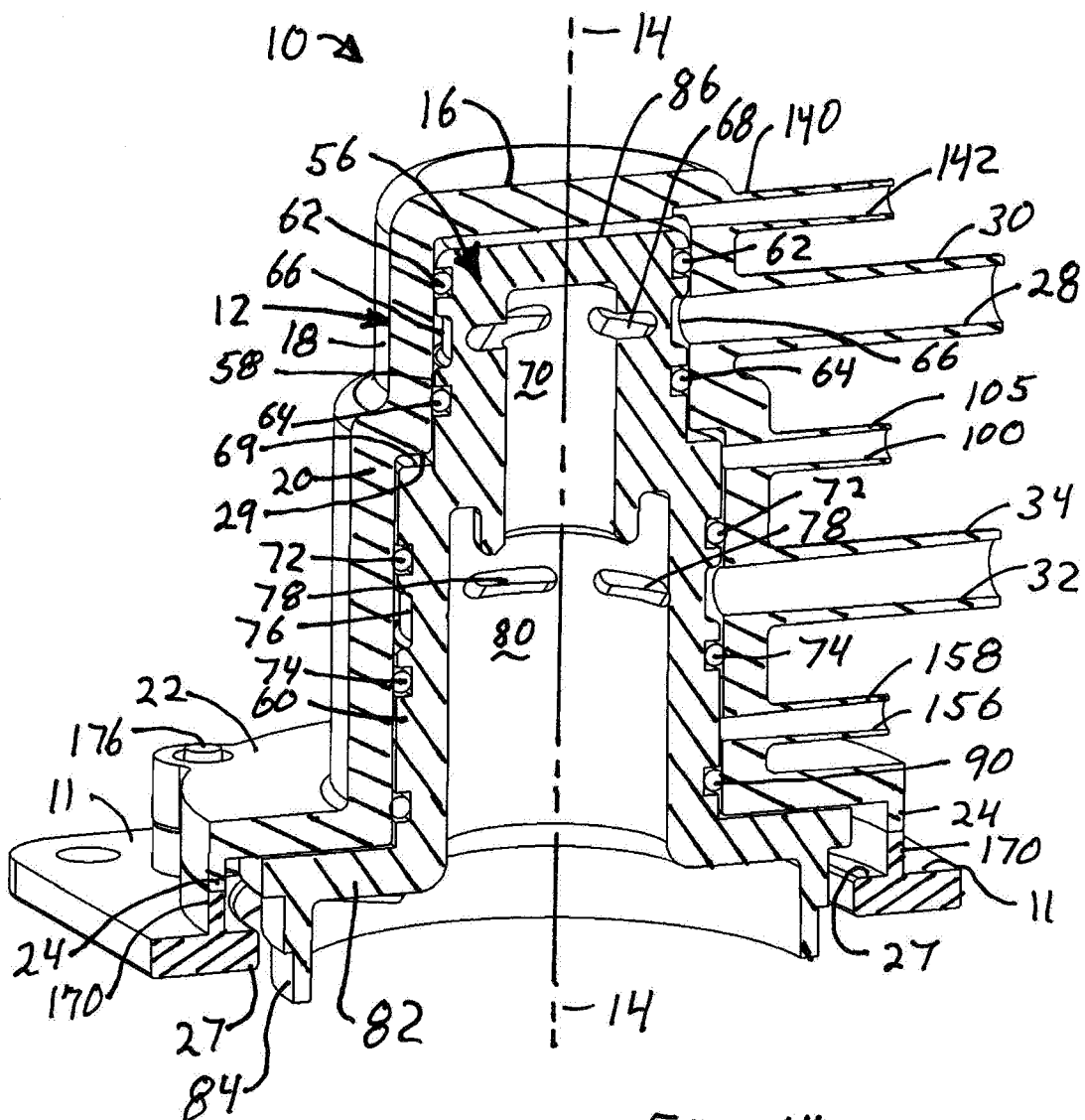
FIG. 14 is an embodiment showing a manifold and filter cap but omitting the barrel valve as also shown in FIG. 7, but further having vent passages to void volumes between seals.

Referring to FIGS. 7 and 14, a variation is shown with the barrel valve body 36 omitted so that the filter cap 36 mates directly with the manifold 10. The barrel valve body 36 allows rotation of the valve body 36 to shut off fluid flow to the filter cap 56 and filter cartridge 55. If the barrel valve body 36 is omitted a user actuates an external shut-off to block flow through to the filter cap 36 and any cartridge associated with the filter cap. The parts have the same basic construction and function as described above, except the filter cap 56 is sized to nest closely within the manifold 10. The first manifold fitting 30 has the first manifold flow passage 28 passing through the first wall portion 18 of the manifold wall 12. The first manifold flow passage 28 is in fluid communication with first filter cap flow channel 66 located between seals 62 and 64 that encircle the first portion 58 of the filter cap and provide a seal against the facing interior sides of the first portion 18 of manifold 10. The first filter cap flow channel 66 preferably encircles a substantial portion of the first portion 58 of the filter cap and opens into first filter cap openings 68 that extend through the walls of the first portion 58 of the filter cap to place the first channel 66 in fluid communication with the first internal fluid passage 70 of the filter cap.

The second manifold fitting 34 has second manifold flow passage 28 passing through the second wall portion 20 of the manifold wall 12. The second manifold flow passage 32 is in fluid communication with second filter cap flow channel 6 which is located between upper and lower seals 72, 74 that encircle the second portion 60 of the filter cap 556 and provide a seal against the facing interior sides of the second portion 20 of manifold 10. The second filter cap flow channel 76 preferably encircles a substantial portion of the second portion 60 of the filter cap and is in fluid communication with the second filter cap openings 78 that extend through the walls of the second portion 60 of the filter cap to place second channel 76 in fluid communication with the second internal fluid passage 80 of the filter cap 56.

A top vent fitting 142 has a top manifold vent passage 142 that extends through the fitting 142 and wall 12 or top 16 of the manifold 10 to place the vent passage 142 in fluid communication with a top void volume which is formed mostly between the facing portions of the filter cap 56 and manifold 10 isolated by first seal 62 located above the first filter cap flow channel 66. The top manifold vent volume includes the volume formed by the facing surfaces of the top 16 of manifold 16 and top 86 of filter cap 56 and the facing surfaces above the seal 62 located on the facing first side portions 18 of the manifold and 58 of the filter cap.

A middle void volume is formed between the second seal 64 and third seal 72 and the facing outer surface of the filter cap 56 and the inner surface of the manifold 10 located between those seals 64, 72. The facing surfaces forming the middle vent valve preferably include part of the first wall portions 118, 58 and part of the second wall portions 20 and 60 and part of the nesting shoulders 29 and 69 of the manifold and filter cap, respectively. The middle manifold vent fitting 105 has middle fluid passage 100 extending therethrough and through the wall of the manifold 10, preferably the first wall portion 18 so the middle vent passage is in fluid communication with the middle void volume.

A lower or bottom void volume is formed between the fourth seal 74 and fifth seal 90 and the facing outer surface of the filter cap 56 and the inner surface of the manifold 10 located between those seals 74, 90. The lower or bottom manifold vent fitting 158 has passageway 156 extending therethrough and through the wall 12 of the manifold 10, preferably extending through the second portion 20 of the manifold wall or the flange 22, depending in part on the location of the fifth seal 90. The seal 90 is shown as located between the second wall portions 20, 60. The bottom manifold vent fitting is in fluid communication with the bottom void volume.

The filter cartridge 55 is used with the assembly of FIG. 14 pretty much the same as described regarding FIGS. 2, 11 and 12, as the filter cartridge mates with the same part, the filter cap 56. There is a slight difference in the locking lug arrangement or other mechanism for retaining the filter cartridge 55 in place with the filter cap 56. But such other locking lugs and retention mechanisms are known and not described in detail. Thus a detailed description of the filter cartridge 55 and the manifold 10 and filter cap 56 assembly of FIG. 14 are not provided. The testing of the void volumes between the various seals 62, 64, 72, 74 and 90 is also the same and not described in detail. There is one slight difference in that the flow passages through fittings 140, 105 and 158 are shorter because the barrel valve body 36 is omitted, but the testing is effectively the same steps, but with shorter passages because the filter cap 56 seals directly to the surfaces of the manifold 10, and the flow passages 48, 62 and 154 are omitted.

As described above, the seals 62, 64, 72 74 and 90 preferably comprise O-ring seals in grooves, but other seal types can be used with or without grooves, as is the case with the other seals described herein. The vent passages 142, 100, 156 are optional and if present allow one or more of the void volumes to be placed in fluid communication with the environment or a device located outside the manifold 10. Thus the void volumes may be vented to atmosphere to help them remain dry; the void volumes may be monitored for moisture to indicate leaks; the void volumes may be filled with dry gas to ensure the void volumes are dry and thus not support bacteria growth or mold growth; the void volumes may be pressurized to leak test the seals between the manifold 10 an filter cap 56 which form the particular void volume in question. These same tests or uses are applicable to the other void volumes and vent passages described herein, and other uses of the void volumes and vent passages described herein may be used with the variation of FIG. 14.

The arrangement of FIG. 14 is especially useful for testing the seals of a filter cap 56 before use. One or more of the vent fittings 140, 105, 158 may be used to pressurize the void volume with which the vent fitting is associated and monitor the pressure for change in order to evaluate whether the seal or seals forming the vent valve are leaking. The void volumes are small and a pneumatic pressure can be applied quickly and monitored accurately in order to rapidly test the seals before approving them for sale. The use of dry gas avoids contamination of the filter and avoids the need to dry the filter cap or filter. The gas pressure may be monitored by pressurizing to a predetermined pressure and monitoring the pressure change over a predetermined time, preferably a few seconds and more preferably less than 10 seconds and more preferably fewer than 5 seconds. The monitoring may also include monitoring the flow rate needed to maintain a desired pressure in the void volume, but this is less preferred. The equipment and process for pressuring volumes and monitoring the volumes for pressure changes or for flow changes are well known and are not described in detail herein.

Figure 15:
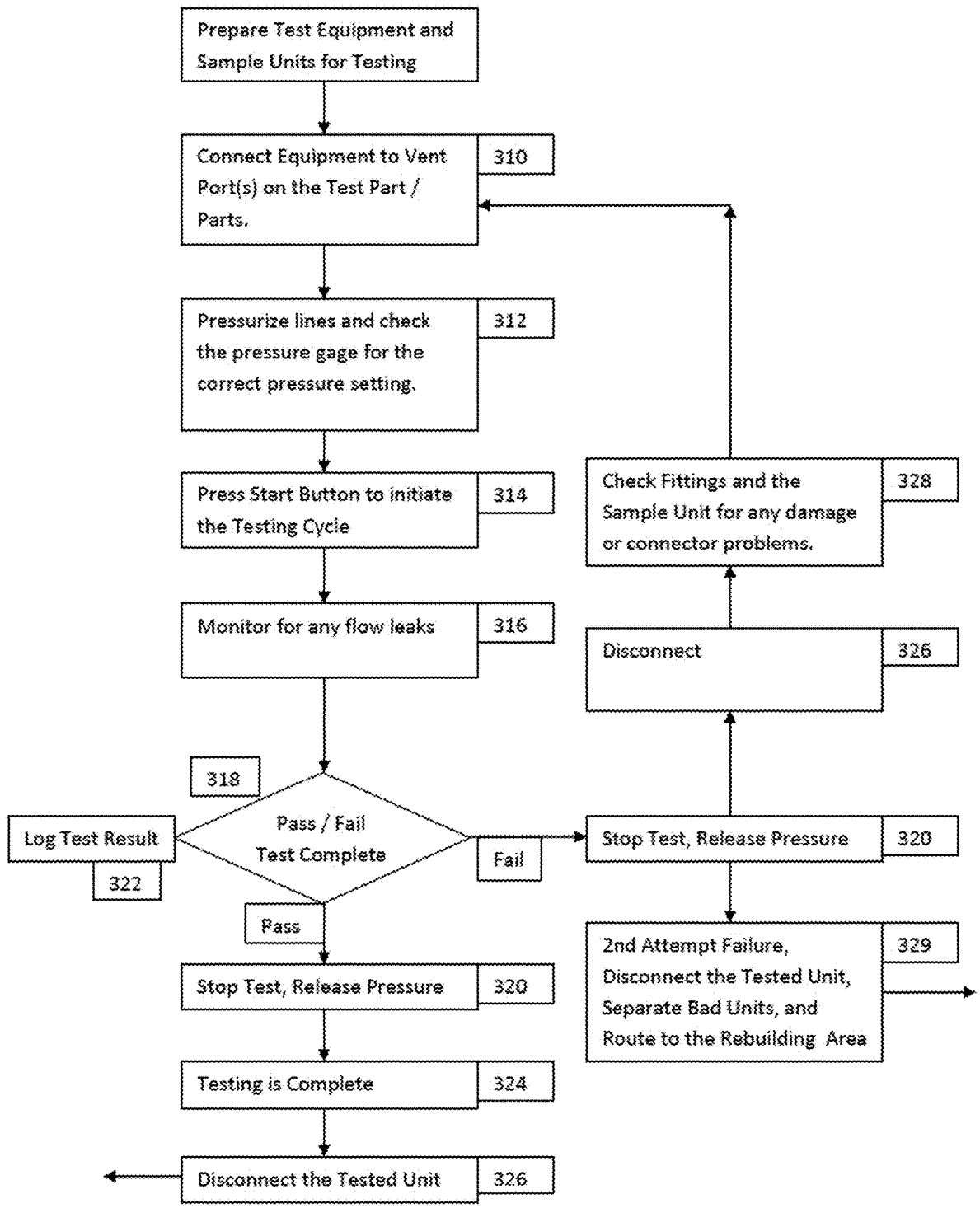
FIG. 15 is a schematic of a test sequence for testing components of water filter fittings.
Figure 16:
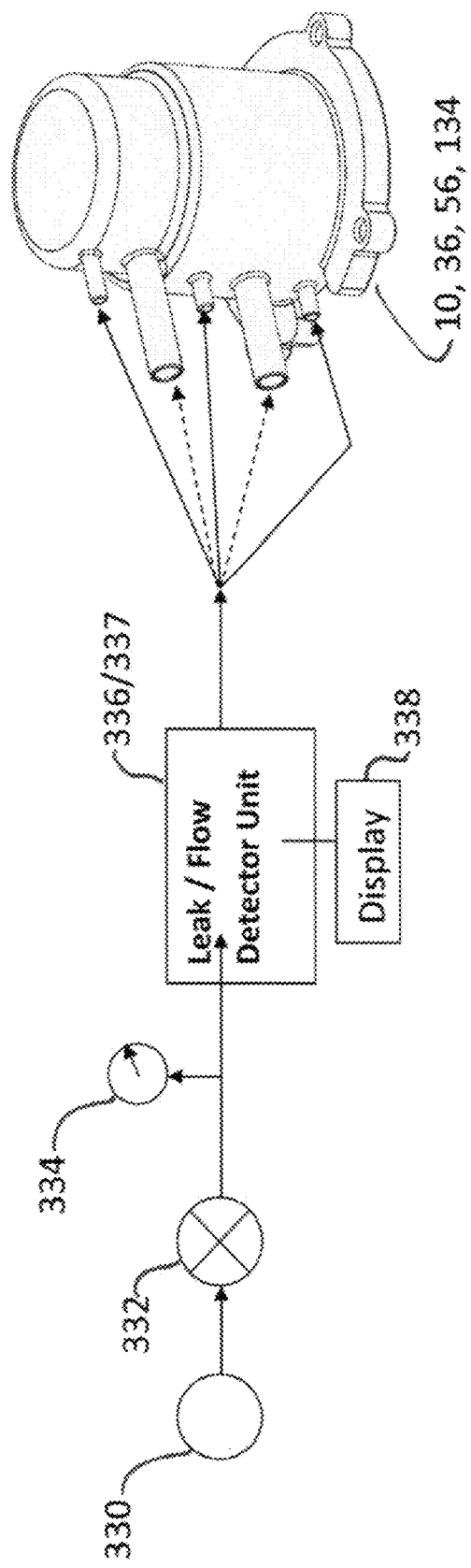
FIG. 16 is a schematic of a test arrangement for testing components of water filter fittings.

Referring to FIGS. 15-16, a method and apparatus for leak testing the filter cartridges 10 is described. The leak test preferably uses a gas instead of water or other liquid. In step 310, a source of pressurized gas 330 is placed in fluid communication with the component to be tested. Push-to-connect fittings are preferred. The source of gas pressure 300 is preferably a source of pressurized air such as an air tank or air compressor, but other cases may be used, including nitrogen and helium at a pressure higher than the test pressure discussed below. The connection with the filter component to be tested is preferably achieved using one or more of the top, middle and bottom vent fittings 140, 105, 158 respectively, as by clamping or otherwise connecting a gas line to the fitting to be used in the leak test. The tested filter components may include the manifold 10 and filter cap 56 assembly as in FIG. 14, or the manifold 10, barrel valve 35, filter cap 56 and filter neck 134 assembly as in FIG. 7. Only one vent fitting and associated flow paths and seals may be tested, or any two vent fittings and associated flow paths and seals may be tested simultaneously, or all three vent fitting and associated flow paths and seals may be tested simultaneously. If only one vent fitting used it is preferably the middle vent fitting 105 because the seals forming the void volumes accessible by the middle vent fitting determine whether intermixing occurs between the inlet and outlet flow paths through the filter. Intermixing is believed to be of significant concern from a potential contamination viewpoint.

The next leak testing step 312 pressurizes the void volumes associated with each vent fitting while controlling the pressure applied to the filter cartridge components to a first pressure P1, preferably 30 psi, maximum for most current, household water filters. The pressure may be applied by opening valve 332 and allowing gas to flow to the vent fittings 140, 105, 158 and the fluid passages and seal or seals associated with each of the vent fittings to form the associated void volumes. The pressure may be controlled by monitoring the pressure with a pressure transducer 334 such as a pressure gauge or other transducer and adjusting the pressure mechanically or electronically or otherwise to regulate the pressure, as, for example by venting overpressure or by gradually increasing the pressure to the first pressure P1. The pressure may be controlled by selecting or limiting the source of pressurized gas 330 to provide a gas at a predetermined pressure, such as the first pressure P1. The first pressure P1 may be the desired leak test pressure, which is preferably about 30 psi for household filter cartridges 10 and components such as manifold 10, barrel valve 36 and cap 56. The pressure applied during testing is preferably verified to ensure proper operation of the equipment and testing.

The first pressure P1 may optionally be a higher, overpressure used to seat the seals associated with each void volume being tested and to immediately open incipient leaks in those associated seals. The first pressure P1 is preferably applied in a short time period of a few seconds, preferably by opening an electronically actuated valve 332, as through a solenoid or other electronic control and shutting the valve so as to achieve the desired first pressure. Because the void volumes associated with each vent fitting 140, 105, 158 are small the time to fill the void volumes is small and the time for the pressure to be achieved and stabilized sufficiently for accurate testing is small. If step 312 is an over pressure test, then the next is to reduce the pressure in the tested components to the second, desired leak test pressure P2. As noted above, this test step is optional as P1 may be the same as P2. The test pressure P2 is determined by the pressure monitor 334 as described above, with the pressure being reduced by venting pressure to atmosphere through a separate valve (not shown in FIG. 16) or by making valve 332 a three-way valve with an inlet from the gas source, an outlet to vent or atmosphere, and an outlet placed in fluid communication with the filter cartridge components to be tested.

The next leak testing step 314 is optional and allows manual activation of a start button to activate the pressure testing cycle.

The next leak testing step 316 is to monitor for leaks with sensor 336 with the results being displayed on display 338, which may be a visible display (e.g., red or green light) or an audio display (different sounds for pass/fail) or both. Preferably the gas flow or gas pressure is monitored by sensor 336 in electrical communication with detector unit 337 that processes the sensor output to determine if a leak exists. The sensor 336 and detector unit 337 may detect leaks various ways but preferably detect changes in pressure or flow. The sensor 336 and thus the detector unit 337 may be in communication with vent fittings 105, 140, 158, or the fluid passages in communication with those various vent fittings, as described herein, as reflected by the solid lines in FIG. 16. The sensor 336 and detector unit 337 could also be in communication with the fittings 30, 34 and the fluid passages associated therewith, as reflected by the dashed lines in FIG. 16. If sensor 336 is a flow sensor and there is no leak then the gas flow will be zero and the larger the gas flow the larger the leak. If the sensor 336 is a pressure sensor and there is no leak then the pressure will remain constant, and the larger the pressure drop the larger the leak. If sensor 336 is a pressure sensor it may be combined with pressure monitor 334 if properly positioned in the test setup to monitor leaks. Because the void volumes are small, leaks will represent a relatively large change in the volume and flow and thus be more quickly detected than if the entire filter cartridge were to be filled with gas or if the water flow passages were to be filed with gas.

The leak test gas may be provided with a leak indicator to identify the location of the leak provided the leak indicator is not harmful to humans and acceptable for use with the materials used in the filter cartridges. Mineral oil is fluorescent and in small quantities is believed to be suitable for use with the filter cartridges 10. Other sensors 336 for leak monitoring may be used, such as audio sensors to detect the sound of gas leaking past the seal under the applied pressure P1 or P2, and such audio sensors may be placed in the passages through which water normally flows, such as inlet and outlet fittings 30, 34. Likewise the pressure or flow through the inlet and outlet fittings 30, 34 and the fluid paths associated with those fittings may be monitored but that is not preferred because the volume of those associated fluid paths is so large and changes in pressure and flow are more difficult to detect in the larger flow paths. The signals from the various types of sensors 336 are preferably communicated to leak detector unit 337 which evaluates the received signals to help determine if a leak exists and preferably to provide some indication on the volume of fluid leaked or the size of the leak. Various algorithms are known to correlate changes in flow or pressure or other aspects with the size of a leak or the magnitude of the leaked fluid, and are described herein.

The next leak testing step 318 is to determine if the filter cartridge components being tested are acceptable. A pass-fail test is believed preferable and the flow test or pressure test is believed preferable to implement the pass-fail test. Depending on the application some leakage may be acceptable but preferably the test criteria are to have no change in gas flow or gas pressure for a predetermined period of time. A short test time is believed suitable, such as a few seconds (e.g., from 1 to 5 seconds), and even maintaining pressure for a fraction of a second is believed suitable for testing the various seals 42 associated with each void volume.

The test results are preferably logged in step 322 to create a paper trail or electronic record that the part was tested, and the test results. This recordation of the test results may reflect the date, time, test data, test criteria, pass, fail, or any combination of these. This step may occur after the step 320.

The next step in the leak testing is step 320 which releases the pressure and stops the test. This may be done by opening a pressure release valve between the valve 332 and the cartridge components being leak tested or by venting at valve 332, or by disconnecting the gas line from the vent fittings 105, 140, 158. This step is done whether the tested filter component passes or fails the leak test.

If the filter component has passed the leak test then next step 324 in the leak testing sequence is to determine if all of the desired vent fittings and associated void volumes and seals have been tested, and if so, to route the good units to location for further processing. If the test sequence tested the void volumes and seals associated with only one vent fitting, then the sequence may be repeated by connecting the gas source to a different vent fitting and the sequence repeated until all vent fittings to be tested are tested for leaks. If all of the vent fittings to be tested were connected in the first step 310 or by cycling the filter component through the leak test sequence for different vent fittings and associated void volumes and seals then the testing may also be completed. If a single test is being performed then step 324 simply sends the good, pressure tested unit for further processing, such as labeling and packaging.

If the filter component has failed the leak test at step 318, then after the pressure is released and testing stopped in Step 320, the cartridge may be disconnected in step 326 from the gas lines and removed from the test setup for subsequent disposition. The tested component may be discarded, or recombined with other components and retested as discussed later. Advantageously, whether the filter component passes or fails the pressure is released in step 320 and the part is preferably disconnected from the gas lines in step 326. Thus, these steps may be combined with the same sequence of steps as if the filter component passed the test but with the passed components being separated from the failed components after the gas lines are disconnected. Further retesting is possible, as described later.

The final step 326 is to remove the filter cartridge components being tested from the test location and sort them according to the pass/fail criteria. The test sequence is then restarted by connecting the components of the next filter cartridge to be tested to the gas source as in step 310. Note that if the filter cap was being leak tested in a test manifold then the filter cap 56 could be discarded if it failed the leak test step 318. But if a combination of a manifold 10 and filter cap 56 were leak tested and a leak was indicated it is not necessarily known if the leak was attributable to defects in the manifold 10 or the filter cap 56. Both parts may be discarded if a leak is found, or one or both parts may be combined with a different part and retested on the assumption that the defective part will cause the combination of the manifold and filter cap to fail a second time. But that retesting requires tracking parts that have failed once and the cost of retesting and errors in tracking the retested parts must be balanced against the cost of the parts to determine if retesting is economically practical. The same applies to leak testing combined assemblies of a manifold 10, barrel valve 36, filter cap 56 and cartridge neck 134, as one or more components may cause or contribute to a detected leak.

Still referring to FIG. 15, further retesting of failed parts may be optionally performed. While a failed part may simply be recycled through another pressure test, it is preferred that the failed part be disconnected in step 326, and then in step 328 the connections of the test equipment and the mating connections on the part being tested are inspected to see if they are the cause of unsatisfactory testing. The part should also be checked to see if there are indications of damage or reasons for failing the test. If the part appears suitable on re-inspection, the part is then reconnected to the tester as in step 310. As an alternative, the connections with the test equipment may be checked without disconnecting some or all of the gas lines with the part then recommencing testing at step 312.

The reconnected part is then retested through steps 312, 314, 316 and 318. Advantageously the test sequence keeps track of retested parts so that if there is a second failure, then after the pressure is released and the test stopped, in step 329 the part is routed to various locations for further disposition. Such further disposition could be a reject bin, scrap, recycling, QC inspection, or rebuilding. Instead of having software track retested parts, an operator may manually track retested parts. The above testing sequence and variations as in FIG. 15 is preferably automated, but may use manual operations.

It is preferred to have each part tested individually in an outer testing device that simulates the cartridge part into which the tested part fits or mates or nests during use with an inner testing device that simulates the cartridge part which is inserted into the tested part being optionally used for further accuracy of simulated testing. Thus, a barrel valve 36 to be tested may be inserted into an outer test manifold and have an inner test filter cap optionally inserted into the barrel valve 36 to form void volumes that test only the seals 42, 50, 44, 54 and 90 between the barrel valve 36 and the manifold 10. Likewise, filter cap 56 to be tested may be inserted into an outer test barrel valve 36 (and optionally a test manifold 10) with an inner test filter cartridge neck 134 optionally inserted into the tested filter cap 56 in order to test only the seals 62, 64, 72, 74 and 90 between the filter cap and the barrel valve.

Figure 17:
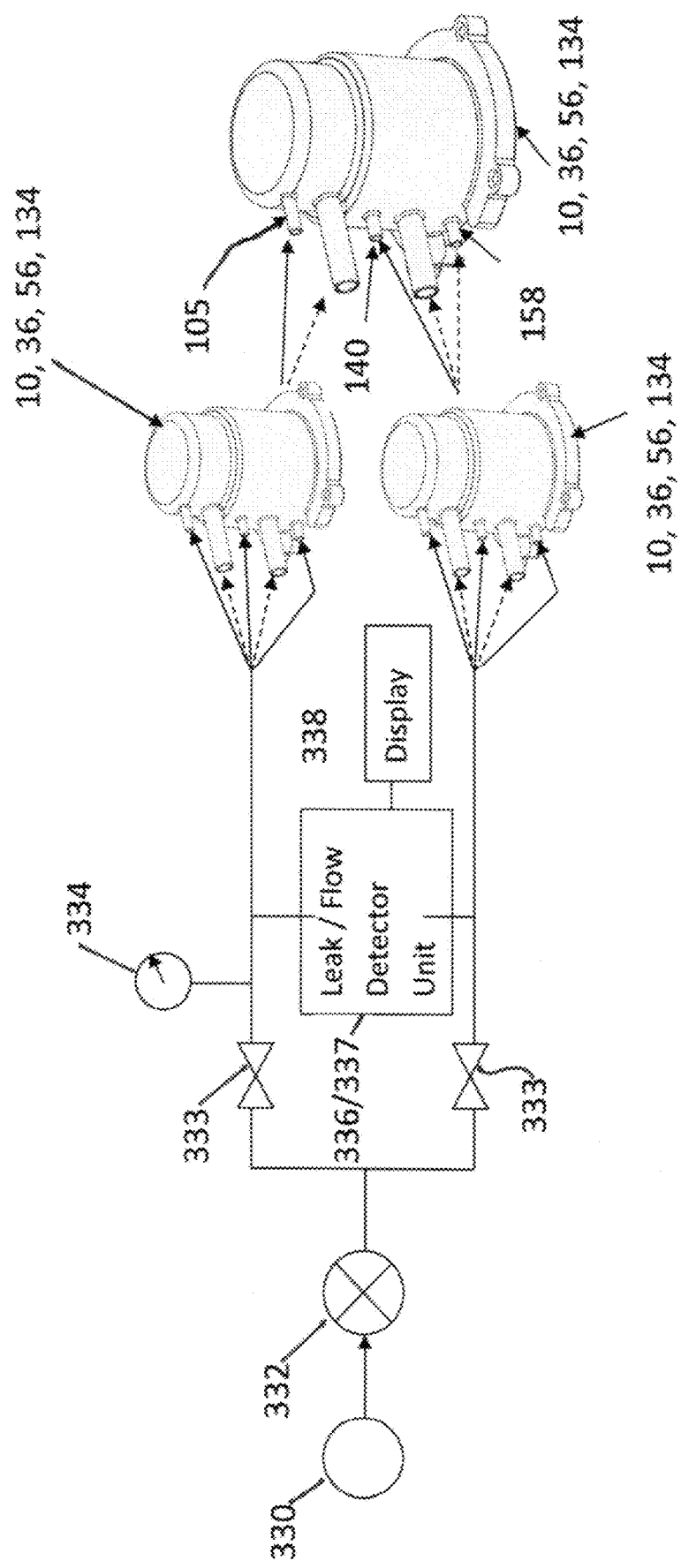
FIG. 17 is a schematic of a further test arrangement for testing components of water filter fittings.

A preferred test setup uses a RICO test device as shown in FIG. 17. This uses the same basic test sequence of FIG. 15. A source of pressurized gas 330 provides gas to three-way valve 332 which vents gas to release downstream pressure. The valve 332 provides gas to two different lines that may be placed in fluid communication with the vent fittings 105, 140, 158 on two different filter cartridge components, or that may be placed in fluid communication with two different vent fittings 105, 140, 158 on the same filter cartridge component. This test setup is advantageous when only two vent fittings are to be tested or when the filter cartridge components have only two vent fittings.

The test cycle begins by connecting each of two gas lines to the same vent fitting 105, 140, 158 on two different filter cartridge components to be tested (e.g., 10, 36, 56, 134), or on any combination of two different vent fittings of the same filter cartridge component. These options are represented by the arrows in FIG. 17. The solid lines reflect preferred connections with the vent fitting 105, 140, 158 or fluid passages associated therewith, with the broken lines reflecting less preferred connections with the first and second fittings 30, 34 and the fluid passages associated therewith. Any combination of these fitting or their associated fluid passages may be tested. Then the valve 332 is opened to pressurize both gas lines to the two different vent fittings and associated void volumes and the seals forming the void volumes. The pressure monitor 334 can be used to regulate the pressure to P1 if an overpressure is used, or to achieve test pressure P2, as desired, with the valve 332 venting to reduce an overpressure P1 to the desired test level P2. When the test pressure P2 is achieved an isolation valve 333 on each gas line closes to lock in the test pressure P2. The isolation valves 333 are open during the overpressure testing P1 or the filling of the gas lines and void volumes. With the isolation valves 333 closed a fixed volume is defined and the pressure or flow is monitored for a test time interval. During the test interval the only flow path between the two gas lines is through flow sensor 336. If the void volumes and associated seals do not leak, then there is no gas transfer through the flow sensor 336 and detector 337, even if both tested components are deforming at the same rate due to material creep or if the pressure is changing in both components due to heat transfer. Compensation for these deformation or heat transfer errors is inherently achieved because two identical components and the same void volumes are being tested simultaneously and the flow sensor compares two tested components with identical creep and thermal characteristics. That removes the need to delay testing to wait for the tested components to stabilize in temperature or to expand under the test pressure.

If one tested component leaks then gas flows from the non-leaking component to the leaking component and the flow is detected by flow sensor 336 and detector 337 and optionally displayed on a suitable display device 338 as described above, activated by detector unit 337. A comparison circuit may be provided to compare an electronic value representative of the pressure or flow detected by sensors 334, 336 with a reference value with the comparison circuit sending a signal to activate an audible or visual signal to display 338, or both depending on whether the change in pressure or flow, or the lack of change in pressure or flow indicates a pass or fail.

If the tested component of the filter cartridge passes then the pressure is released by opening isolation valves 333 and venting through the vent of three-way valve 332. Alternatively, the isolation valves 333 may be three way valves that also vent to atmosphere. Additionally, the vent fittings 105, 140, 158 may have a quick disconnect fitting on the end, such as a barb configured to quickly engage with a pneumatic coupling and release of the gas line from the vent fittings could release the pressure. The same applies to the prior embodiment of FIGS. 15, 16. Depending on whether all desired filter components, vent fittings and associated void volumes have been tested the gas lines may be reconnected to different vent fittings for further testing, or the filter component may be removed for further use. If the tested filter component failed, then it may be discarded or otherwise handled as described herein.

Figure 18:
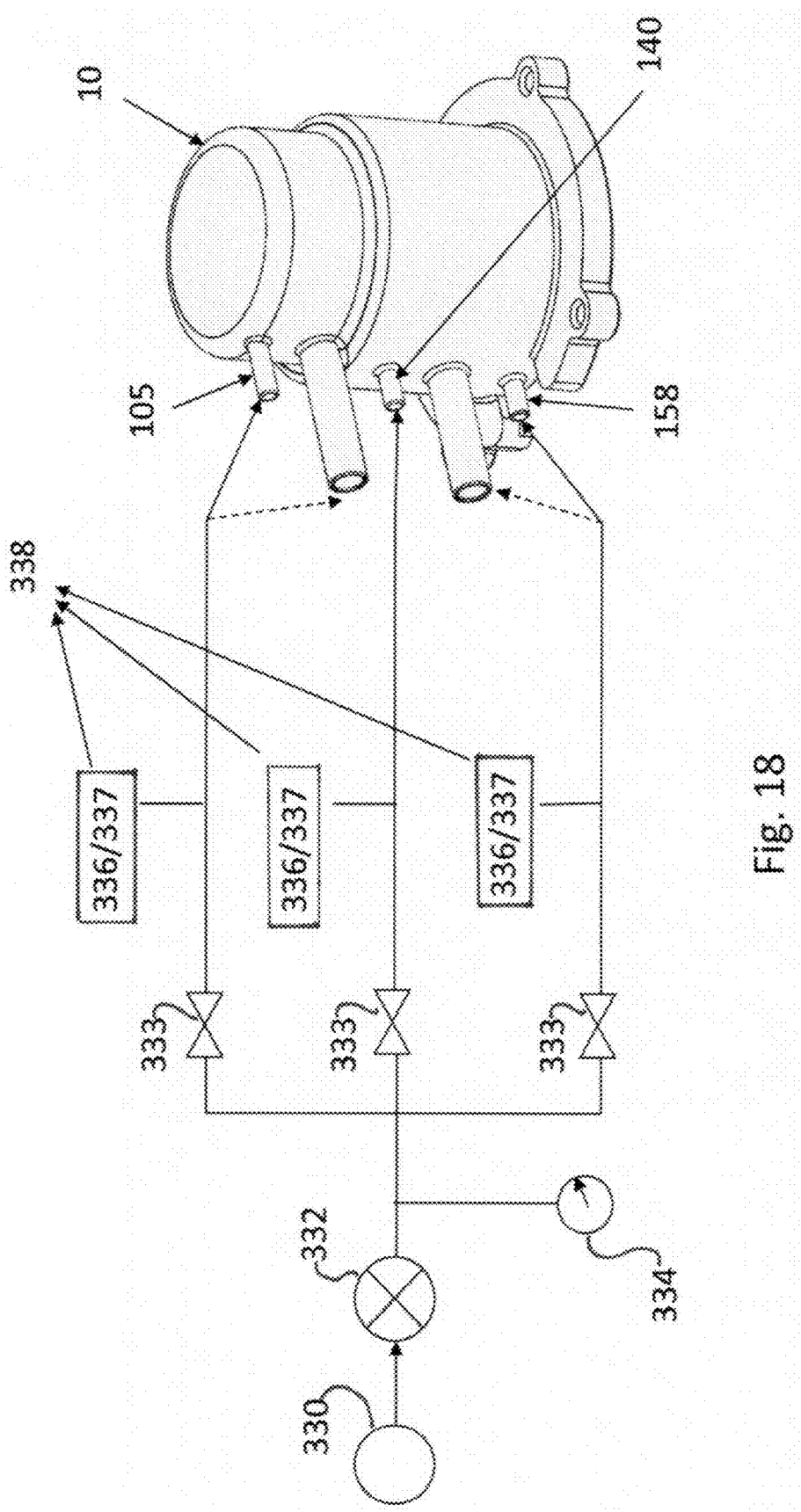
FIG. 18 is a schematic of a further test arrangement for testing components of water filter fittings.

Referring to FIG. 18, a test arrangement is shown using a source of pressurized gas 330 which provides gas to a three way control valve 332. The valve 332 is opened to provide pressurized gas to three different gas lines each connected to a different one of vent fittings 105, 140, 158, with pressure monitored by pressure sensor 336 and detector 337. The solid lines reflect preferred connections with the vent fitting 105, 140, 158 or fluid passages associated therewith, with the broken lines reflecting less preferred connections with the first and second fittings 30, 34 and the fluid passages associated therewith. Any combination of three (or more) these fitting or their associated fluid passages may be tested, with a dedicated isolation valve 333 and sensor 336 associated therewith. The pressure sensor 336 may be configured to provide a signal that closes valve 332 or isolation valves 333 when the desired overpressure pressure P1 or desired test pressure P2 is reached in the gas lines. As desired, a separate pressure sensor 336 may be provided with each gas line and isolation valve 333. When the desired pressure is reached the isolation valve 333 is closed and sensor 336 and/or detector unit 337 checks for leaks. The sensor 336 and detector unit 337 is shown as connected to the gas lines to monitor flow (or optionally to monitor pressure), with each sensor 336 connected to a common display 338. Separate displays 338 for each sensor 336 or separate detectors 337 could be used. The sensor 336 could also be located inside the first or second fittings 30, 34, respectively as described above, or it could comprise other sensor types. This arrangement allows testing of three vent fittings and associated void volumes and seals at the same time, using the test sequence as generally described regarding FIGS. 15 and 16.

The middle vent fitting 105 can provide fluid access to leak test the seals that separate the inlet and out flow paths through the filter cartridge 10. As seen in FIG. 7, the middle vent passageway 100 in middle vent fitting 105 provides access to seals 104, 106 between the outside of the barrel valve 36 and the inside of the manifold 10 which separate the first flow passages 28, 66 from the second flow passages 32, 52 through the manifold and barrel valve. The middle vent passageway 100 in middle vent fitting 105 also provides access to seals 64 and 72 which separate the first flow passages 28, 48, 68 from the second flow passages 32, 52, 76 through the manifold 10 and barrel valve 56 to the filter cap 56. If the vent passage 136 extends through the wall of the filter cap 56 then the middle vent passage also allows access to the seals 130, 132 on the neck 134 of the filter cartridge 55. Thus, by testing the middle vent passage 100, 102, 136, preferably via middle vent fitting 105, the seals separating the first and second flow passages can be tested to see if any seals leak and allow intermixing of water flowing in the two flow passages.

The test equipment described above preferably connects to the vent fittings 105, 140, 158 (or first and second fittings 30, 34). But the fluid connections with the test gas or test fluid could be provided with the vent passages themselves rather than the test fittings. Thus, the top vent passage through one or more of passages 142, 144 could be used to test one or both of seals 42, 62. The middle vent passage through one or more of passages 100, 102, 136 could be used to test two or more of seals 64, 72, 130, 132 encircling the filter cap 56 and cartridge neck 134, as well as to also test the seals 104, 106 encircling the barrel valve and interposed between the manifold 10 and barrel valve 36. Likewise, the lower or bottom vent passage through one or more of passages 156, 154 may be used to test one or both of seals 74, 90 encircling the filter cap and barrel valve, respectively, as well as to seals 44, 152 between the barrel valve 36 and manifold 10.

While the various vent passages allow testing the void volumes and the seals forming those void volumes to ensure the seals are likely to prevent leaks, the vent passages have other advantages. In a refrigerated or cooled environment, one or more of the vent passages may allow air to be circulated through the void volume associated with the selected vent passage. Circulation of even ambient air through the top vent passage may prevent freezing in many applications, in addition to keeping the vent passage and void volumes dry to inhibit bacteria growth. Circulation of heated air, as achieved by passing air by an electrical resistant heating element powered by the appliance into which the filter cartridge is placed, can help avoid freezing of water around the neck of a filter cartridge at even colder temperatures than ambient air. Thus, the vent passages can help leak check the filter cartridge and barrel valve, as well as help those parts from freezing if the appliance temperature or water temperature drops too low.

The above description preferably uses generally cylindrical mating parts because the generally cylindrical surfaces may be made with accuracy and inexpensively, and circular seals provide good seal capability at a low price. As shown in the figures, the upper cylindrical portion is preferably smaller in diameter than the lower portion, with a laterally extending, stepped shoulders 29, 69 on the barrel valve and filter cap, respectively. The use of a smaller diameter on the distal end of these parts makes insertion easier. If the first and second portions are the same diameter then the first and second seals on the barrel valve and filter cap must pass through the entire length of the manifold and barrel valve, respectively, and the sliding that increased length will increase the friction, requiring more insertion force. A larger diameter on the second portion of these parts requires a shorter insertion length on the first, smaller diameter portion and the first and second seals. Also, if the first and second portions are the same diameter then the O-ring seals pass the various inlets, outlets and vent passages, each of which has an edge that may catch, cut and abrade an O-ring seal as it passes by, degrading the performance of the seals. Thus, while having the first and second portions the same diameter is possible and offers the advantage of allowing common sized seals to be used on the first, second, third and fourth seals, it is preferred to have the first and second portions of different diameter, with the first and second seals having the same diameter which is small than the third and fourth seals, which also preferably have the same diameter.

Where parts have to be rotated relative to each other about a common axis the generally cylindrical shape with aligned longitudinal axes is very desirable. But the filter cartridge 55 and its neck 134 do not have to rotate relative to the filter cap 56. The filter cap 56 does not rotate relative to barrel valve 36 as those parts are interlocked by channel 162 and channel tab 168 and rotate together within manifold 10 to align flow paths and optionally to align vent paths. Because the above identified parts do rotate relative to each other, they may have a non-circular shape. In particular, the filter neck 134, filter cap and interior of barrel valve 36 may have a generally oval configuration as generally shown in U.S. Pat. No. 8,591,736, the complete contents of which are herein incorporated herein by reference, or other configurations disclosed in that patent.

Figure 19:
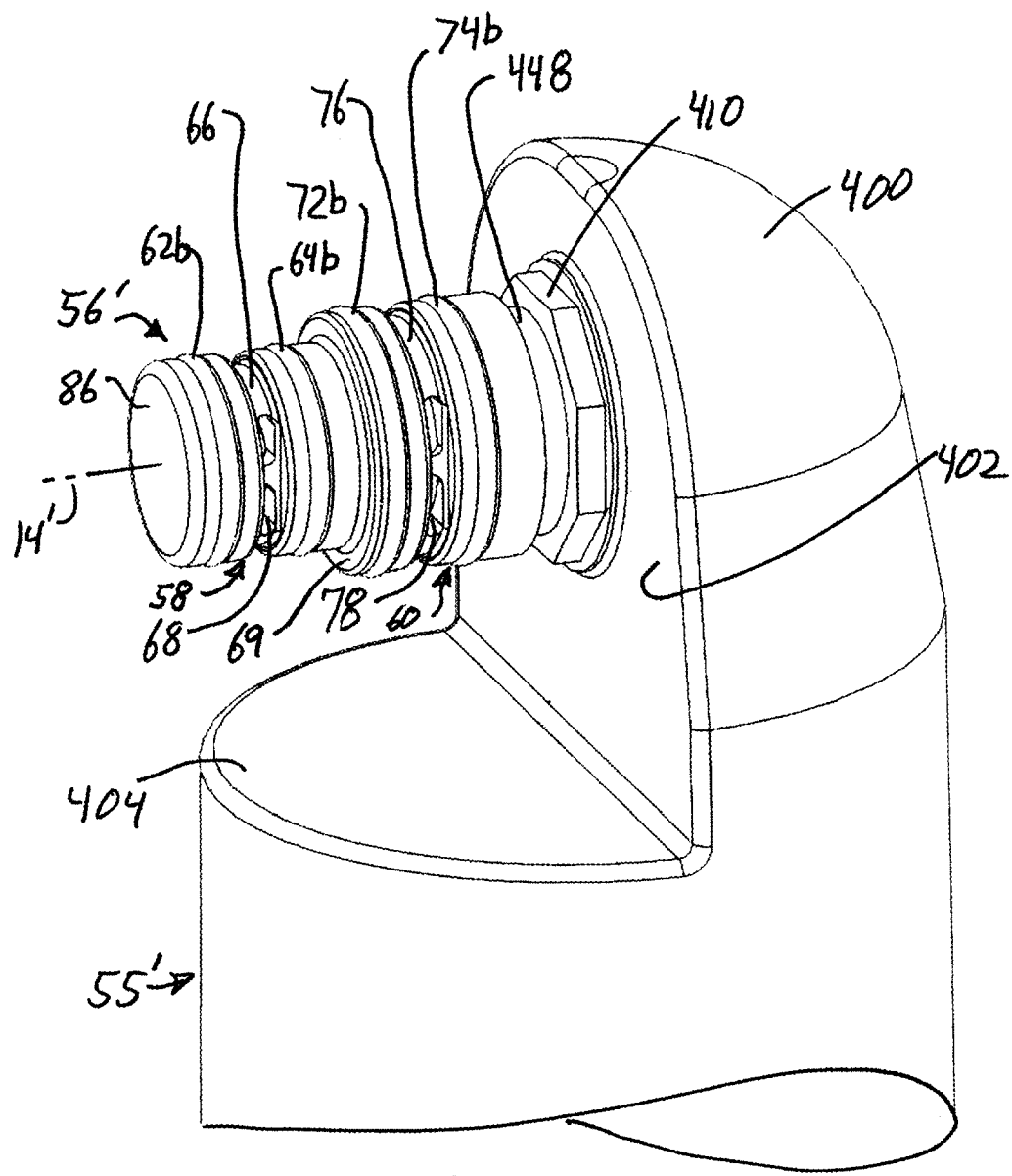
FIG. 19 a perspective view of a filter cap with a lateral connection instead of an axial connection, with no sealing rings on the filter cap.
Figure 22:
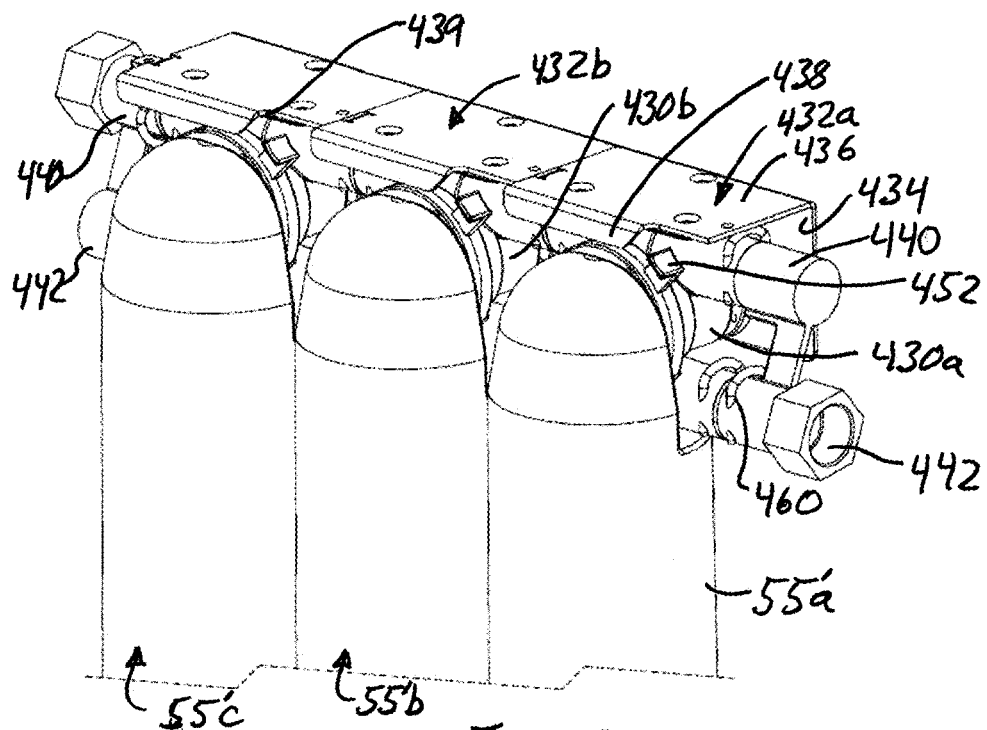
FIG. 22 is an upper perspective view of several filters and manifold heads connected in parallel.

Referring to FIGS. 19-21 the lateral filter cap 56' is shown extending laterally from the filter cartridge 55' along cap axis 14', away from the longitudinal axis 14 of the filter cartridge and preferably in a plane orthogonal to the longitudinal axis of the filter. The vast majority of the parts of the lateral filter cap 56' are the same and a detailed description of those parts is not repeated while the same part numbers are used to identify those same functioning parts. Because the lateral filter cap 56' extends laterally, the connections between the axially aligned filter housing 57 and filter 59 are altered. The lateral filter cap 56' could extend laterally from a sidewall of the filter housing 57, but that extends the filter cap a large lateral distance beyond the general peripheral shape of the filter housing 57. Preferably, the distal end of the filter cartridge 55' has an offset mount from which the filter cap 56' extends so that the filter cap is in the general cylindrical volume of the filter body extending along longitudinal axis 14.

In the depicted embodiment, one side of the filter housing 59 extends upward along longitudinal axis 14 to form a closed upper or distal end 400 of the filter housing. A cylindrical shape could be used but a domed or half domed shape is preferred. The distal end 400 preferably has an axial face 402 aligned with the filter cartridge's longitudinal axis 14 and a lateral face 404 aligned with the lateral axis 14' and extending laterally from the bottom of the axial face 402. The lateral filter cap 56' also extends laterally along lateral axis 14' and preferably parallel with the lateral face 404. The closed end 86 of the lateral filter cap 56' is adjacent a curved plane extending along a periphery of the generally cylindrical body 57 enclosing the filter 59. As used here the term "adjacent" means within a distance of about ⅓ the length of the lateral offset cap along lateral axis 14' beyond or outward of the periphery of the housing body 57.

The lateral face 404, vertical face 402 and distal end 400 enclose the distal end of the filter cartridge 55'. The faces 402, 404 are preferably generally flat and perpendicular to each other. The filter cap 56' extends laterally from the axial face 402 and preferably perpendicular to that face, but the faces 402, 404 could be of diverse shape. The distal end 400, axial face 402 and lateral face 404 are preferably molded simultaneously with the housing 57, with appropriate draw angles being provided on the interior and exterior faces of the parts to make molding easier.

The lateral filter cap 56' is offset from the lateral face 404 a distance sufficient to allow the lateral filter cap to mate with a conforming manifold head 10' as described later. To maintain the flow channels 66, 76 of the filter cap in fluid communication with the same parts of the filter 59, the filter cap 56' is advantageously molded as a separate part and then connected to the distal end 400 filter cartridge housing 57, preferably by spin welding the cap to the distal end 400, to the axial face 402, or to parts contained within the distal end of the filter cartridge. The filter cap 56' may be fastened to the adjacent portion of the filter housing 57 near the location of the lateral face 404 as shown in earlier embodiments. But alternatively, the housing 57 may be injection molded with the distal end 400 and axial face 402, with the filter 47 inserted and an end cap 405 (FIG. 20) put on the end to enclose the filter and form the fluid tight cartridge 55'. Advantageously, parts 134', 416, 418 (described later) may be attached to the filter 59 when it is inserted into and enclosed in the filter housing 57 by the end cap 405. The end cap 405 may be spun welded to the housing 57 or fastened by other fluid tight means.

As best seen n FIG. 21, the first internal fluid passage 70 of the lateral filter cap 56' is formed as a first, generally cylindrical, inner tube 406 having an interior diameter that is slightly larger at its base and slightly smaller at its laterally outermost end. The first tubular portion 406 forms the distal, first portion 58 of the filter cap 56'. The first filter cap openings 68 may extend through this first tube 406 to place the interior passage 70 in fluid communication with the passages 68 and flow channel 66. The flow channel 66 and seal channels 62a, 64a are formed on the outer surface of the outermost end of this inner tube 406 at the first portion 56' of the lateral filter cap. An annular recess 408 is formed in the wall of the first tube 406 and extends from the base of that tube toward the outer end of that first tube. The annular recess 408 extends along the second portion 60' of the lateral filter cap on which are located the second flow channel 76 and seal grooves 72a, 74a. The annular recess 408 forms a flow channel in fluid communication with the second flow channel 76, and preferably encircles the first internal fluid passage 70. The annular recess 408 has a closed end adjacent the shoulder between the first and second portions 58, 60' of the filter cap with the opposing end of the recess 408 opening toward the base to form a portion of the identified flow channel. Thus, the proximal end of the annular recess 408 adjacent the filter cap 56' near the juncture with the axial wall 402 is formed by two concentric tubes, inner tube 406 and outer tube 409. The outer wall of tube 406 and the inner wall of tube 409 face each other and form the recess 408. The tubes 406, 409 slightly diverge from each other as they approach the axial face 402 so that the recess 408 is slightly larger in diameter adjacent the axial face 402. The slightly divergent walls help mold the recess 408 and allow a plug to form the recess 408 and be withdrawn from the open end of the lateral filter cap 56' before it is fastened to the filter cartridge. The tubes 406, 409 are generally parallel to each other and extend along filter cap axis 14', with the outer tube 409 being concentric with and encircling the inner tube 406. Both tubes are centered about filter cap axis 14'. One tube 406, 409 extends further than the other tube along filter cap axis 14', with inner tube 406 extending further as shown in FIG. 21. The second filter cap portion 60' is on the outer wall of the outer tube 409. The outer tube 409 ends adjacent the juncture of the first and second filter cap portions 58, 60'.

A position stop 410 is located on the outer tube 409 adjacent the base of the lateral filter cap 56' and preferably has wrenching surfaces on the stop, which wrenching surfaces extend outward relative to the lateral filter cap axis 14'. A groove 412 encircling the second filter cap portion 60' and the lateral filter cap 56' is located next to but outward of the position stop 410, and is formed on the outer surface of outer tube 409. The base of the second filter cap portion 60' and outer wall 209 extends beyond the position stop 410 and the inner passage 70 formed by the inside of inner tube 406 extends beyond the end of the second portion 60' and outer tube 409. The axial face 402 has an opening large enough to allow the outer tube 409 to fit through the opening. Preferably the axial face 402 has a circular hole to allow insertion of the base of the second portion 60' formed on outer tube 409, which is preferably cylindrical along the inserting portion. The axial face 402 and outer tube 409 of the filter cap's base portion 60' may be fastened together with threads, adhesives, etc. But preferably the opening in the axial face 402 and the outer tube 409 are sized so they can be connected by spin welding along first connecting surface 412, with the stop 410 limiting the distance that the lateral filter cap 56' and outer tube 409 are inserted into the opening in the axial face 402 and into the distal end 400 of the filter housing. The wrenching surfaces on the position stop 410 may be used for the rotation to achieve the spin welding. The depicted embodiment has a slight boss on the outside of the opening in the axial face 402 and a stepped opening through the wall forming the opening through which the second portion 60' is inserted for spin welding. Advantageously, the end of the second portion 60' is flush with the inner surface of the axial face 402 when the lateral filter cap 56' is connected to the axial face.

Still referring to FIG. 21, the filter 59 has a tubular neck 134' that is laterally offset to accommodate the lateral orientation of the lateral filter cap 56'. The offset tubular neck 134' extends upward from an upper end cap 416 which fits over and mates either directly with the filter body 59 or mates with an end fitting 418 of the end cap. The end fitting 418 blocks the upper end of the cylindrical filter body 59 to force water to flow radially through the filter body. The upper end cap 416 creates a space so the water from the center of the filter body can flow laterally to the offset neck 134'. The offset of the neck 134' will vary as needed to create a fluid passage to the appropriate fluid passage of the lateral nozzle 56'. The offset neck 134' extends parallel to but offset from filter axis 14 a distance sufficient to connect to the internal end of the first internal fluid passage 70 of the filter cap 56'. The inner tube 406 enclosing that first fluid passage 70 extends laterally beyond the end of the tube 409 forming the outer portion of the second filter cap portion 60'. The distal end of the offset neck 134' has an opening, preferably circular, into which the mating end of the inner tube 406 fits. Advantageously, the inner tube portion 406 is spun welded to the opening in the offset neck 134' to form a second connecting surface 420. Preferably, connections 412, 420 are formed simultaneously by spin welding lateral filter cap 56'. Advantageously, the mating portions of the end of tube 406 and the hole in offset neck 134' are sized and configured to form a fluid tight connection, preferably by spin welding. Advantageously, the end of tube 406 is flush with the interior surface of the offset neck 134'.

Referring to FIG. 21, a first fluid flow passage is formed through the first flow channel 66, first filter cap openings 68, first internal fluid passage 70, offset neck 134', filter end cap 416, end fitting 418 and filter body 59. A second fluid flow passage is formed through the second flow channel 76, second filter cap openings 78, annular recess 408 (which corresponds to the second internal fluid passage 80), and the distal end 400 and face 402. The interior of the distal end 400 and axial face 402 is spaced apart from the components forming the first and second flow passages, with standoffs 422 providing strength and bracing of parts as needed while allowing fluid flow around the standoffs as needed. Advantageously the axial wall 404 is located at or slightly offset away from the longitudinal axis 14 of the filter cartridge so that the abutting connection between the lateral manifold 430 and the lateral filter cartridge 56 occurs at about that axis 14. While the filter cap 56 in FIGS. 1-14 has a fairly uniform wall thickness with a stepped diameter between the first and second filter cap portions 58, 60', the lateral filter cap 56' of FIG. 21 has a thicker wall on the second filter cap portion 60' and is effectively formed by two tubular portion 406, 409 that form annular recess 408 between them to form part of the flow path through fluid passages 76 in the second portion 60'.

The lateral filter cap 56' thus uses the same basic filter cap 56 of FIGS. 1-18, but the second portion 60 is formed of two concentric tubes 406, 409 in order to create annular flow channel 408 which is in fluid communication with the outside of the cylindrical filter element 59 in the depicted embodiment. To accommodate the separate flow channels 70, 408, the base of the outer tube 409 is sealingly connected to the axial face 402 while the base of the inner tube 406 is sealingly connected to the offset neck 134'. The flow path 70 formed inside of the inner tube 406 extends toward the end 86 of the filter cap 56' and into the first portion 58 of the end cap, while the annular recess 408 ends adjacent the juncture of the first and second portions 58, 60 of the end cap. The depicted juncture has an outwardly extending shoulder between the first and second portions 58, 60, but the outer periphery of the filter cap 56' could be generally the same diameter with an inward extending shoulder so the internal diameter of passage 70 in the first portion 58 is smaller in diameter than the internal diameter of that same passage in the second portion 60. In short, the walls of the first portion 58 could be thicker than the combined walls 406, 409 (and space 408) extending along the second portion 60.

The filter cartridges 55' with laterally offset neck 56' may be used in manifold filter assemblies. The previously described bayonet lock may be used to connect each filter cartridge to a corresponding manifold, but that may require rotating each cartridge a quarter turn or 90° and that may in turn require sequential removal and re-installation of the cartridges if they are close enough together that an interior cartridge cannot be rotated without hitting an adjacent cartridge.

Figure 23:
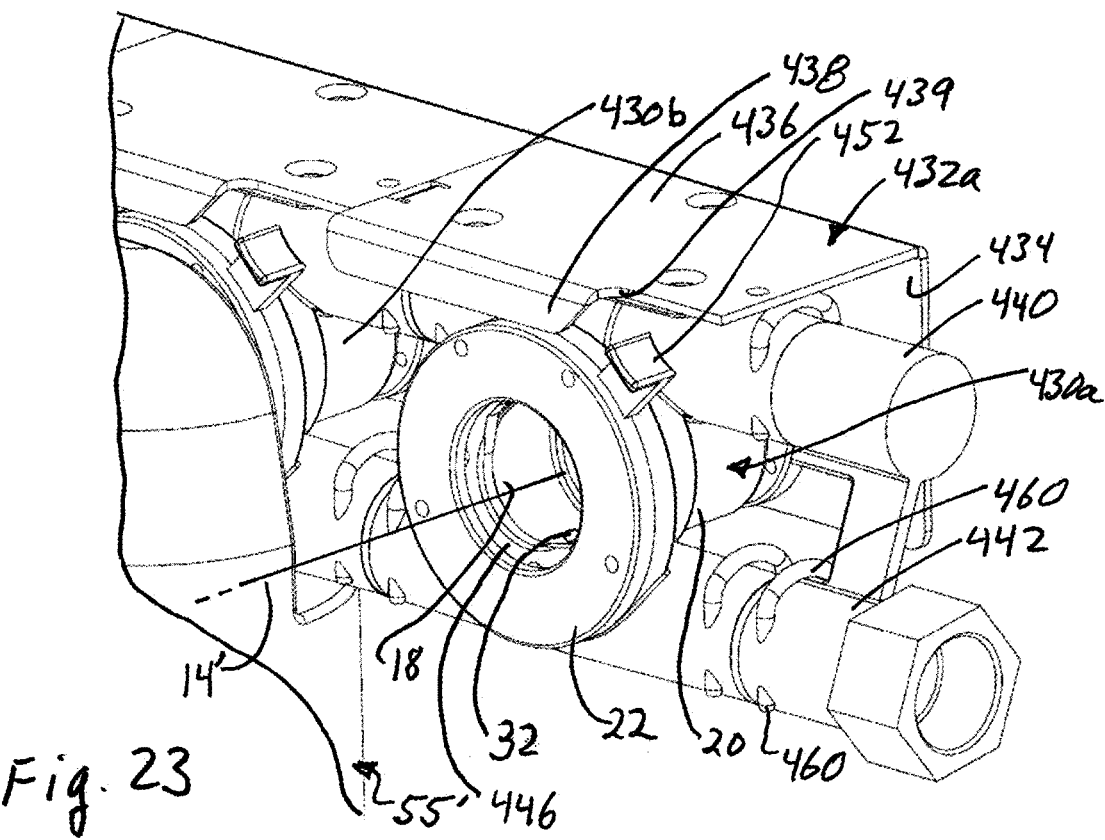
FIG. 23 is a partial, upper perspective view of a filter and manifold of FIG. 22 with a filter removed.
Figure 24:
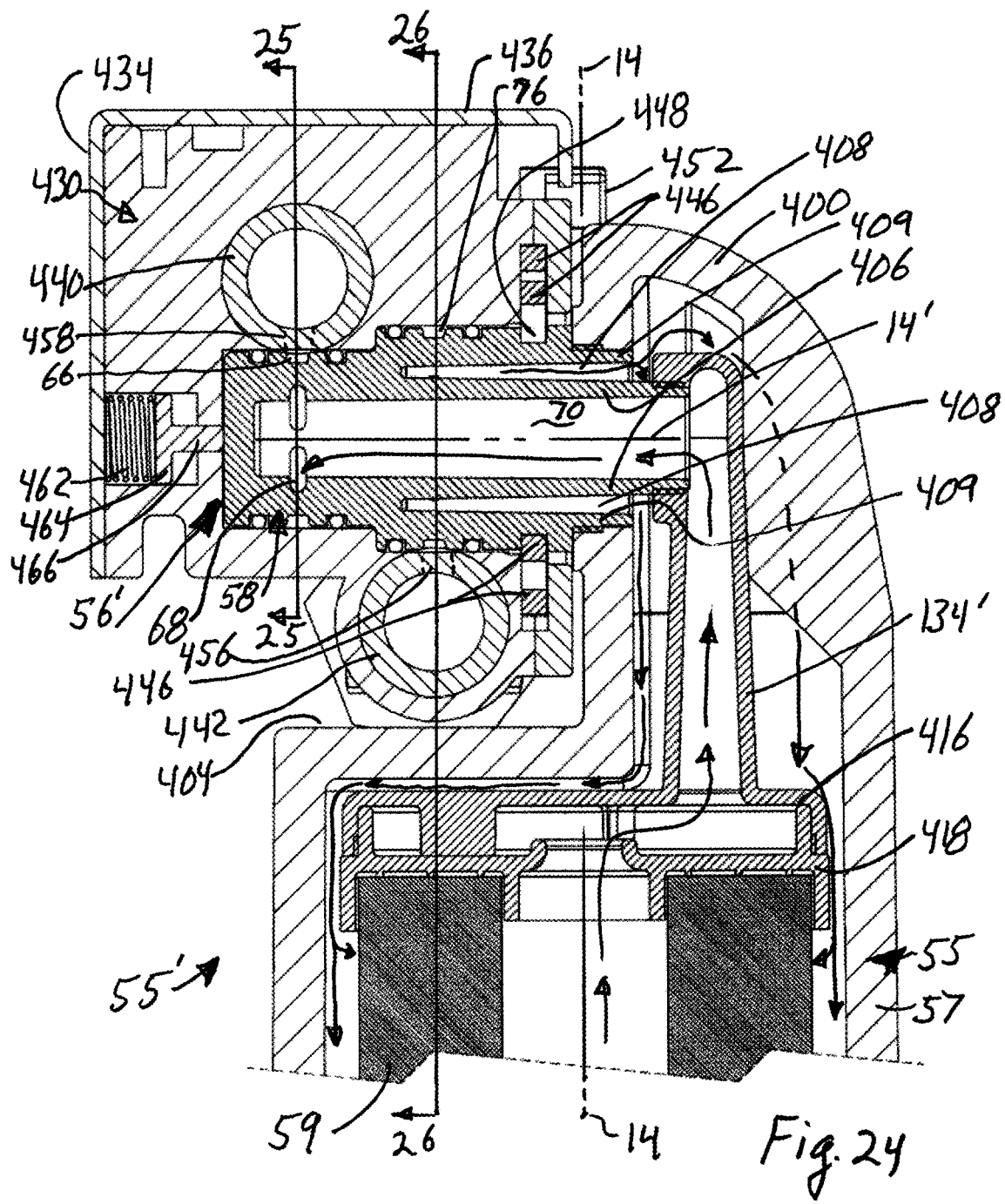
FIG. 24 is a sectional view of the filter cap of FIG. 23 taken along section 24-24.
Figure 25:
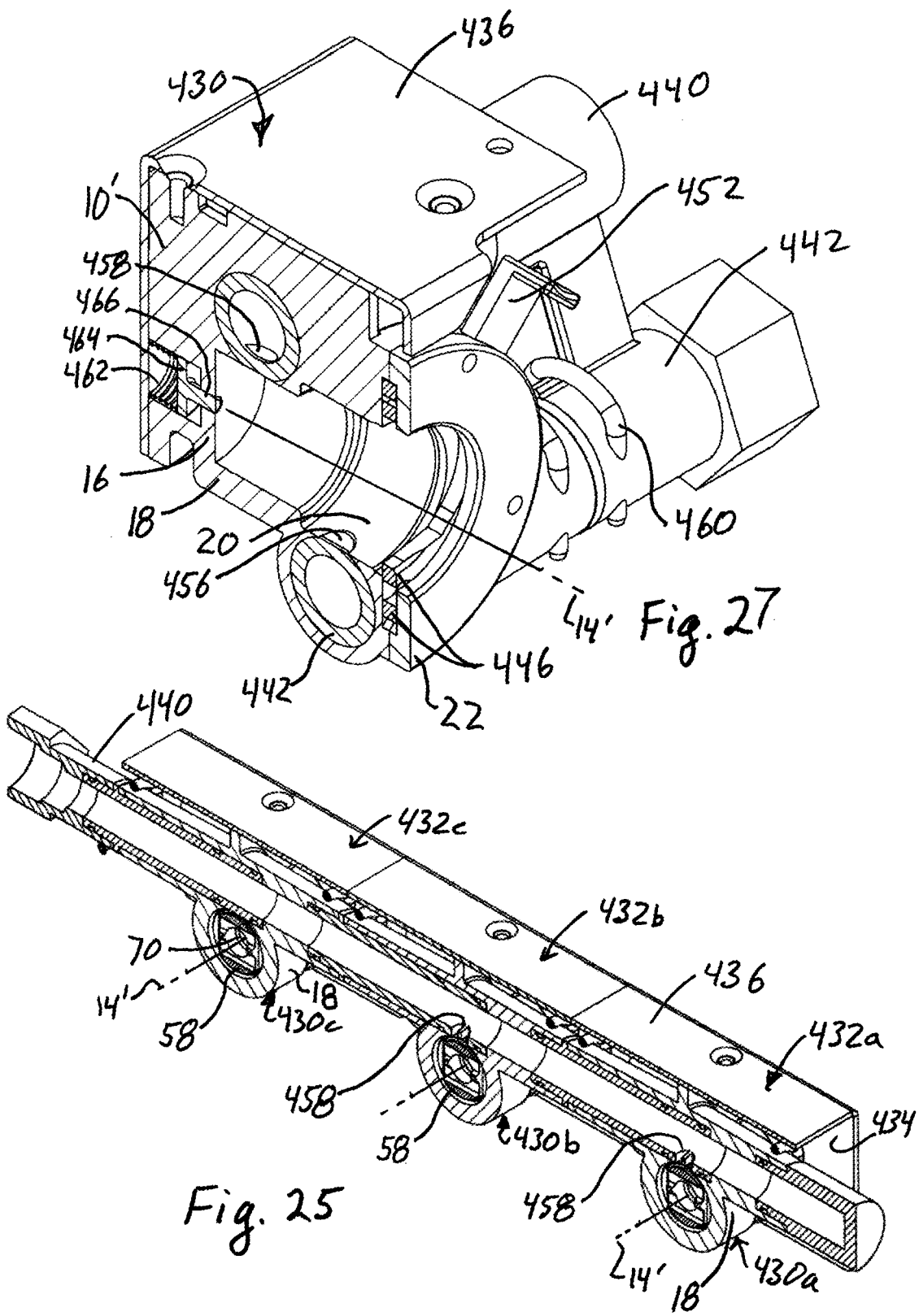
FIG. 25 is a partial sectional view taken along section 25-25 of FIG. 24.

Referring to FIGS. 22-25 and 27, a locking connection to a laterally insertable manifold head 430 is disclosed. A plurality of filter cartridges 55' with lateral necks 56a may be connected in series or parallel, with parallel connection shown in FIG. 22. The manifold heads 430a, 403b, 430c are each held in a mounting bracket 432a, 432b, 432c, respectively. The brackets 432 may have various configurations to hold the manifold heads 430 with the configuration varying according to the surface to which the manifold heads are connected. For connecting to a vertical wall the brackets 432 are shown as comprising L brackets with a vertical back portion 434, a horizontal top portion 436 and an inclined lip 438 for stiffness. One or both of the backs 434 and tops 436 may be offset at the ends in order to nest with and interlock with abutting brackets as shown in FIG. 25. The brackets could be C shaped or have other shapes as needed to provide support for the filter cartridges or to conform to local building codes. Preformed holes may be provided for fasteners to connect the brackets to supporting building structures. The brackets are typically made of metal but could be of various materials. The depicted brackets 430 have a notch or cutout 439 in one end of each lip 438 to accommodate a lock release as discussed later. The manifolds 430 are oriented so the manifold mounting flange 22 is facing away from the vertical wall 434 of the mounting bracket 432, to receive the filter cap 56'. The manifolds 430 are connected to the rackets 432 by threaded fasteners, although other connections may be used.

The filter cartridges 55' connect to first and second tubes 440, 442, in parallel, with one tube carrying unfiltered water and the other tube carrying filtered water. Tubes having a diameter of about ½ inch and made of suitable water compatible materials are believed suitable. The manifolds 430 are as generally described regarding manifolds 10' and the description of corresponding parts with corresponding part numbers is not repeated. The main structural differences between manifolds 430 from manifolds 10' are the use of a releasable lock, the fluid connection with the tubes 440, 442, and a kick-out mechanism. The releasable lock may be replaced with the mounting tabs described in the axially aligned cap 56 of FIGS. 1-18, but that is not preferred.

Referring especially to FIGS. 23, 24 and 27, a locking mechanism is provided to releasably connect the filter cartridge to the manifold or mounting bracket. Advantageously, a latch 446 on one of the cartridge 55', manifold 430, tubes 440, 442 or bracket 432 is resiliently urged into engagement with a mating part on the other of the bracket 432, manifold 430, tubes 440, 442 or cartridge 55'. Advantageously the latch 446 moves inward or outward relative to lateral axis 14' of the lateral cap 56' to releasably engage the mating part of the latching mechanism. In the depicted embodiment the resilient latch 446 comprises a ring encircling the lateral cap 56' and located to be resiliently urged into a portion of an annular groove 448 in the lateral filter cap 56. The annular groove 468 is advantageously adjacent the position stop 410 and axial wall 402 to provide a sturdy connection with the filter cartridge 55'. The ring-shaped latch 446 is enclosed in an annular recess 450 of the manifold 430, preferably located adjacent the manifold mounting flange 22 (FIG. 23). The annular recess 450 encircles the passage through which the lateral filter cap 56' passes when inserted into the laterally orientated manifold 430. In the depicted embodiment the tube 442 extends through part of the manifold and the recess 450 so a portion of the recess is in the tube 442 or the brackets supporting the tube 442. A spring resiliently urges the ring shaped latch 446 to extend into and partially block the passage into the manifold 430 (FIG. 23). As best seen in FIGS. 24 and 27, the spring may comprise a resilient latch 446 having a portion of the encircling ring shape split into an inner and outer segment so the outer segment may be resiliently deformed toward the inner to allow the filter cap 56' to pass the inner segment while the deformed outer segment acts like a deformed spring to urge the inner segment into the latching recess 448 (FIG. 19). Thus, the split segment of the encircling ring shaped latch 446 acts as a resilient member to urge the latch into the locking position. A split segment extending along an arc of about 270° is believed suitable. The annular space 450 in the manifold is large enough to accommodate the latching movement of the latching ring 446. A latch tab 452 is connected to the latching ring 446. The depicted tab 452 extends outward through an opening in the sidewall of the manifold best seen in FIG. 23.

During use, the lateral filter cap 56' is inserted laterally though the opening in the bottom of the lateral manifold 430 adjacent flange 11 until the cap is seated in the manifold, at which time the latching ring 446 is resiliently urged into the annular recess or groove 448 in the lateral filter cap 56' and extending part way into the opening of the lateral manifold 430 (FIG. 23). If the filter cap 56' is moved along lateral axis 14' a portion of the latch 446 will abut the sides or edges of recesses 448, 450 to restrain relative movement of the cap 56' and manifold 430. The latch tab 452 may be pushed inward to move the ring shaped latch 446 into the annular recess 450 in the manifold to allow the lateral filer cap 56' to be withdrawn from the lateral manifold.

Advantageously, the fit between the latch 446 and recesses 448, 450 is snug enough that the lateral filter cap 56' does not move much relative to the lateral manifold 430. The latch tab 452 may be at various orientations, with notches or cut-outs 329 allowing passage of the latch tab 452, as needed. Having the latch tab orientated at an angle of about 30-6-degrees from the vertical is believed desirable to make it easier to activate the latch tab while manipulating the filter cartridge 55'.

Referring to FIGS. 24-27 and especially FIGS. 24 and 25, the first tube 440 advantageously passes through the lateral manifold 430 so a portion of that the first tube is in fluid communication with first fluid passage 66 of the lateral filter cap 56' during use, preferably through openings 458 in the first tube 440. Advantageously the first tube 440 is located above the lateral axis 14' and above the first portion 18 (FIG. 26) of the filter cap 56'. Fluid thus flows through filter neck 134' and passages 70, 68 66 and 458 to reach the first tube 440. The openings 458 are shown as two adjacent openings with a divider so that the O-ring seals 62b, 64b the do not enter the openings 458 and cut, abrade or otherwise damage the seals when the filter cap 56' is inserted into the manifold. The openings 458 correspond to the first manifold flow passage 28 (FIG. 1). Depending on the flow through filter cartridge 55', that flow path could carry unfiltered or filtered water. In the depicted embodiment it preferably carries filtered water.

Figure 26:
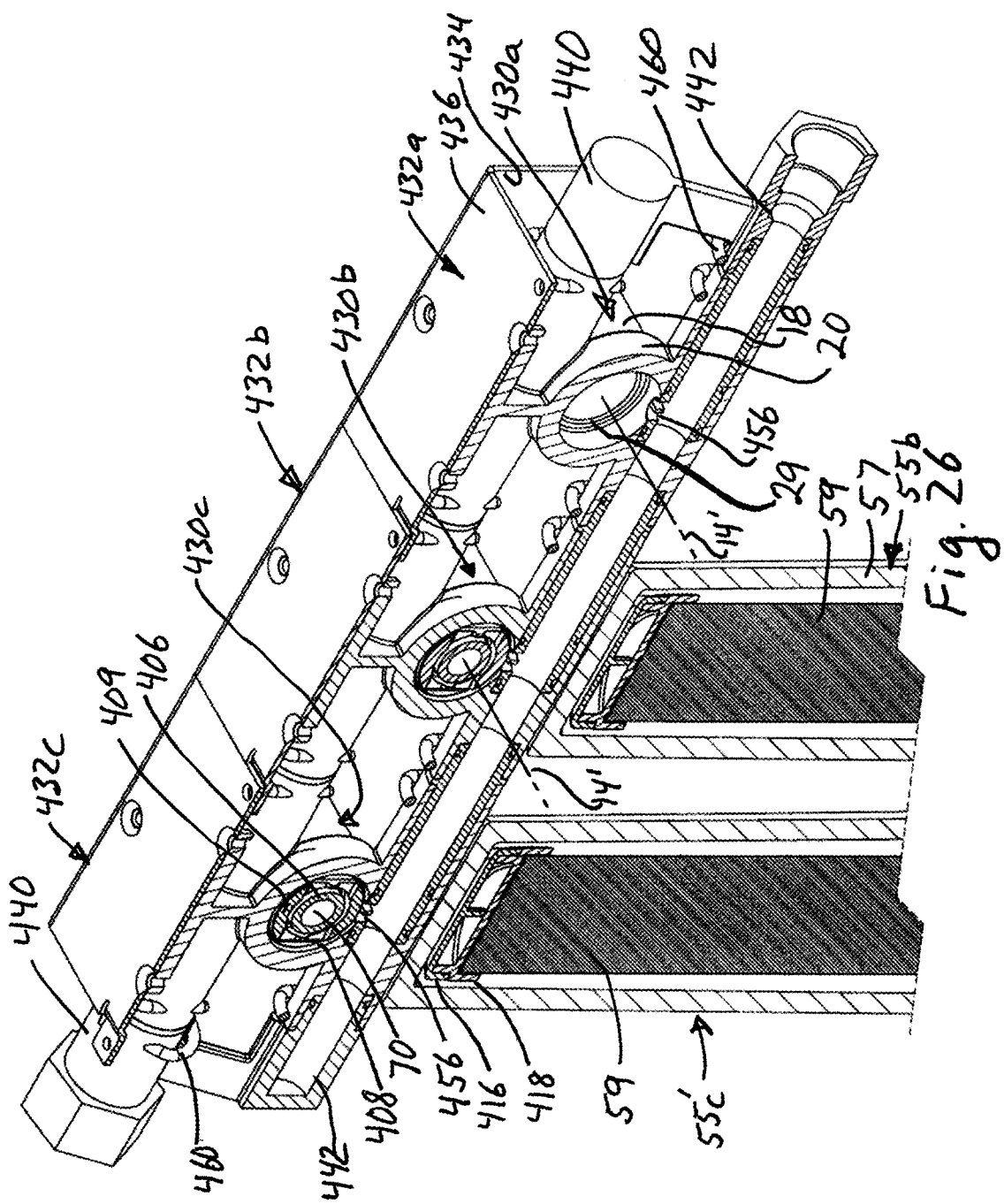
FIG. 26 is a partial sectional view taken along section 26-26 of FIG. 24.

Referring to FIGS. 24-26 and especially FIGS. 24 and 26, the second tube 442 advantageously passes through the lateral manifold 430 so a portion of that the second tube is in fluid communication with second fluid passage 76 of the lateral filter cap 56' during use, preferably through openings 456 in the second tube 442. The openings 456 are shown as two adjacent openings with a divider so that the O-ring seals 72b, 74b the do not enter the openings 456 and cut, abrade or otherwise damage the seals when the filter cap 56' is inserted into the manifold. The openings 456 correspond to the second manifold flow passage 32 (FIG. 1). Advantageously the second tube 442 is located below the lateral axis 14' and below the second portion 20 (FIG. 26) of the manifold. Advantageously the first tube 440 is located above the lateral axis 14' and above the first portion 58 of the filter cap 56'. Fluid thus flows around the outside of the filter neck 134' and into the annular recess 408, through flow channel 76, and passages 78, 456 to reach the second tube 442. Depending on the flow through filter cartridge 55', that fluid path could carry unfiltered or filtered water. In the depicted embodiment that is preferably unfiltered water.

As best seen in FIG. 25, the tubes 440, 442 may be made of interconnected segments, with some segments configure to pass through the lateral manifolds 430 and other segments configured to connect the manifold segments of the tubes. Advantageously, various connectors 460 (FIG. 23) such as fasteners, brackets, clips or claims, preferably C-clips, may connect the tubes to the brackets 432. If the thickness of the segments of the tubes 440, 442 permit, the connectors 460 may mate with corresponding recesses 461 (FIG. 26) in the tubes.

Referring to FIG. 24, the lateral filter cap 56' is inserted laterally, preferably horizontally into the manifold 430. Upon release of the latch 446 by pressing tab 452, the filter cartridge 55' may be moved laterally away from the manifold to disengage the cap 56' from the manifold 430. Because the fluid enters the flow channels 66, 76 radially to the axis 14, 14' along which the filter cap 56, 56' extends there is little or no axial pressure tending to push the cartridge out of the manifold. Advantageously, a resilient member 462 urges the filter cartridge away from the manifold to avoid any vacuum lock as may arise from the closely mating parts sealed by several O-ring seals. The resilient member 462 may urge any portion of the lateral filter cap 56' or cartridge 55' away from the manifold or bracket. Thus, springs or other resilient members may be located between the manifold 430 and filter cap 56', between the bracket 430 a n filter cap 56', between the bracket and filter cartridge 55'. In the depicted embodiment the resilient member 462 comprises a spring urging a disk 464 toward the end 86 of the lateral filter cap 56'. The disk 464 has a cylindrical post 466 passing through a hole in an end wall of the manifold 430 so the spring pushes the disk and post against the end of the filter cap to resiliently urge the filter cap 56' and filter cartridge 55' out of the manifold 430.

The above description of the lateral filter cap 56' and cartridge is described as having the cartridge vertical, but that need not be so. The cartridge may be in any orientation, including vertically up, vertically down, horizontal, or at any angle between those positions. The above description of the lateral filter cap 56' and lateral manifold 430 did not discuss the location of the vent passages 142, 105 and 156 to apply gases to or check moisture in the end portion defined by seal 62, or between adjacent seals 64, 72, or beyond seal 74 and the base of the filter cap. Those aspects are described above and that description applies to the embodiment of FIGS. 19-24.

The lateral filter cartridge 55" provides a lateral connection with a filter manifold head 430 having a flow inlet and a flow outlet, which could be through the channels 28, 32, depending on the particular filter and manifold design. The filter element 59 is in fluid communication with a filter inlet and filter outlet so that liquid from the manifold flow inlet passes through the filter inlet and filter and out the manifold outlet. The lateral filter cap for the lateral filter cartridge includes a first generally cylindrical portion 58 with a first fluid passageway 68 extending inward toward a longitudinal axis 14' of the lateral filter cap 56'. The lateral filter cap axis 14' is in a plane orthogonal to the filter cartridge axis 14. The first fluid passageway 70 forms one of the inlet or outlet of the filter cartridge depending on the particular manifold and filter construction. The lateral filter cap 56' has a second generally cylindrical portion 60 with a second fluid passageway 78 extending inward toward the lateral filter cap axis 14' and forming the other of the inlet or outlet of the lateral filter cartridge. The lateral filter cap 56' has closed end 86 with the first generally cylindrical portion 58 further from the filter axis 14 than the second generally cylindrical portion 60. The first and second generally cylindrical portions 58, 60 have respective first and second outer diameters with the first outer diameter being smaller than the second outer diameter. The filter cap has a first internal cavity 70 formed in part by the first generally cylindrical portion 58 and in fluid communication with the first fluid passageway 68 and extending along the lateral filter cap longitudinal axis 14' along a length of the first and second generally cylindrical portions 58, 60 of the lateral filter cap 56'. A second internal cavity extends along the second, generally cylindrical portion 60 of the lateral filter cap 56' and includes annular recess 408 encircling the first internal cavity 70 and extending along the filter cap longitudinal axis 14'. The lateral filter cap 56' connects to the distal end of the filter housing 57 enclosing the filter 59, preferably connecting along axial face 402.

First and second seal members 62b, 64b encircle the outside of the first generally cylindrical portion 58 on opposing sides of the first fluid passageway 68. Third and fourth seal members 72b, 74b encircle the outside of the second generally cylindrical portion 60 on opposing sides of the second fluid passageway 78. The second and third seal members 64b, 72b are separated by a middle distance that may optionally be placed in fluid communication with a vent passage 105. The vent volume between the end 86 and first seal member 62b may optionally be placed in fluid communication with vent passage 140. The distal end of the filter cartridge 55" may have an axial face 402 generally parallel to the filter cartridge longitudinal axis 14 and offset to one side of that filter cartridge longitudinal axis. Advantageously, the closed end 86 of the lateral filter cap is adjacent a generally cylindrical plane conforming to a periphery of the housing 57 enclosing the filter 59. The offset allows the end of the lateral filter cap 56' to not extend so far away from the sidewall of the housing 57 and that helps reduce potential damage to the lateral filter cap 56'.

The above description is given by way of example, and not limitation. Given the above disclosure, one skilled in the art could devise variations that are within the scope and spirit of the invention disclosed herein, including various locations of the fluid passageways and vent passageways through one or more portions of the manifold, barrel valve or filter cap. Further, while the above embodiments are believed to provide particular advantages for water filters of the type used in residential and commercial appliances, the present invention is not limited to water filters and may be used with filters for other liquids and gases. Moreover, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of testing water filter cartridges having a filter cap, comprising the steps of:
    pressurizing a first void volume between an inlet and outlet of a water filter cap with a test fluid, the void volume being located between an adjacent wall of a mating part and two adjacent and coaxial seal members at least one of which defines a portion of a first flow path through the filter cap of a water filter cartridge, each of the seal members encircling a longitudinal axis of the filter cap;
    providing a water tight seal between that portion of the filter cap between the two adjacent and coaxial seal members and a wall abutting the two adjacent and coaxial seal members to create the first void volume, the wall having a first vent passage opening onto the first void volume and through which the first void volume is pressurized; and
    checking to see if the test fluid leaks past one or more of the two adjacent and coaxial seal members.

2. The method of claim 1, wherein the test fluid comprises water.

3. The method of claim 1, wherein the test fluid comprises a gas.

4. The method of claim 3, wherein the checking step comprises monitoring the pressure of the first void volume.

5. The method of claim 3, wherein the checking step comprises monitoring the seals defining the first void volume for leaks into the first flow path.

6. The method of claim 3, wherein the checking step comprises monitoring the first flow path for the presence of the test gas.

7. The method of claim 3, wherein each of the at least two seals define a portion of a first and second flow path through the filter cartridge.

8. The method of claim 3, wherein the two seal members forming the first void volume have different diameters.

9. The method of claim 3, wherein the checking step comprises monitoring the pressure of the void volume being pressurized, and wherein the pressure is a positive pressure.

10. The method of claim 3, wherein the checking step comprises monitoring the pressure of the void volume being pressurized, and wherein the monitored pressure is negative.

11. The method of claim 3, wherein the checking step comprises monitoring the flow rate of the test gas provided to the void volume being pressurized.

12. The method of claim 3, further including the step of pressurizing the void volume through the vent passage with a test gas and checking to see if the test gas leaks past the two seal members defining the void volume being pressurized and wherein the step of pressurizing the void volume takes less than 5 seconds.

13. The method of claim 3, wherein the first and second seal members have a different diameter, with the first seal member having a smaller diameter than the second seal member and wherein the checking step comprises monitoring the pressure of the void volume being pressurized, and wherein the monitored pressure is positive.

14. The method of claim 3, wherein the two adjacent and coaxial seal members comprise second and third seal members and the filter cap further comprises first and fourth seal members with the first seal member located axially above and coaxial with the second seal member and with the fourth seal member located axially below and coaxial with the third seal member, the first and second seal members each encircling a portion of a filter cap adjacent a top of that filter cap and further encircling opposing sides of a first water flow path of the filter, the third and fourth seal members each encircling opposing sides of a second water flow path of the filter, first seal member forming a top filter cap void volume bounded on a lower end by the first sealing member which seals against the wall which defines a cavity above the first seal member and into which cavity a top of the filter cap extends during testing, the fourth seal member forming a portion of a bottom filter cap void volume located between the bottom of the filter cap and a portion of the wall, a second the wall having a second vent passage in fluid communication with one of the top and bottom void volumes, the method further comprising:
    pressurizing at least one of the top or bottom void volumes through a second vent passage through the wall forming the respective top or bottom void volume with a test fluid and checking to see if the test fluid leaks past the two seal members defining the top or bottom void volume being pressurized.

15. The method of claim 14, wherein the test fluid comprises water.

16. The method of claim 14 wherein the test fluid comprises a gas.

17. The method of claim 16, wherein the checking step comprises monitoring the pressure of the void volume being pressurized, and wherein the pressure is a positive pressure.

18. The method of claim 16, wherein the checking step comprises monitoring the flow rate of the test gas provided to the void volume being pressurized.

19. The method of claim 16, wherein the step of pressurizing at least one of the void volumes takes about 1 to 5 seconds.

20. The method of claim 16, further comprising pressurizing a plurality of the void volumes with the test gas and checking to see if the test gas leaks past the two seal members defining the plurality of void volumes being pressurized.

21. The method of claim 16, wherein the checking step comprises monitoring the pressure of the void volume being pressurized, and wherein the monitored pressure is negative.

22. The method of claim 16, wherein the first and second seal members have a first diameter and the third and fourth seal members have a second diameter, with the first diameter being smaller than the second diameter, and wherein the checking step comprises monitoring the pressure of the void volume being pressurized, and wherein the monitored pressure is positive.

23. The method of claim 16, further comprising a fifth seal encircling the filter cap and coaxial with the fourth seal and located below the fourth seal to form the bottom filter cap void volume defined in part by the volume between the fourth and fifth seals and the wall between the fourth and fifth seals, with a lower vent path in fluid communication with the lower void volume, the method further pressurizing the lower vent path and lower void volume with a test gas and monitoring at least one of the flow or pressure of the test gas in the lower void volume.

24. The method of claim 1, wherein the wall comprises a cylindrical wall of a manifold.

25. The method of claim 2, wherein the wall comprises a cylindrical wall of a barrel valve.

26. The method of claim 1, wherein the longitudinal axis of the filter cap is in a plane orthogonal to a longitudinal axis of the filter cartridge and extends traverse to the longitudinal axis of that filter cartridge.

\* \* \* \* \*